US006222516B1

(12) United States Patent
Oda et al.
(10) Patent No.: US 6,222,516 B1
(45) Date of Patent: *Apr. 24, 2001

(54) ACTIVE MATRIX LIQUID CRYSTAL DISPLAY AND METHOD OF DRIVING THE SAME

(75) Inventors: Masami Oda; Munehiro Haraguchi, both of Kawasaki; Tadahisa Yamaguchi, Tenri; Kazuhiro Takahara; Akira Yamamoto, both of Kawasaki, all of (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/833,468

(22) Filed: Apr. 7, 1997

Related U.S. Application Data

(62) Division of application No. 08/783,788, filed on Jan. 15, 1997, which is a continuation of application No. 08/096,814, filed on Jul. 28, 1993, now abandoned.

(30) Foreign Application Priority Data

| | | |
|---|---|---|
| Oct. 20, 1992 | (JP) | 4-281530 |
| Nov. 6, 1992 | (JP) | 4-297337 |
| Jul. 21, 1993 | (JP) | 5-180375 |

(51) Int. Cl.$^7$ .............................. G09C 3/36

(52) U.S. Cl. .............................. 345/94; 345/92; 345/100; 345/87; 345/58

(58) Field of Search .............................. 345/94, 90, 92, 345/87, 89, 100, 208, 58, 95, 98, 96

(56) References Cited

U.S. PATENT DOCUMENTS

| | | | |
|---|---|---|---|
| 5,184,118 | 2/1993 | Yamazaki | 345/96 |
| 5,434,599 | 7/1995 | Hirai et al. | 345/100 |
| 5,442,370 * | 8/1995 | Yamazaki et al. | 345/94 |

OTHER PUBLICATIONS

Maltese, Paolo, "Cross–Modulation and Disuniformity Reduction in the Addressing of Passive Matrix Displays," *Fourth Display Research Conference*, Sep. 18–20, 1984, Paris, pp. 15–20.

* cited by examiner

*Primary Examiner*—Richard A. Hjerpe
*Assistant Examiner*—Francis Nguyen
(74) *Attorney, Agent, or Firm*—Staas & Halsey LLP

(57) ABSTRACT

A liquid crystal display has a liquid crystal layer, first and second electrodes, and a third electrode. The liquid crystal layer is inserted between the first and second electrodes to define liquid crystal cells. The third electrode is capacitively coupled with one of the first and second electrodes. A correction voltage for correcting distortion of a waveform for driving one of the first and second electrodes is applied to the third electrode, to keep an effective voltage applied to the liquid crystal cells unchanged and improve the display quality of the liquid crystal display. Therefore, the liquid crystal display of the present invention can correct distortion of a common voltage and prevent crosstalk.

16 Claims, 50 Drawing Sheets

CORRECTING DATA VOLTAGE

Vc ···ORIGINAL COMMON VOLTAGE
Vcr···ACTUAL COMMON VOLTAGE
Vd ···DATA VOLTAGE OF PRIOR ART
Vdo···DATA VOLTAGE OF THE PRESENT INVENTION

CORRECTING COMMON VOLTAGE

Vcr···COMMON VOLTAGE OF PRIOR ART
Vc0···COMMON VOLTAGE OF THE PRESENT INVENTION

| Fig.15A |
| --- |
| Fig.15B |

| |
|---|
| Fig.17A |
| Fig.17B |

| Fig.18A |
| --- |
| Fig.18B |

Fig.19A
Fig.19
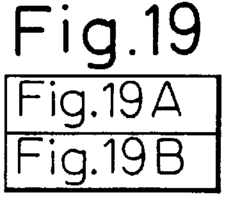
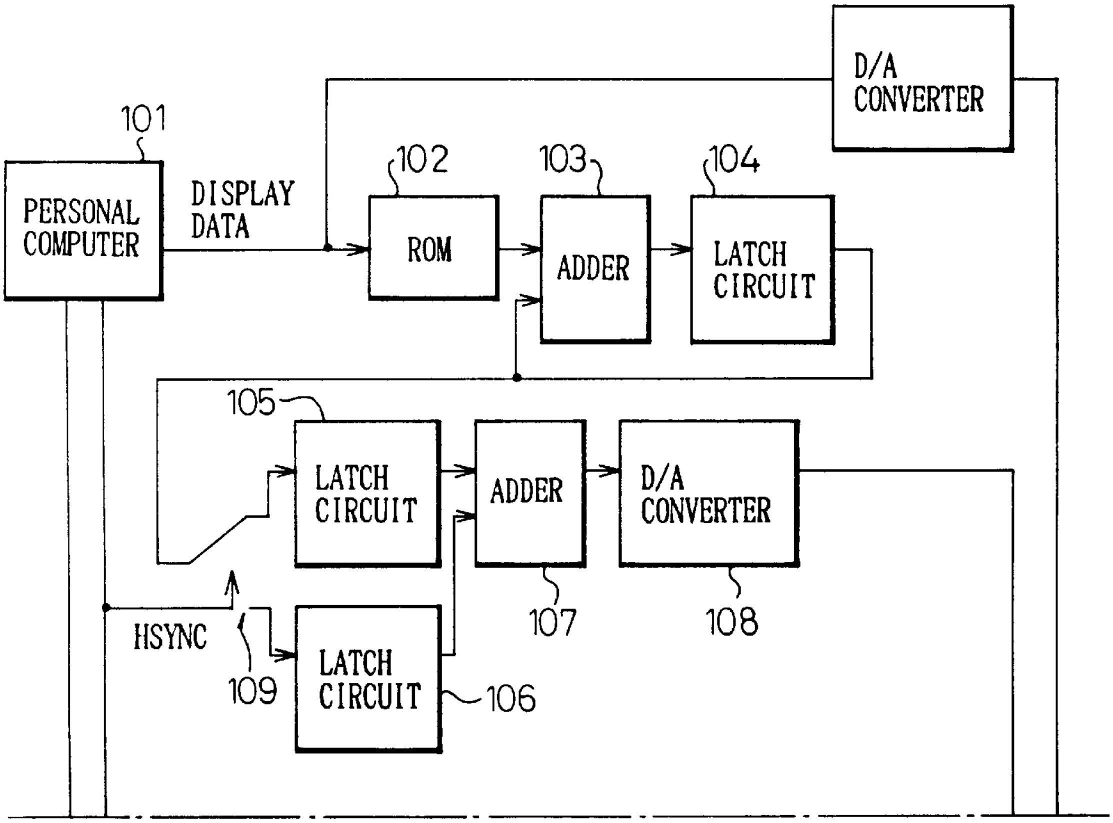

ACTIVE MATRIX LIQUID CRYSTAL DISPLAY AND METHOD OF DRIVING THE SAME

This application is a division of application Ser. No. 08/783,788, filed Jan. 15, 1997 now pending, in turn a continuation of application Ser. No. 08/096,814, filed Jul. 28, 1993, abandoned.

BACKGROUND OF THE INVENTION

1. Field of the invention

The present invention relates to a liquid crystal display (LCD) and a method of driving the same, and particularly, to an active matrix LCD employing thin film transistors (TFTs) and a method of driving the same.

2. Description of the Related Art

Low-power thin LCDs are widely used for office automation equipment such as personal computers and word processors. Opposed type active matrix LCDs employing TFTs are flat and capable of displaying quality images. The TFT LCDs are popular for lap-top and book-type personal computers, word processors, and small-size television sets. Recent office automation equipment requires larger and higher quality displays. Accordingly, the LCDs including the TFT LCDs are required to have large screens and to display high quality images. It is also necessary to provide a method of driving such LCDs.

SUMMARY OF THE INVENTION

An object of the present invention is to correct distortion of a common voltage in an LCD and keep an effective voltage applied to each liquid crystal cell of the LCD unchanged, to thereby improve the display quality of the LCD.

Another object of the present invention is to reduce crosstalk in an LCD, to thereby improve the display quality of the LCD.

Still another object of the present invention is to properly correct a common voltage over an entire display panel of an LCD in real time.

According to the present invention there is provided a liquid crystal display comprising first and second electrodes; a liquid crystal layer inserted between the first and second electrodes to define liquid crystal cells; and a third electrode capacitively coupling with one of the first and second electrodes and receiving a correction voltage for correcting distortion of a waveform for driving one of the first and second electrodes.

The liquid crystal display may be an opposed matrix liquid crystal display having display electrodes serving as the first electrode and formed on a first substrate as well as a common electrode serving as the second electrode and formed on a second substrate facing the first substrate. Each of the display electrodes may be controlled by a thin film transistor connected to a data bus line and to a scan bus line.

The scan bus lines capacitively coupling with the common electrode may serve as the third electrode. A voltage whose polarity is opposite to that of a data voltage applied to the data bus line may be applied to unselected ones of the scan bus lines. An electrically conductive shielding film of a filter capacitively coupling with the common electrode may serve as the third electrode. A voltage whose polarity is opposite to that of a data voltage applied to the data bus line may be applied to the shielding film. A supplemental electrode capacitively coupling with the data bus lines may serve as the third electrode, and a voltage whose polarity is opposite to that of a data voltage applied to the data bus line may be applied to the supplemental electrode.

Further, according to the present invention there is provided a liquid crystal display comprising a liquid crystal panel having a liquid crystal layer, display electrodes, and a common electrode; and the liquid crystal layer being inserted between the display electrodes and the common electrode to define liquid crystal cells; a detection unit for detecting distortion of a common voltage applied to the common electrode; and a sample-hold circuit serving as a correction circuit for providing a correction voltage according to the magnitude of the detected distortion of the common voltage. According to the present invention there is also provided a liquid crystal display comprising a liquid crystal panel having a liquid crystal layer, display electrodes, and a common electrode. The liquid crystal layer is inserted between the display electrodes and the common electrode to define liquid crystal cells. A detection unit detects distortion of a common voltage applied to the common electrode; and an integration circuit serves as a correction circuit for providing a correction voltage according to the magnitude of the detected distortion of the common voltage.

The liquid crystal display may be an active matrix liquid crystal display and an output of the correction circuit may be fed back to the common electrode, to correct the distortion of the common voltage. The common electrode may have common voltage terminals, at least one of the common voltage terminals may be removed from the common voltage, the removed common voltage terminal may be used to detect distortion of the common voltage. The distortion detection unit may be a monitoring resistor disposed between the common electrode and an output end of the common voltage. A connection between the monitoring resistor and the common electrode may be used to detect distortion of the common voltage. The distortion detection unit may further have a differential amplifier that receives a terminal voltage of wiring that connects the common electrode to the output end of the common voltage, or a terminal voltage of the monitoring resistor connected between the common electrode and the output end of the common voltage, an output of the differential amplifier may be used to detect distortion of the common voltage.

The integration circuit may have reset means for periodically resetting an initializing an output voltage of the integration circuit. The integration circuit may be reset during a period that starts when a corresponding gate is turned OFF and ends when the polarity of a data voltage is inverted. The integration circuit may involve first and second integration circuits and a selector. The timing of a first reset signal for resetting an output voltage of the first integration circuit may be shifted from the timing of a second reset signal for resetting an output voltage of the second integration circuit, and the selector may select one of the output voltages of the two integration circuits that is not reset and providing a correction voltage.

According to the present invention there is provided a liquid crystal display comprising a liquid crystal panel having a liquid crystal layer, display electrodes, and a common electrode. The liquid crystal layer is inserted between the display electrodes and the common electrode to define liquid crystal cells. The common electrode has common voltage terminals. A detection unit detects distortion of a common voltage applied to the common electrode, and a correction circuit for provides a correction voltage according to the magnitude of the detected distortion of the common voltage, correction voltages having different amplitudes being applied to the common voltage terminals, respectively, to correct the distortion of the common voltage.

Each of the common voltage terminals may be provided with each one of the distortion detection means and correction circuits. At least one of the common voltage terminals may be provided with the distortion detection means and correction circuit, and a correction voltage provided by the correction circuit may be applied to the common voltage terminals through amplifiers. At least one of the common voltage terminals may be provided with the distortion detection means and correction circuit. A correction voltage provided by the correction circuit may be applied to the common voltage terminals through an amplifier while an uncorrected common voltage being directly applied to the other common voltage terminals.

Further, according to the present invention there is provided a liquid crystal display comprising a weighing unit for weighting display data to be supplied to a data driver; means for adding a weighting value based on display data for a first scan line to a weighting value based on display data for a second scan line to be selected after the first scan line; and means for adding a voltage corresponding to the sum of the weighting values to a data voltage to be supplied to the data driver, to thereby cancel distortion of a common voltage.

The liquid crystal display may further comprise means for adjusting the data voltage according to a distance between a common electrode terminal to which the common voltage is applied and a data electrode to which display data is supplied.

In addition, according to the present invention there is provided a liquid crystal display comprising means for weighting display data to be supplied to a data driver; means for adding a weighting value based on display data for a first scan line to a weighting value based on display data for a second scan line to be selected after the first scan line; and means for adding a voltage corresponding to the sum of the weighting values to a common voltage, to thereby cancel distortion of the common voltage.

The liquid crystal display may further comprise means for adjusting the data voltage or the common voltage according to a distance between a common electrode terminal to which the common voltage is applied and a scan electrode corresponding to a scan line.

Further, according to the present invention there is provided a method of driving a liquid crystal display, comprising the steps of weighting display data to be supplied to a data driver; adding a weighting value based on display data for a first scan line to a weighting value based on display data for a second scan line to be selected after the first scan line; and adding a voltage corresponding to the sum of the weighting values to a data voltage to be supplied to the data driver, to thereby cancel distortion of a common voltage.

Further, according to the present invention there is also provided a method of driving a liquid crystal display, comprising the steps of weighting display data supplied to a data driver; adding a weighting value based on display data for a first scan line to a weighting value based on display data for a second scan line to be selected after the first scan line, and adding a voltage corresponding to the sum of the weighting values to a common voltage, to thereby cancel distortion of the common voltage.

BRIEF DESCRIPTION OF THE DRAWINGS

The present invention will be more clearly understood from the description of the preferred embodiments as set forth below with reference to the accompanying drawings, wherein:

FIGS. 19A and 19B show an LCD according to a fifth embodiment of the second aspect of the present invention;

DESCRIPTION OF THE PREFERRED EMBODIMENTS

For a better understanding of the preferred embodiments of the present invention, the problems of the prior art will be explained.

Figure 12:
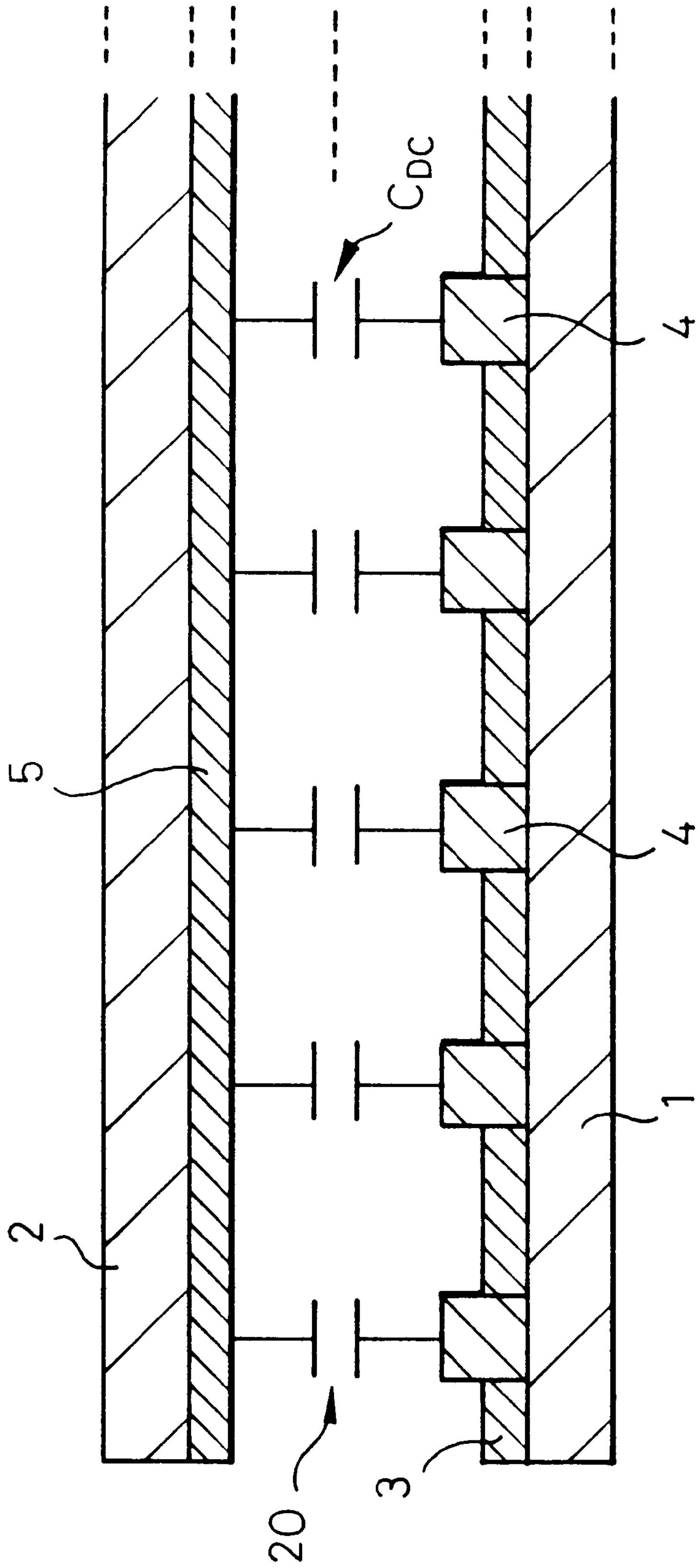
Fig.12 (PRIOR ART)
FIG. 12 shows an LCD according to a prior art.
Figure 13:
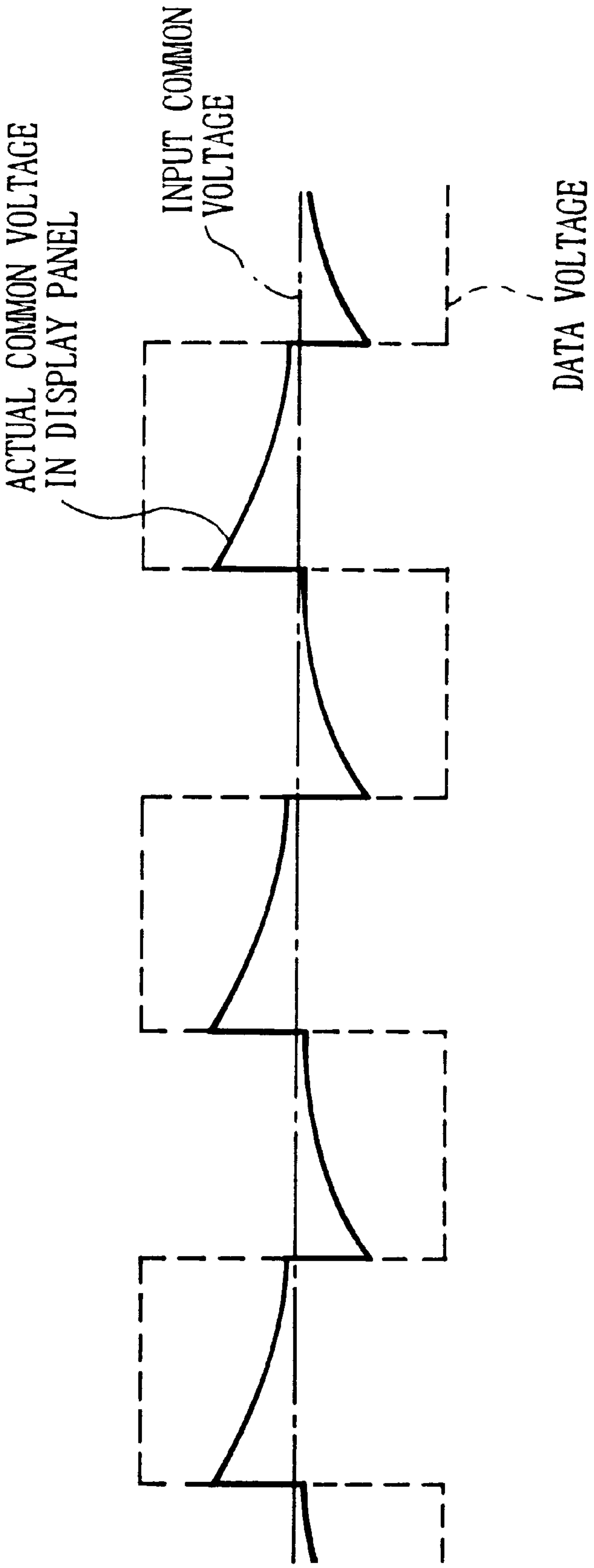
Fig.13 (PRIOR ART)
FIG. 13 shows waveforms for driving the LCD of the prior art.

FIG. 12 shows an example of a conventional liquid crystal display (LCD), and FIG. 13 shows examples of waveforms for driving the LCD.

In FIG. 12, numeral 1 is a TFT substrate, 2 is an opposite substrate, 3 is a scan bus line (a gate bus line), 4 is a data bus line, 5 is a common electrode, 20 is a liquid crystal layer, and $C_{DC}$ is parasitic capacitance in the liquid crystal layer.

When a data voltage is applied to a liquid crystal cell (pixel) through the data bus line 4, a potential difference occurs between the data voltage and a common voltage applied to the common electrode 5. This potential difference causes the cell to display data. Due to a resistive component of the common electrode 5 and the parasitic capacitance $C_{DC}$ between the data bus line 4 and the common electrode 5, etc., the common voltage fluctuates in the display panel whenever the data voltage rises and falls. Specifically, the actual waveform of the common voltage deviates from the original waveform thereof.

In this way, the resistive component of the common electrode 5 and the parasitic capacitance $C_{DC}$ between each data bus 4 and the common electrode 5, etc., form an RC circuit to distort the original common voltage and deteriorate the display quality of the LCD whenever the data voltage rises and falls.

The polarity of the data voltage is usually inverted between adjacent horizontal scan lines, to prevent flickering of the LCD. At the time of inversion, the distortion of the common voltage adversely influences an effective voltage applied to each cell, and causes crosstalk to deteriorate the display quality of the LCD. The crosstalk occurs when horizontally adjacent cells have the same polarity. Since the inverting technique is unable to invert the polarities of horizontally adjacent cells, it frequently causes crosstalk.

Figure 1:
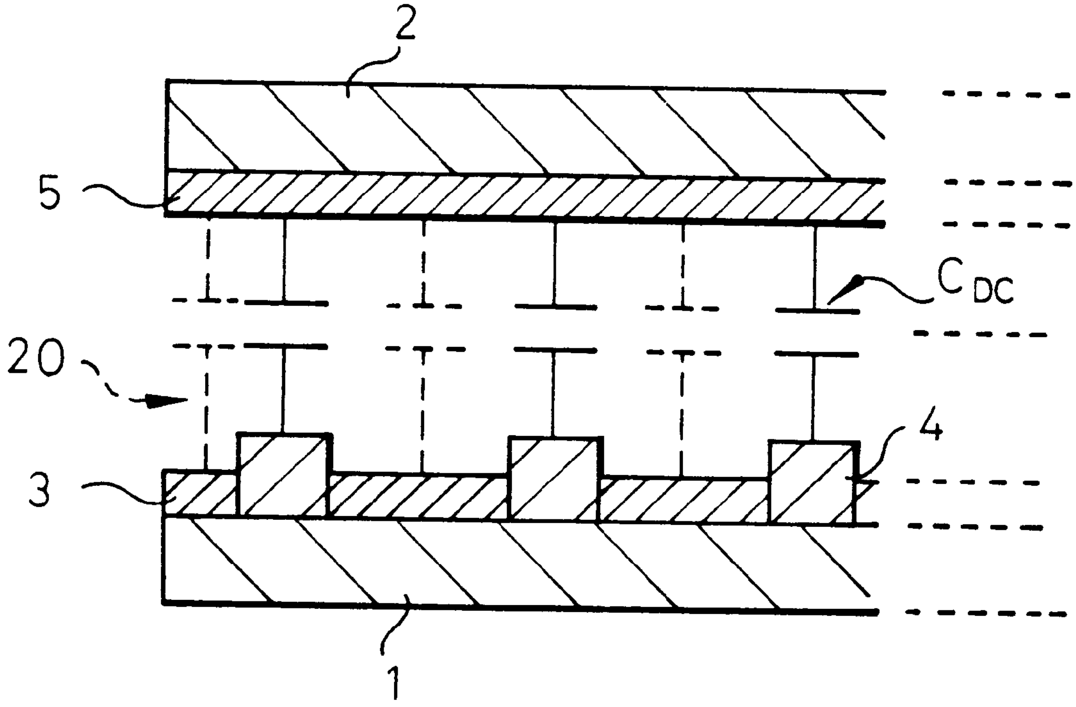
FIG. 1 shows an LCD according to a first embodiment of a first aspect of the present invention.

FIG. 1 shows an LCD according to a first embodiment of a first aspect of the present invention.

In the figure, numeral 1 is a TFT substrate, 2 is an opposite substrate, 3 is a scan bus line (a gate bus line), 4 is a data bus line, 5 is a common electrode, 20 is a liquid crystal layer, and $C_{DC}$ is parasitic capacitance. This LCD differs from the conventional LCD of FIG. 12 in that it corrects a distorted waveform by applying a voltage VG to a given scan bus line 3 that is capacitively coupled with the common electrode 5, during an unselected period of the scan bus line 3. The polarity of the voltage VG is opposite to that of a data voltage VD applied to the data bus line 4.

Figure 2:
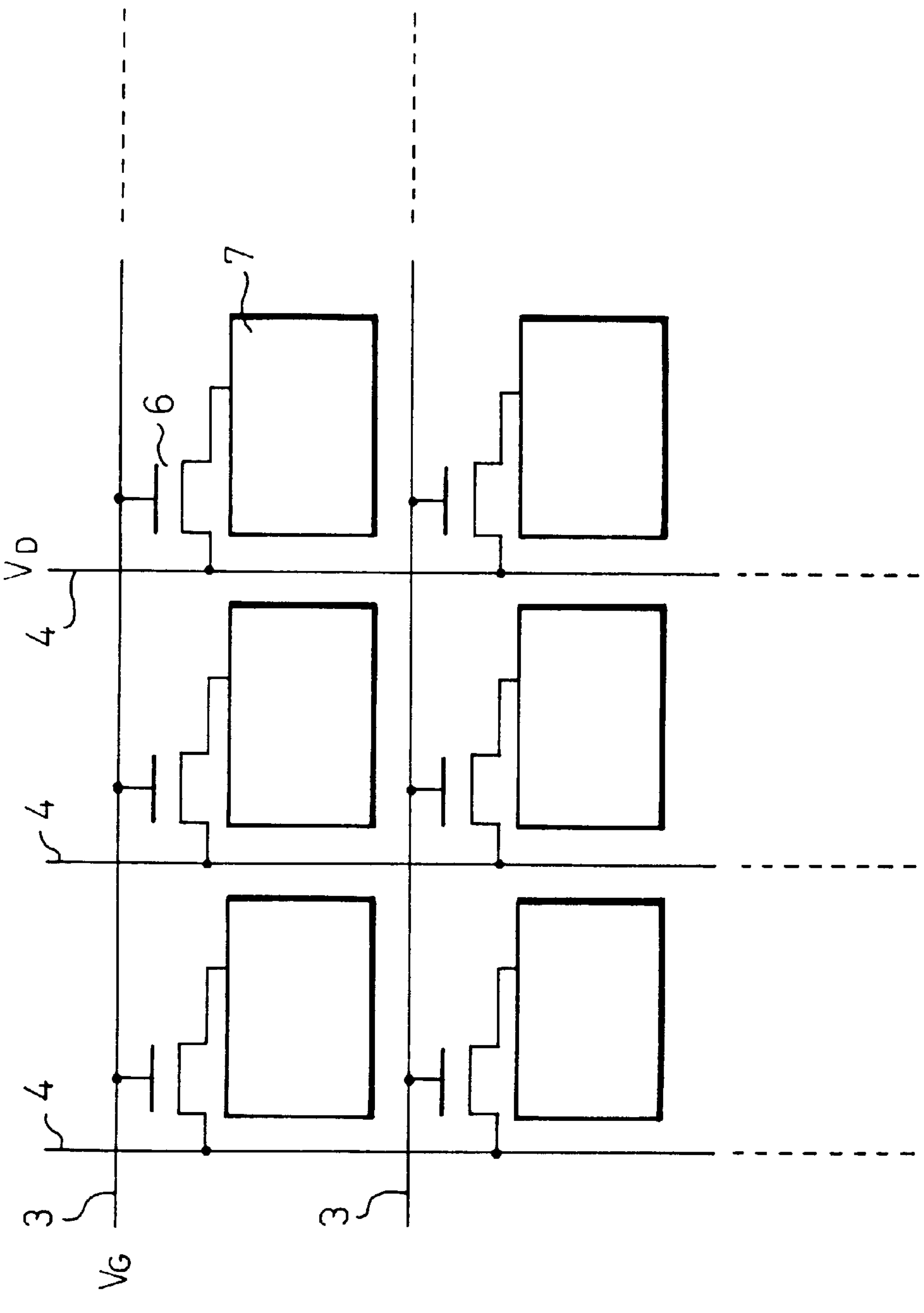
FIG. 2 shows an arrangement of the LCD of FIG. 1.

FIG. 2 shows an arrangement of the TFT substrate 1 of the LCD of FIG. 1. This LCD is an opposed type active matrix LCD. The scan bus lines 3 and data bus lines 4 cross each other on the TFT substrate 1. At each intersection of the scan bus line 3 and data bus line 4, a TFT 6 is connected to the lines 3 and 4, to control a display electrode 7. The liquid crystal layer 20 is inserted between the display electrodes 7 on the TFT substrate 1 and the common electrode 5 on the opposite substrate 2, to define a matrix of liquid crystal cells (pixels).

Figure 3:
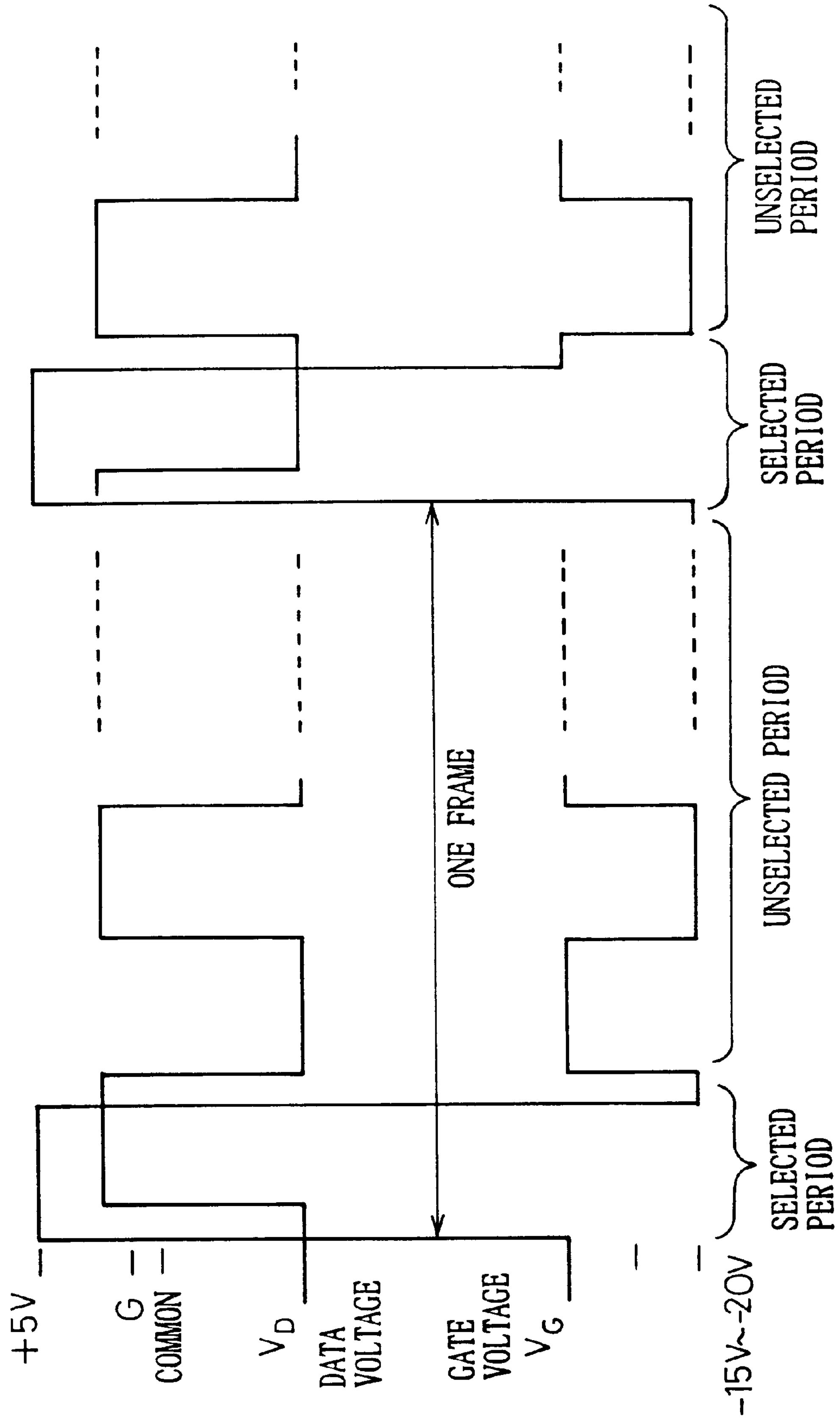
FIG. 3 shows waveforms for driving the LCD of FIGS. 1 and 2.

FIG. 3 shows waveforms for driving the LCD of FIGS. 1 and 2. A voltage VG is applied to unselected ones of the scan bus lines 3. The polarity of the voltage VG is opposite to that of a data voltage VD applied to the data bus line 4. A given one of the scan bus lines 3 may be selected to write data to the cells of the scan bus line. When the scan bus lines 3 are unselected, the correction voltage VG is applied thereto. As shown in FIG. 3, the voltage VG is based on a gate OFF voltage and has an opposite polarity to the data voltage VD applied to the data bus line 4.

The scan bus lines 3 are capacitively coupled with the common electrode 5 as shown in FIG. 1. The voltage VG whose polarity is opposite to the data voltage VD is applied to the scan bus lines 3, to cancel distortion of the common voltage. As explained with reference to FIG. 13, the distortion of the common voltage occurs whenever the data voltage rises and falls, due to the parasitic capacitance $C_{DC}$ between the data bus line 4 and the common electrode 5. If the amplitude of the correction voltage interferes with the switching operation of the TFT 6, it is necessary to decrease the amplitude of the correction voltage.

When the polarity of the data voltage is inverted between adjacent horizontal scan lines, the common voltage will be distorted by 2 to 3 volts in displaying black with the same polarity. This is caused by the parasitic capacitance $C_{DC}$ between each data bus line 4 and the common electrode 5 and the resistive component of the common electrode 5. The distortion occurs when the data voltage rises and falls. To cancel the distortion, a correction voltage having an opposite polarity to the data voltage is applied to the scan bus lines 3.

It is a complicated process, however, to prepare a correction voltage suitable for each cell because the data voltage differs from cell to cell depending on data to be displayed. If the correction voltage is determined according to a data voltage for displaying white or black, the correction voltage will be too small or too large for other color levels, thereby adversely affecting an effective voltage applied to each cell.

Accordingly, a proper correction voltage according to the present invention may be an average of a data voltage for displaying white and a data voltage for displaying black, or a voltage having an amplitude in a range of +/−3 to 4 volts around a central voltage that is slightly closer to the voltage for displaying white with respect to the average. Such a correction voltage is able to eliminate the distortion of the common voltage when displaying white. In this case, the common voltage may be slightly distorted when displaying black. Luminance in displaying dark colors, however, does not greatly change in response to a voltage increase, so that the distortion will not greatly affect the luminance of the black.

Figure 4:
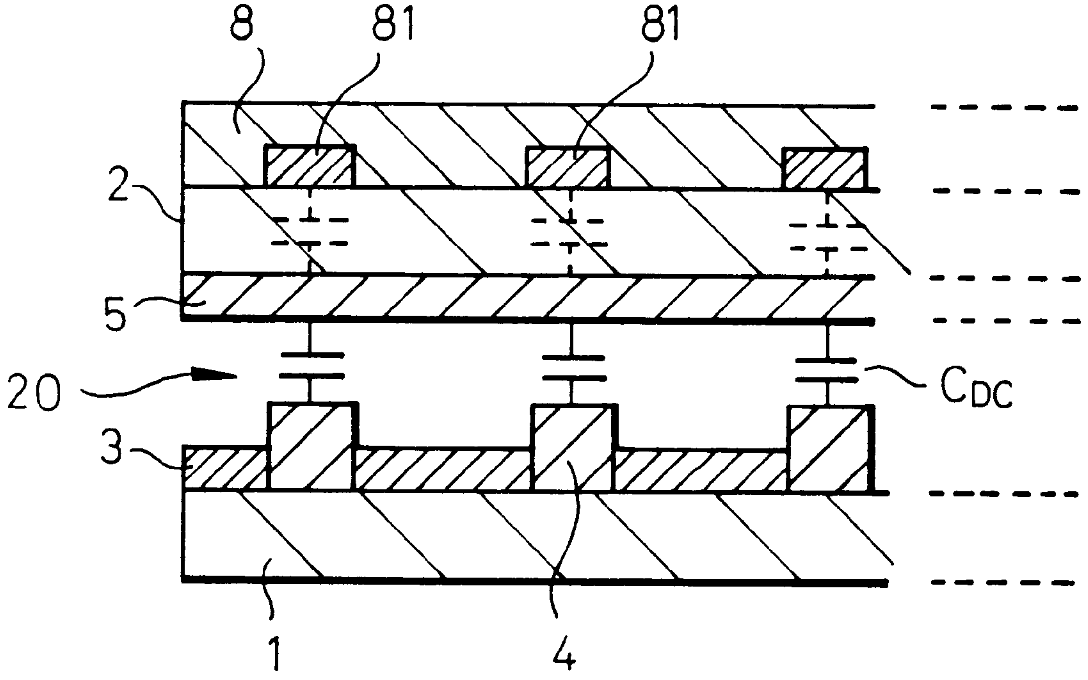
FIG. 4 shows an LCD according to a second embodiment of the first aspect of the present invention.
Figure 5:
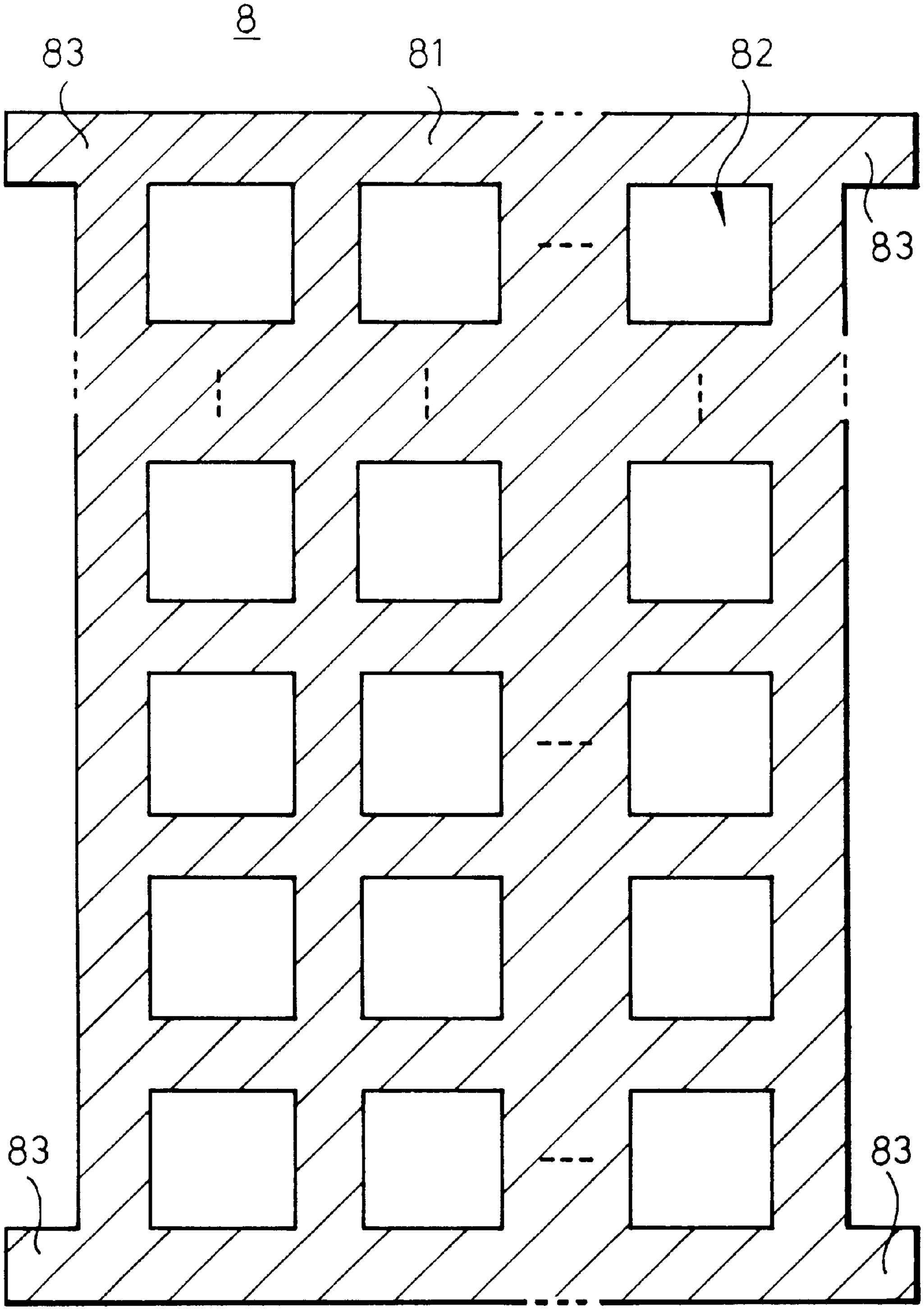
FIG. 5 shows a color filter of the LCD of FIG. 4.

FIG. 4 shows an LCD according to a second embodiment of the first aspect of the present invention, and FIG. 5 shows an example of a color filter of the LCD of FIG. 4. In the figures, numeral 8 is the color filter, 81 is an electrically conductive shielding film (black matrix), and 82 is a window corresponding to a display electrode. The shielding film 81 is formed on an opposite substrate 2 and is capacitively coupled with a common electrode 5 with the opposite substrate 2 interposing between them.

In FIG. 4, a correction voltage of, for example, about +/−3 to 4 having an opposite polarity to a data voltage applied to a data bus line 4 is applied to the shielding film 81 of the color filter 8 that is capacitively coupled with the common electrode 5, to cancel distortion of a common voltage applied to the common electrode 5. In FIG. 5, each corner of the shielding film 81 has a projection 83 to which the correction voltage is externally applied.

Figure 6:
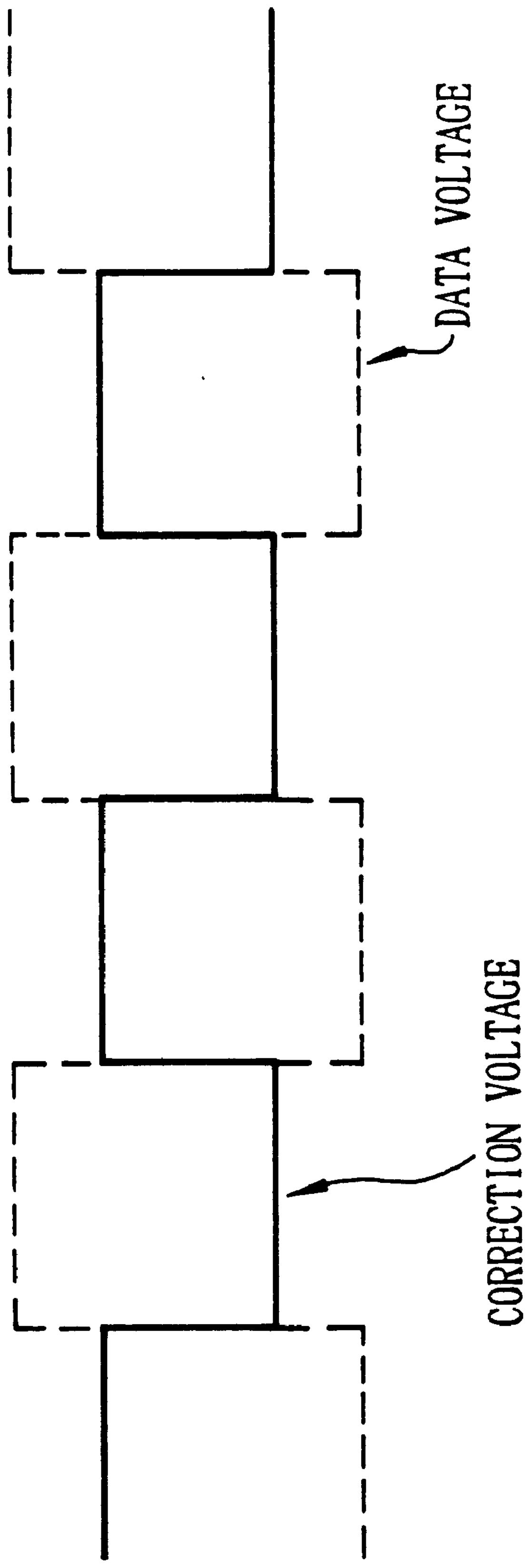
FIG. 6 shows waveforms for driving the LCD of FIGS. 4 and 5.

FIG. 6 shows waveforms for driving the LCD of FIGS. 4 and 5. The correction voltage applied to the shielding film 81 has an opposite polarity to a data voltage applied to the data bus line 4.

Figure 7:
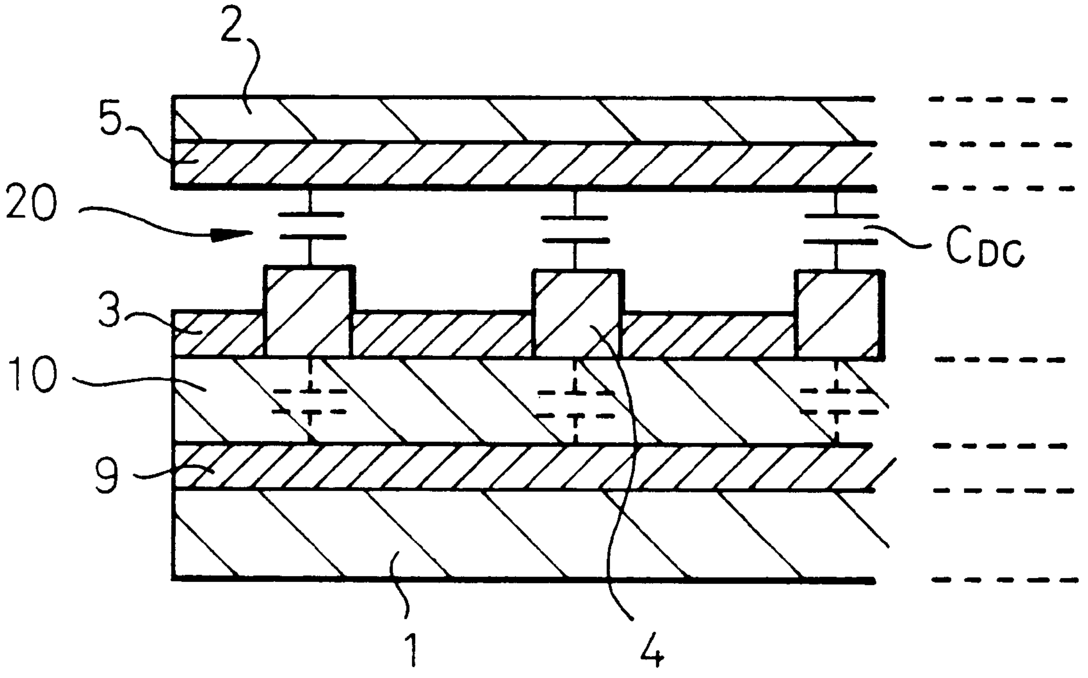
FIG. 7 shows an LCD according to a third embodiment of the first aspect of the present invention.

FIG. 7 shows an LCD according to a third embodiment of the first aspect of the present invention. A supplemental electrode 9 is formed on a TFT substrate 1 and is capacitively coupled with data bus lines 4 through an insulation layer 10. The supplemental electrode 9 receives a correction voltage whose polarity is opposite to that of a data voltage applied to one of the data bus lines 4.

Figure 8:
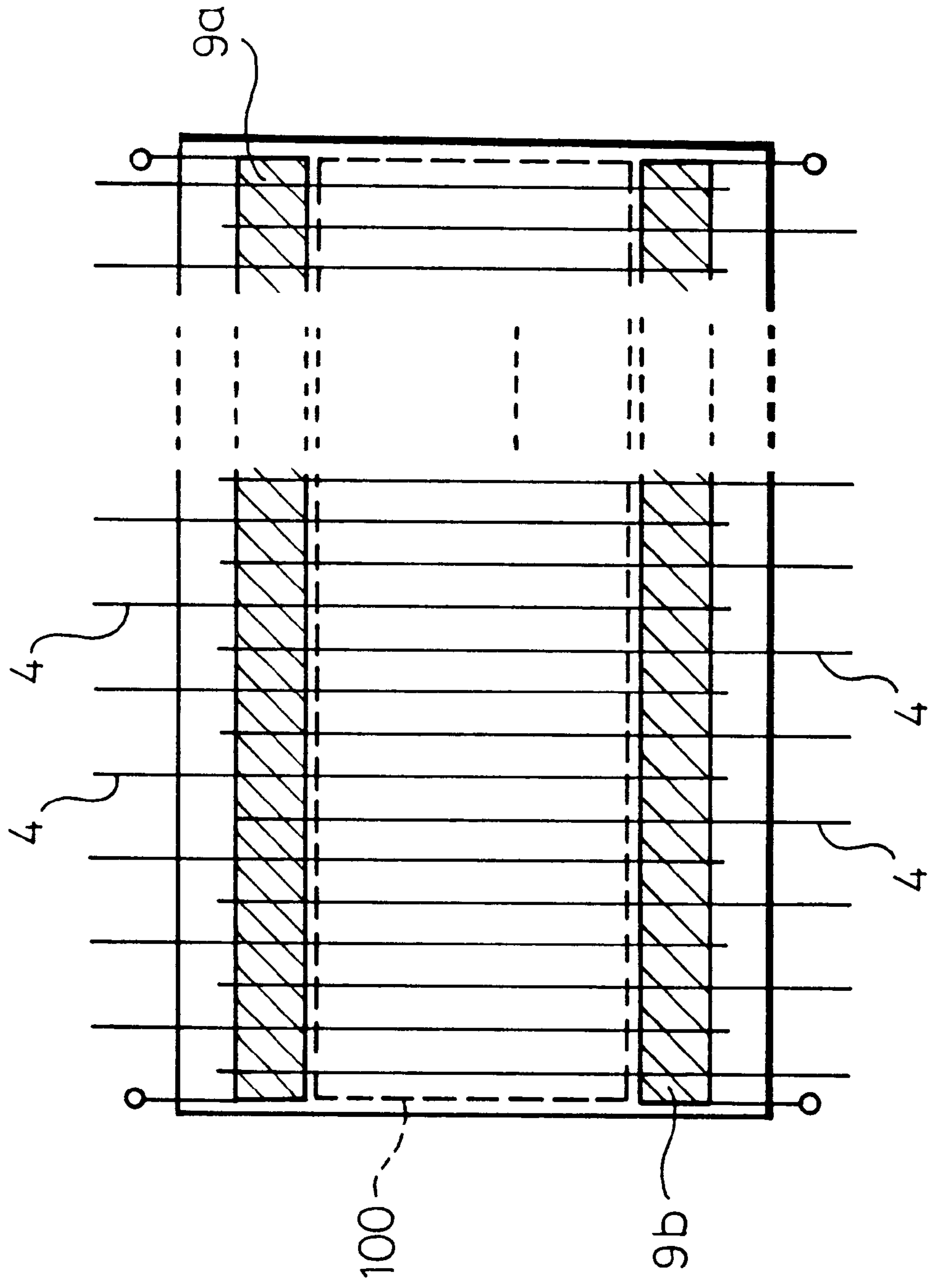
FIG. 8 shows an arrangement of the LCD of FIG. 7.

FIG. 8 shows an arrangement based on the LCD of FIG. 7. Supplemental electrodes 9*a* and 9*b* are disposed at upper and lower parts of a liquid crystal panel 100 which contains many liquid crystal cells. The supplemental electrodes 9*a* and 9*b* receive a correction voltage whose polarity is opposite to that of a data voltage applied to a data bus line 4.

Figure 9:
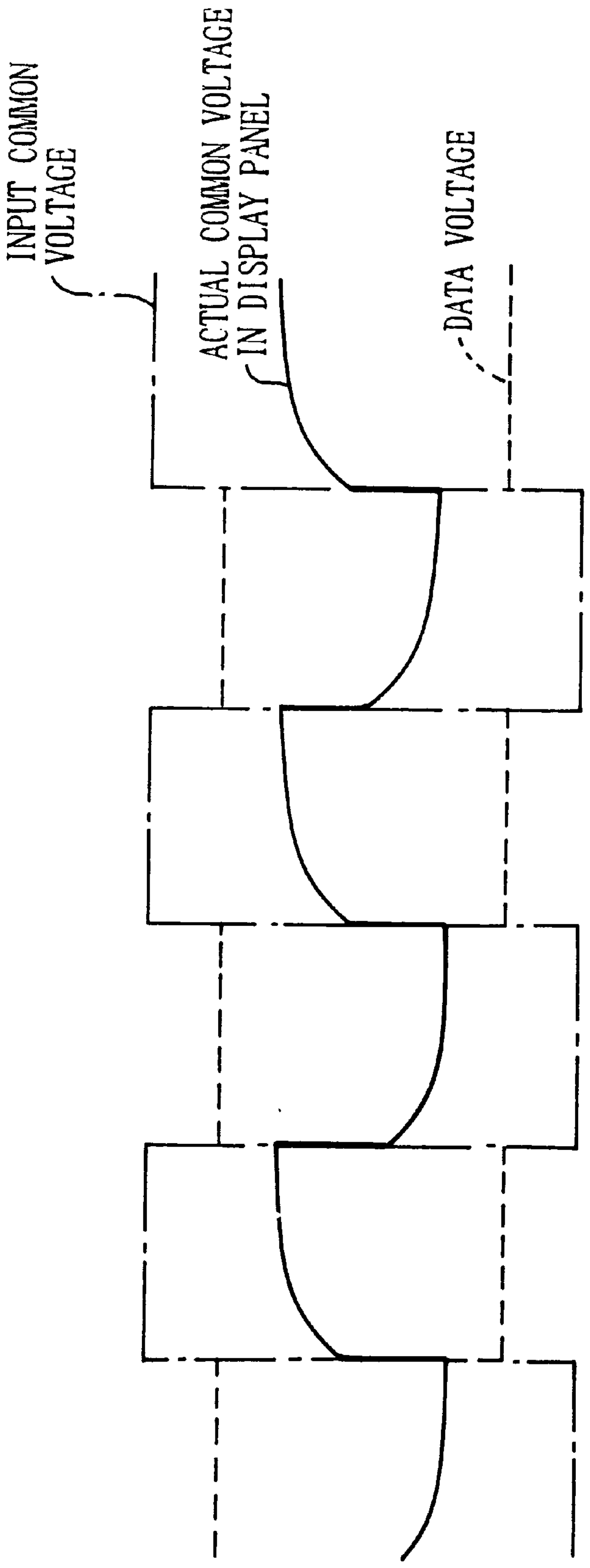
FIG. 9 shows waveforms for driving the LCD of FIGS. 7 and 8.

FIG. 9 shows waveforms for driving the LCD of FIGS. 7 and 8. When a correction voltage, whose polarity is opposite to that of a data voltage applied to a given data bus line 4, is applied to the supplemental electrodes 9*a* and 9*b*, distortion of a common voltage applied to the common electrode 5 in the display panel is corrected.

Figure 10:
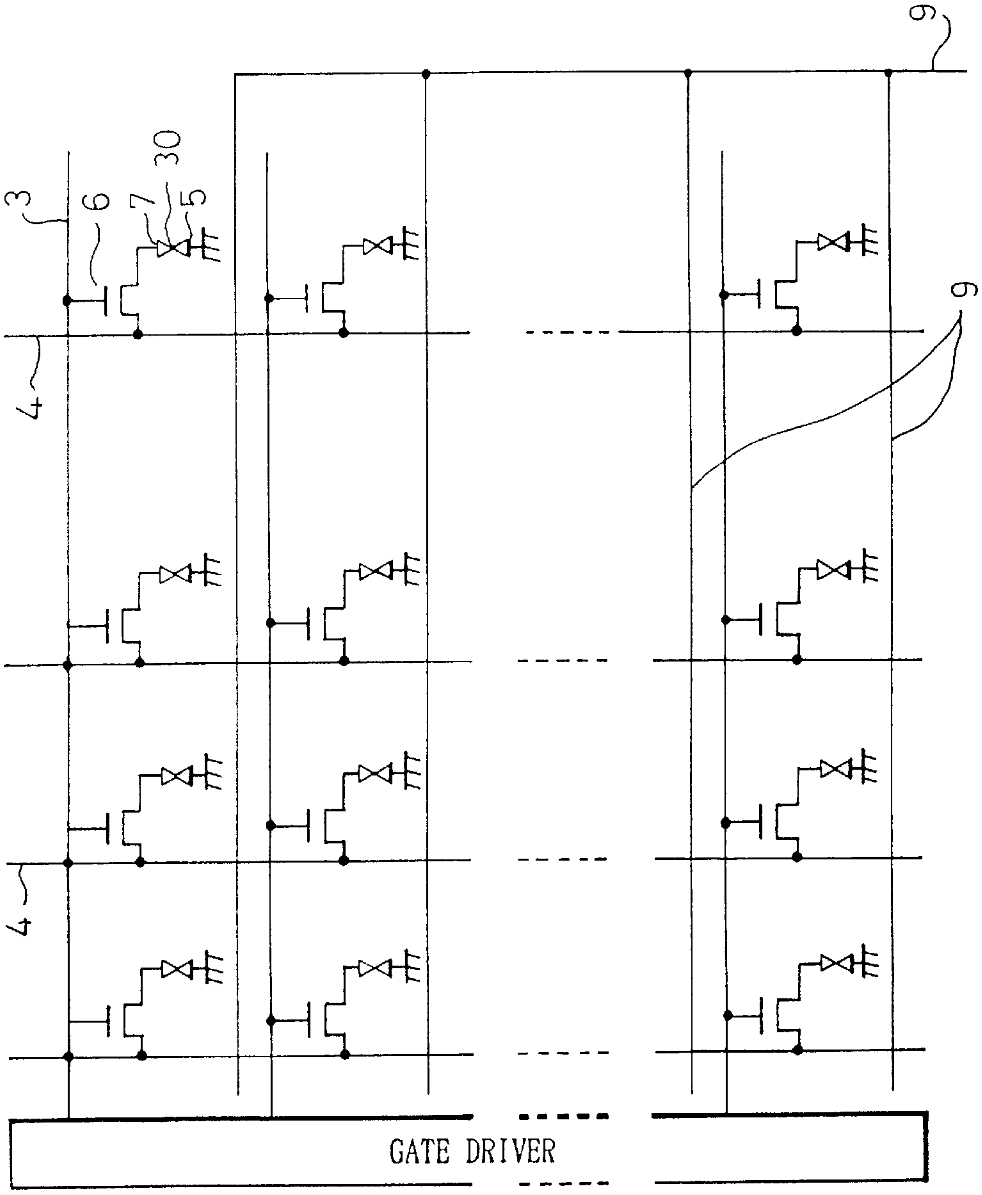
FIG. 10 shows an LCD according to a modification of the embodiment of FIGS. 7 to 9.

FIG. 10 shows an LCD according to a modification of the embodiment of FIGS. 7 to 9. A supplemental electrode 9 is arranged between each pair of adjacent rows of liquid crystal cells. Unlike the embodiment of FIG. 9 in which the supplemental electrodes 9*a* and 9*b* are disposed only at upper and lower parts of the LCD panel 100, the modification of FIG. 10 arranges the supplemental electrode 9 along each row of liquid crystal cells, to uniformly correct distortion of a common voltage over the whole face of the LCD panel 100.

Other than the arrangement of FIG. 10, the supplemental electrodes may be arranged in various ways.

Figure 11:
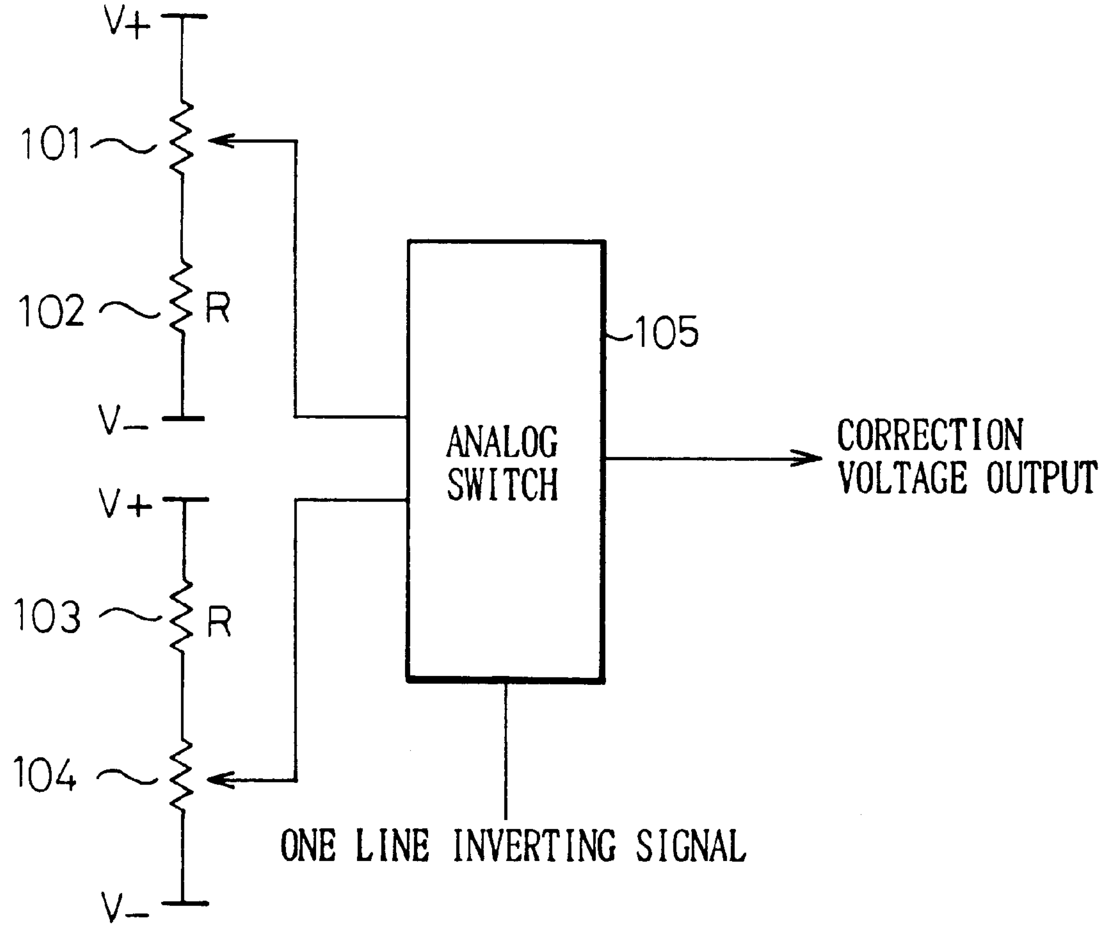
FIG. 11 shows a correction voltage generator of the LCD according to the first aspect of the present invention.

FIG. 11 shows a correction voltage generator of a LCD according to the first aspect of the present invention. The correction voltage generator generates a correction voltage to be applied to the scan bus lines 3, or to the shielding film 81 of the color filter 8, or to the supplemental electrodes 9, 9*a*, and 9*b*. The correction voltage generator includes resistors 102 and 103, variable resistors 101 and 104, and an analog switch 105, to generate a correction voltage having predetermined positive and negative potential values.

Still other modifications will be possible to the LCDs according to the embodiments of the present invention. The present invention is also applicable to opposed type active matrix LCDs and other types of LCDs employing different driving systems.

Figure 20A:
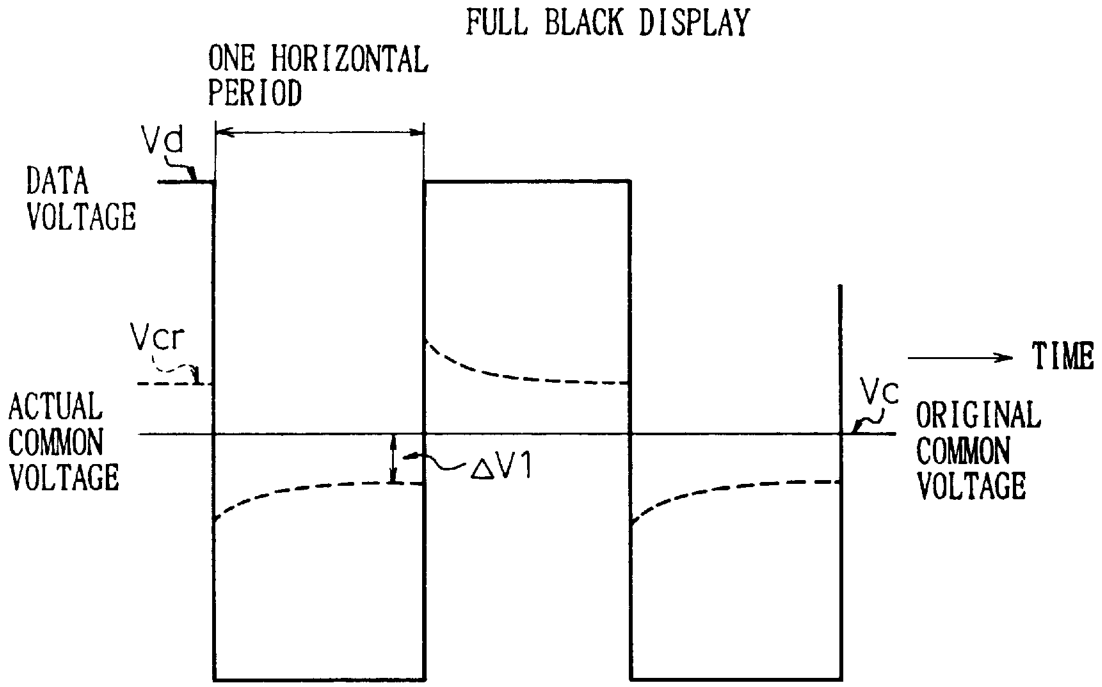
Fig.20A (PRIOR ART)
FIGS. 20A and 20B show waveforms for driving an LCD according to a prior art.
Figure 20B:
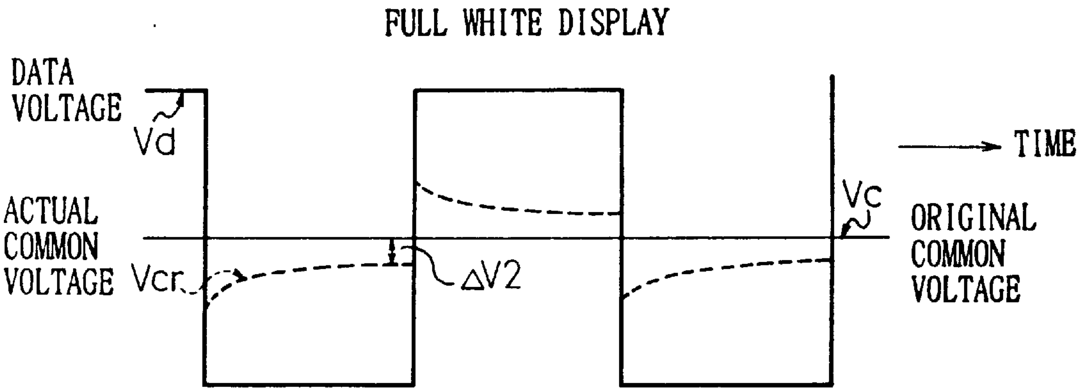
Fig.20B (PRIOR ART)

FIGS. 20A and 20B show examples of waveforms for driving a conventional LCD, in which FIG. 20A shows the case of a full black display, and FIG. 20B shows the case of a full white display. In the figures, the polarity of a data voltage Vd is inverted every scan line.

Whenever the data voltage Vd rises and falls, a common voltage Vc that must be constant is distorted (ΔV1, ΔV2) as indicated with dotted lines due to parasitic capacitance between data electrodes and a common electrode. Namely, the parasitic capacitance, etc., decreases the voltage applied to each cell, i.e., a voltage between a given data electrode and the common electrode. In addition, a resistive component of the common electrode prevents the common voltage from restoring its original value at the end of a horizontal scan period when TFTs are turned OFF.

When displaying black in many cells on a scan line, the data voltage varies widely to greatly distort the common voltage Vc by ΔV1 to an actual common voltage Vcr, as shown in FIG. 20A. On the other hand, when displaying white in many cells on a scan line, the distortion will be small as indicated by ΔV2 in FIG. 20B.

Figure 21:
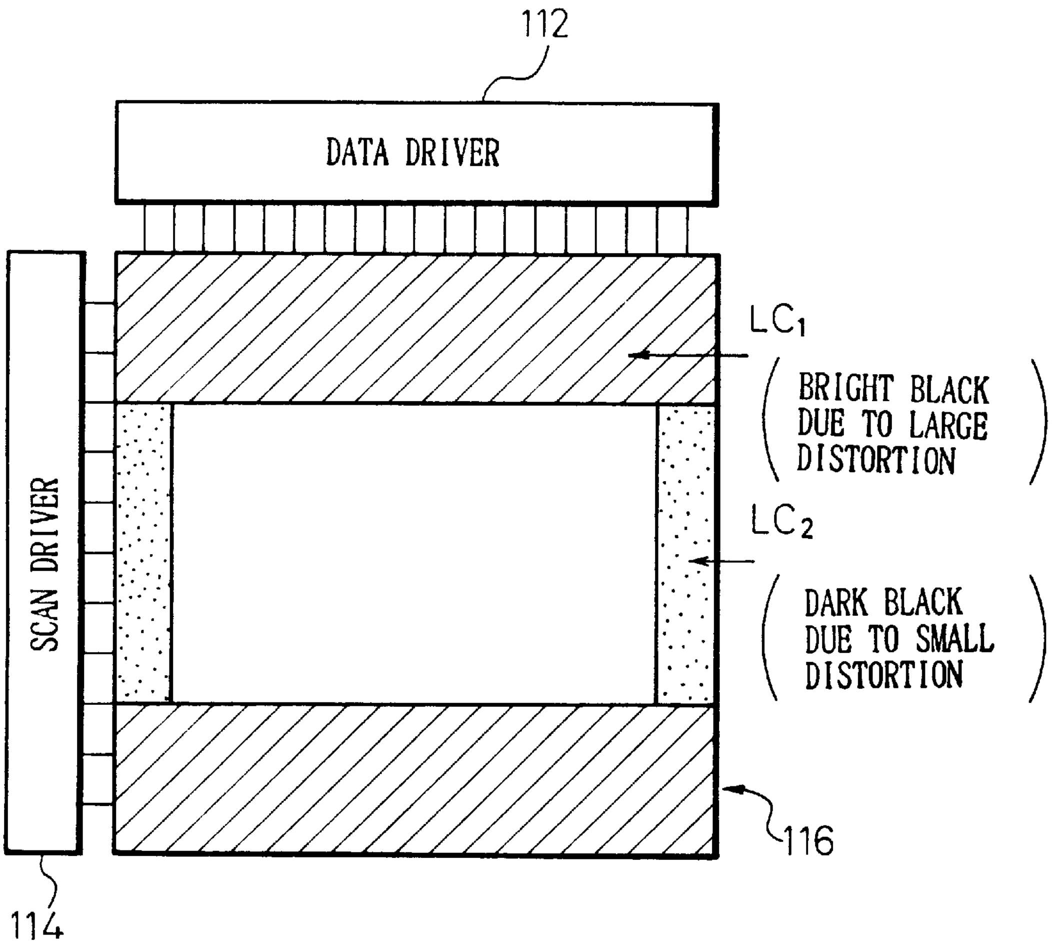
Fig.21 (PRIOR ART)
FIG. 21 explains the problems of the LCD of the prior art.

FIG. 21 explains the problems of a conventional LCD. Numeral 112 is a data driver (digital data driver), 114 is a scan driver, and 116 is a liquid crystal panel.

When most of liquid crystal cells (pixels) LC1 display black and only a few of them display white, the cells LC1 receive a smaller voltage because the distortion ΔV1 for black of the common voltage Vcr is large. As a result, those of the liquid crystal cells LC1 that display black, display a brighter black. On the other hand, when most of liquid crystal cells LC2 display white and only a few of them display black, the cells LC2 receive a larger voltage because the distortion ΔV2 for white of the common voltage Vcr is small. As a result, those of the liquid crystal cells LC2 that display black, display a darker black, compared with those of the liquid crystal cells LC1.

In this way, the conventional LCD causes crosstalk which makes the brightness of the same data differ from cell to cell, thereby deteriorating the display quality of the LCD. This problem of the crosstalk becomes serious when displaying images with many intensity levels achieved with small voltage differences, or when employing a large-sized screen in which the influence of the resistance of a common electrode is not ignorable.

Figure 14A:
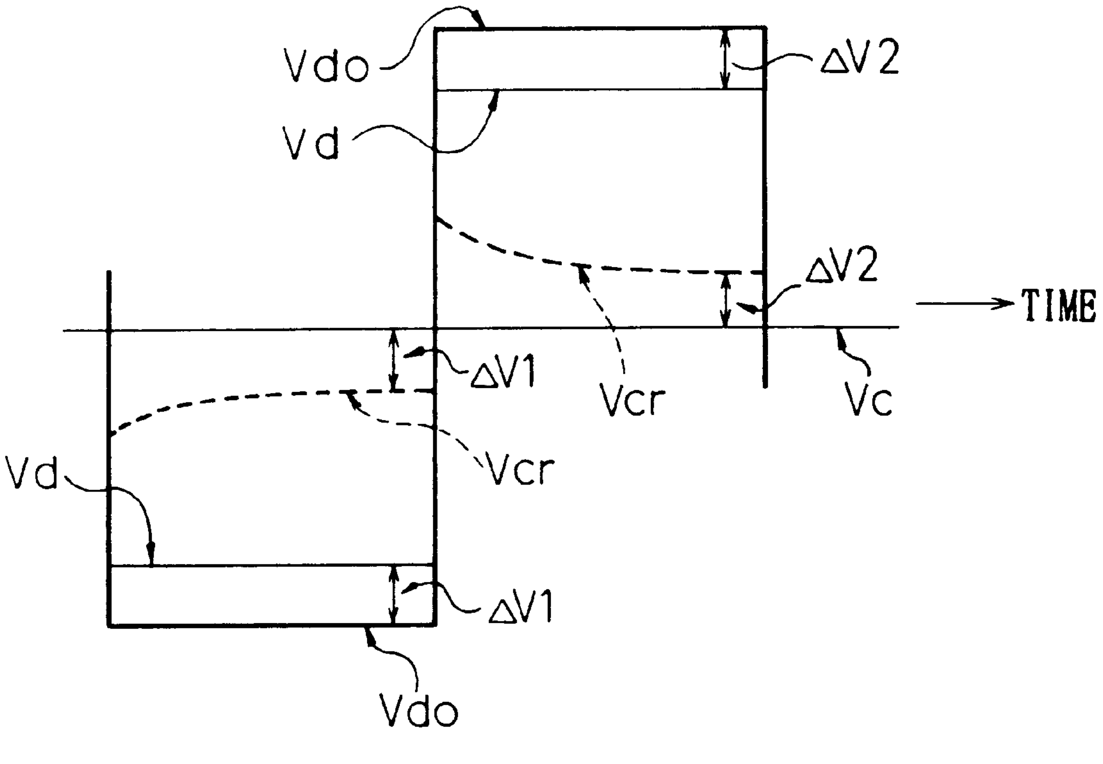
FIGS. 14A and 14B show waveforms explaining the principle of an LCD driving method according to the present invention.
Figure 14B:
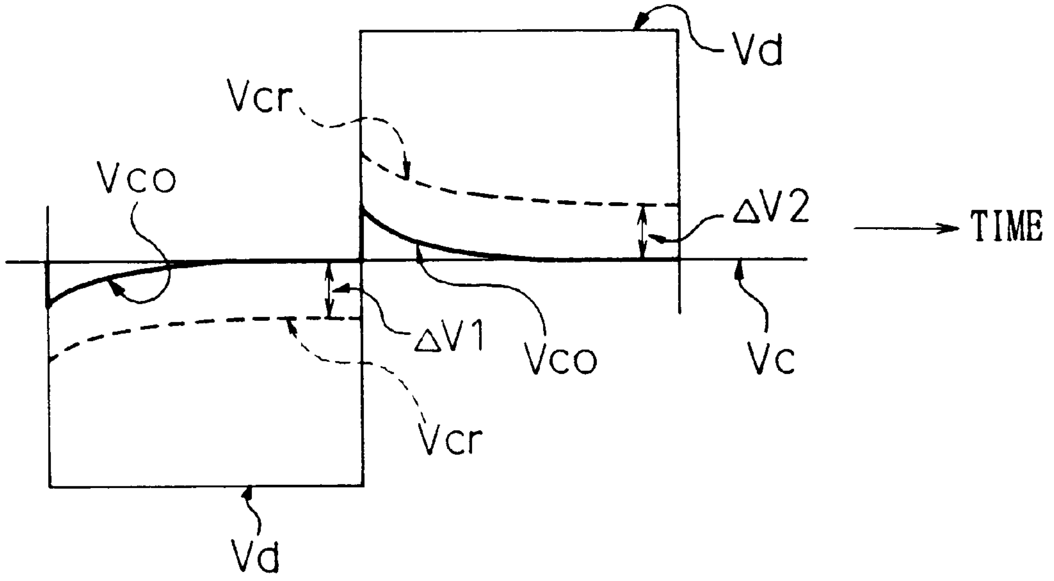

FIGS. 14A and 14B are waveforms explaining the principle of an LCD driving method according to the present invention. FIG. 14A is a case of correcting a data voltage, and FIG. 14B is a case of correcting a common voltage.

In FIG. 14A, a data voltage is corrected by ΔV1 or ΔV2 depending on distortion of an actual common voltage. If a given scan line fully displays black, the voltage ΔV1 corresponding to distortion of the common voltage in displaying black is added to an original data voltage Vd, to cancel the distortion ΔV1 and restore an original potential difference between the data voltage and the common voltage.

Similarly, if a scan line fully displays white, the voltage ΔV2 corresponding to distortion of the common voltage in displaying white is added to the original data voltage Vd to cancel the distortion ΔV2 and restore the original potential difference between the data voltage and the common voltage.

If a scan line displays a mixture of black and white, a voltage corresponding to distortion of the common voltage in displaying gray is calculated according to a ratio of black and white, and the calculated voltage is added to the original data voltage Vd.

The voltages ΔV1 and ΔV2 corresponding to distortion of the common voltage Vc are determined according to display data of first and second scan lines. More specifically, a weighting value for the first scan line is added to a weighting value for the second scan line to be selected after the first scan line, and the sum of the weighting values is used to change the original data voltage Vd to a corrected data voltage Vdo to cancel the distortion (ΔV1, ΔV2) of the common voltage.

FIG. 14B shows the case of correcting a common voltage by ΔV1 or ΔV2 according to distortion of the common voltage. If a scan line fully displays black, an original common voltage Vc is decreased by ΔV1 corresponding to full-black distortion, to restore an original potential difference between a data voltage and the common voltage. If a scan line fully displays white, the original common voltage Vc is decreased by ΔV2 corresponding to full-white distortion, to restore the original potential difference between a data voltage and the common voltage.

In this way, the second LCD driving method according to the present invention actually applies a common voltage Vco instead of a common voltage Vcr. The common voltage Vco is indicated with a continuous line and the common voltage Vcr is indicated with a dotted line in FIG. 14B. The voltage Vco is approximately equal to the original common voltage Vc. If a scan line displays a mixture of black and white, a value to be subtracted from the original common voltage Vc to cancel the distortion of the common voltage is determined according to a ratio of black and white in the scan line.

As explained above, the values ΔV1 and ΔV2 corresponding to distortion of the common voltage Vc are determined according to display data of first and second scan lines. More specifically, a weighting value for the first scan line is added to a weighting value for the second scan line to be selected after the first scan line. The sum of the weighting values is used to cancel the distortion (ΔV1, ΔV2) of the common voltage and change the distorted common voltage to the original common voltage Vco.

In this way, the methods of driving an LCD according to the present invention correct a data voltage or a common voltage to cancel distortion of the common voltage whenever a scan electrode is selected. This results in applying an originally required voltage to liquid crystal cells, to thereby prevent crosstalk and improve the display quality of the LCD.

FIGS. 15A and 15B to 19A and 19B are block diagrams showing LCDs according to first to fifth embodiments of a second aspect of the present invention. In the figures, numeral 101 is a personal computer, 102 and 118 are ROMs, 103, 107, 110, 117, 124, and 125 are adders, 104, 105, and 106 are latch circuits, 109 is a switch, 111 is a power source circuit for providing a data voltage, 112 is a digital data driver, 113 is a power source circuit for providing a scan voltage, 114 is a scan driver, 115 is a power source circuit for providing a common voltage, 116 is an liquid crystal panel, 119 and 122 are counters, and 120 is a line memory.

Figures 15, 15A:
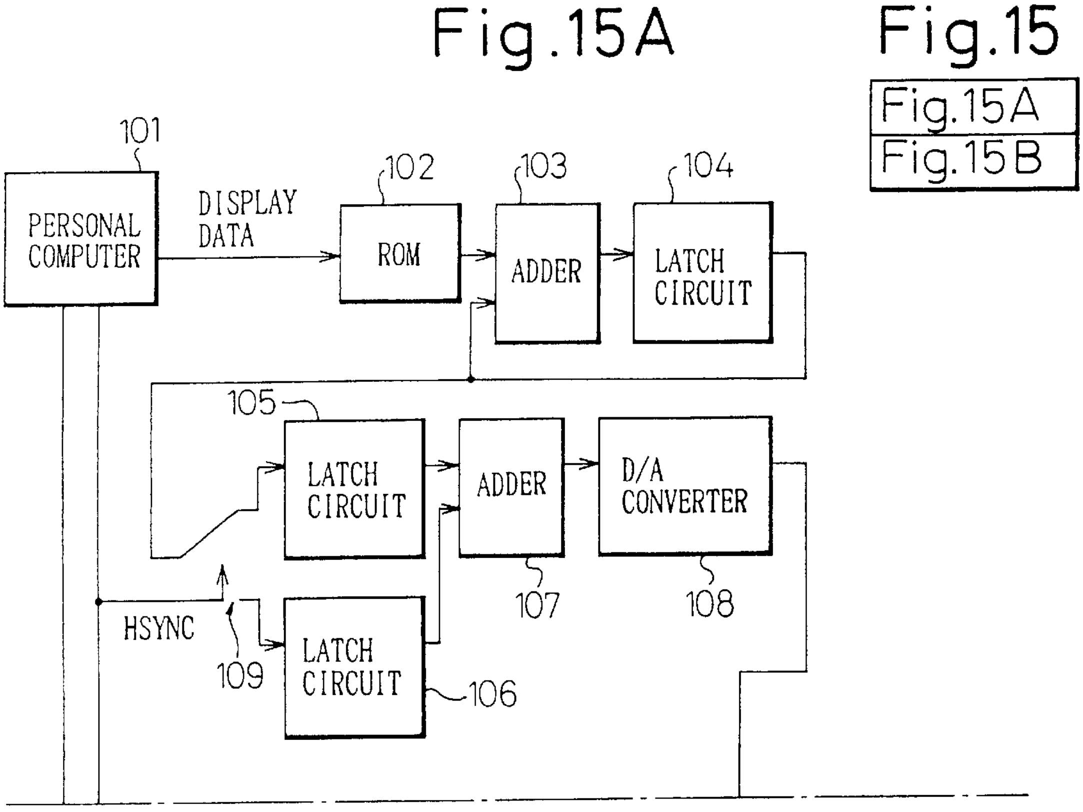
FIGS. 15A and 15B show an LCD according to a first embodiment of a second aspect of the present invention.
Figure 15B:
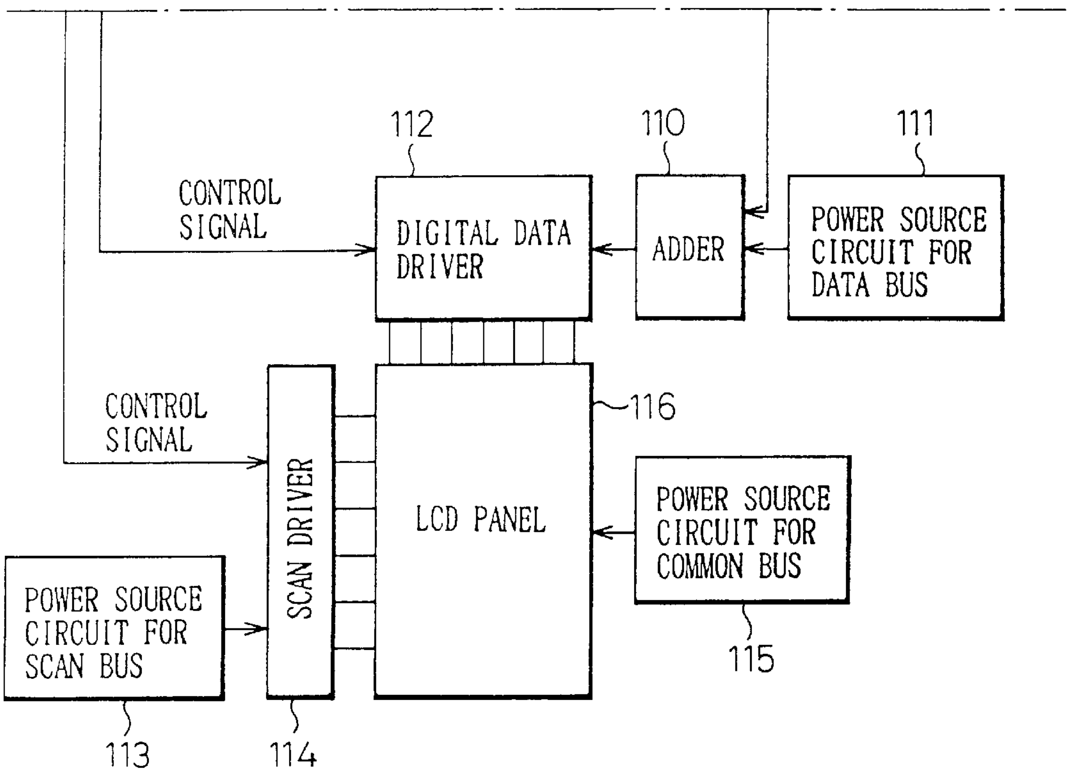

In the first embodiment of the second aspect of the present invention of FIGS. 15A and 15B, the ROM 102 carries out a weighting process on display data from the personal computer 101. For example, this weighting process converts the display data such that the adder 103 will carry out an addition only on data for displaying black. The weighted display data is supplied to the adder 103, which adds the data to the previous data from the latch circuit 104, to thereby accumulate data for a line.

The accumulation of data for a line provides a weighting value for the line. The weighting value is transferred from the latch circuit 104 to one of the latch circuits 105 and 106 selected by the switch 109. The switch 109 is switched every scan line in response to a horizontal synchronous signal HSYNC. For example, when the latch circuit 105 latches a weighting value for a first line from the latch circuit 104, the latch circuit 106 latches a weighting value for a second line from the latch circuit 104. Thereafter, the latch circuit 106 latches a weighting value for a third line from the latch circuit 104. In this way, when one of the latch circuits 105 and 106 holds a weighting value for a first scan line, the other latch circuit holds a weighting value for a second scan line. The weighting values in the latch circuits 105 and 106 are added to each other in the adder 107.

An output of the adder 107 is converted by the D/A converter 108, and the converted data is supplied to the adder 110. The adder 110 adds the data to a data voltage output of the power source circuit 111, and the sum is supplied to the digital data driver 112. In this way, the data voltage is corrected to cancel distortion of a common voltage. More specifically, as explained with reference to FIG. 14A, a weighting value for a first scan line is added to a weighting value for a second scan line, and a voltage corresponding to the sum of the weighting values is added to an original data voltage Vd, to increase a difference between the data voltage and the common voltage. The corrected data voltage Vdo is applied to liquid crystal cells (display electrodes) of each scan line. This results in cancelling distortion of the common voltage, reducing crosstalk, and improving the display quality of the LCD.

Figure 16A:
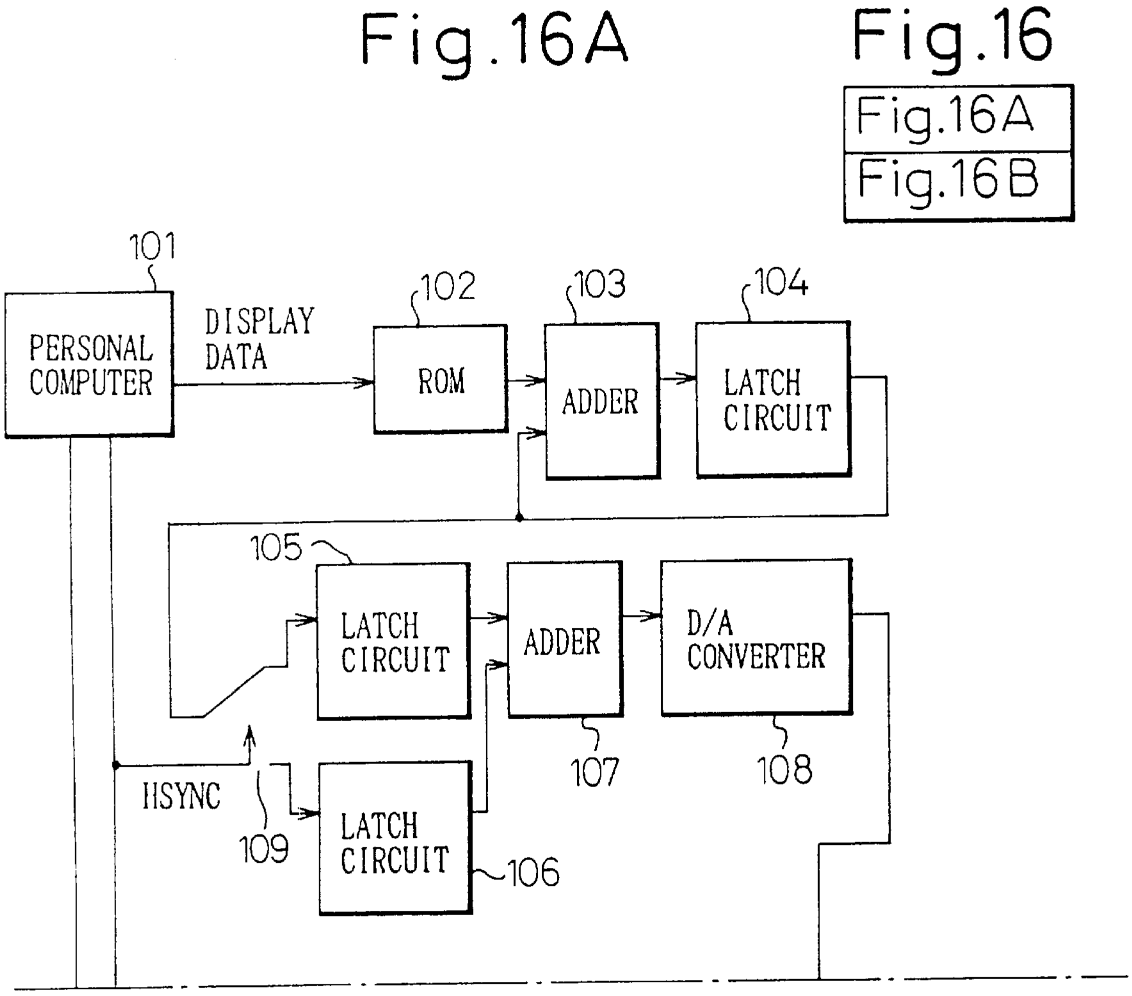
FIGS. 16A and 16B show an LCD according to a second embodiment of the second aspect of the present invention.
Figure 16B:
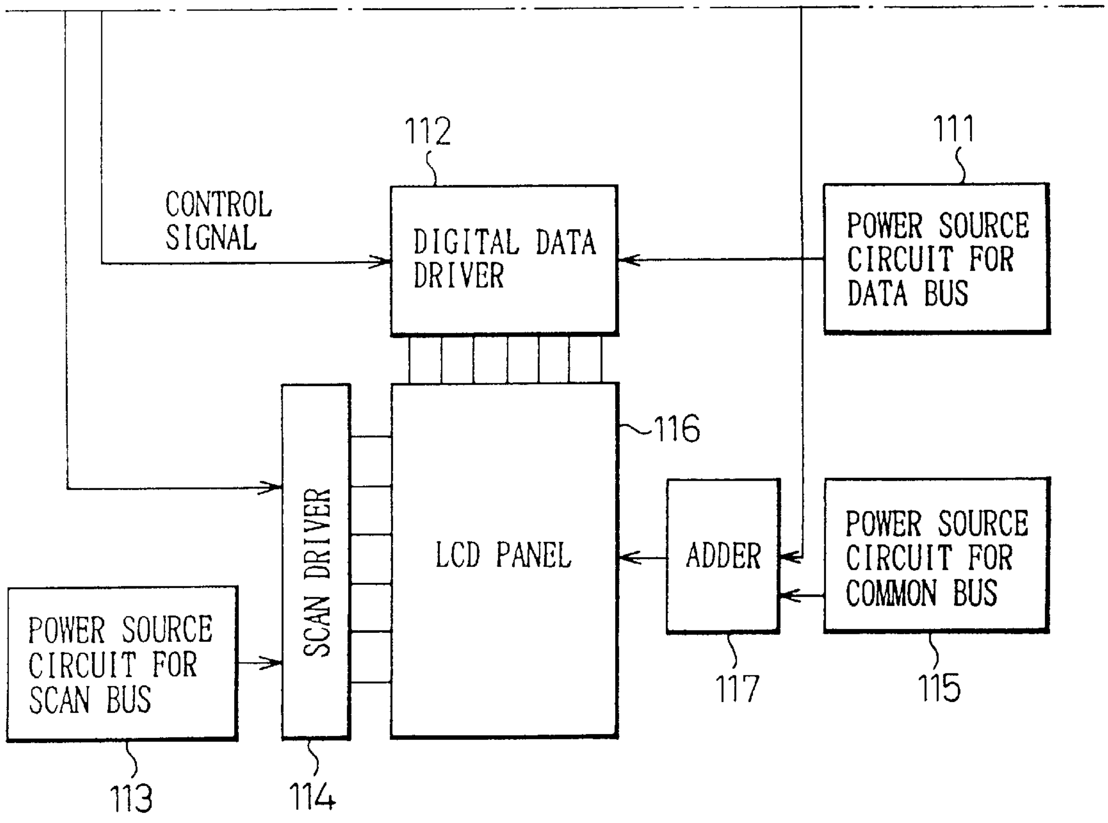

FIGS. 16A and 16B show an LCD according to the second embodiment of the second aspect of the present invention. This LCD is basically the same as that shown in FIGS. 15A and 15B. This embodiment corrects distortion of a common voltage by correcting the common voltage itself instead of correcting a data voltage. An adder 117 adds an output of a D/A converter 108 to a common voltage output of a power source circuit 115, and the sum is applied to a common electrode of a liquid crystal panel 116. More specifically, as explained with reference to FIG. 14B, a weighting value for a first scan line is added to a weighting value for a second scan line, and a voltage corresponding to the sum of the weighting values is added to an original common voltage Vcr, to provide a corrected common voltage Vco. This results in increasing a difference between the common voltage and a data voltage. The corrected common voltage Vco is applied to liquid crystal cells of each scan line through a common electrode, to thereby cancel the distortion of the common voltage.

Figures 17, 17A:
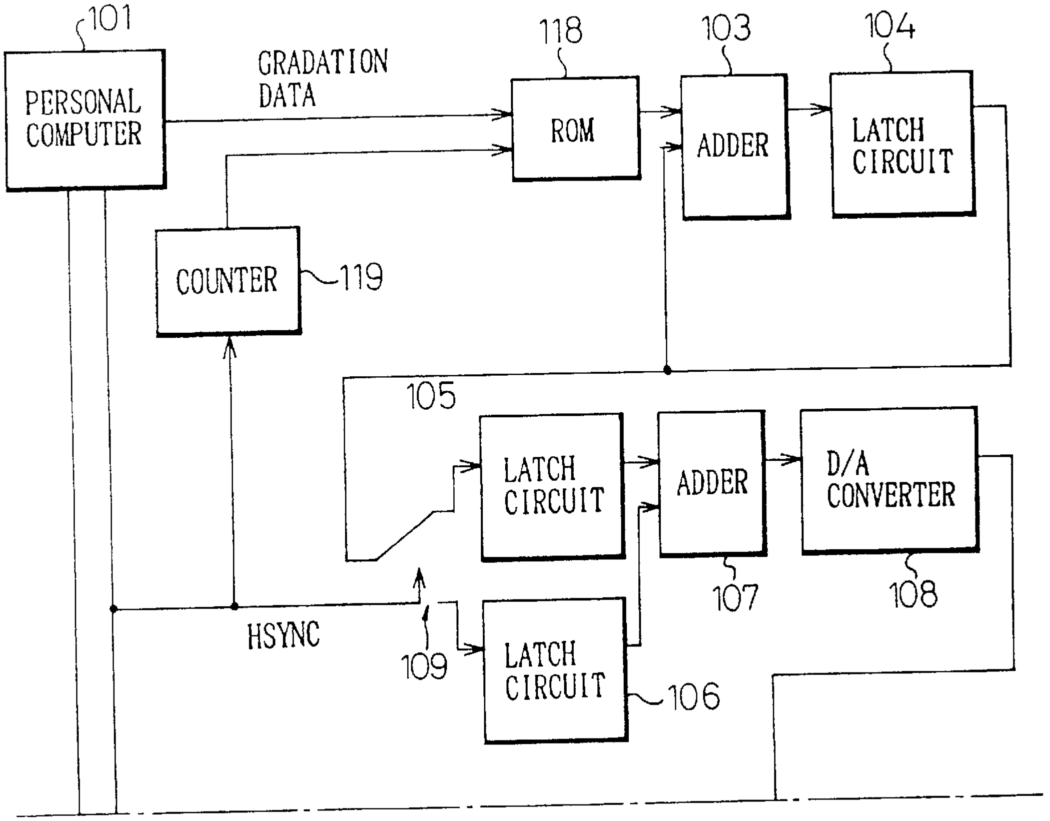
FIGS. 17A and 17B show an LCD according to a third embodiment of the second aspect of the present invention.
Figure 17B:
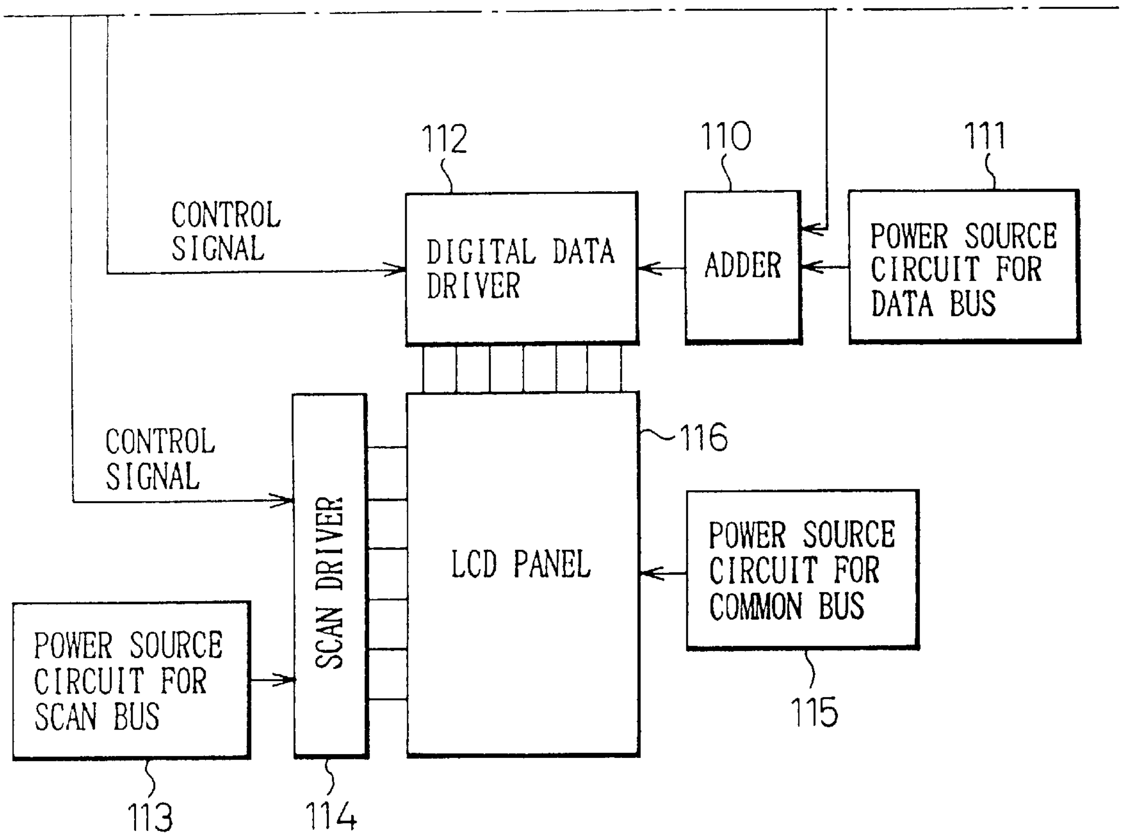

FIGS. 17A and 17B show an LCD according to the third embodiment of the second aspect of the present invention. The arrangement of this embodiment is basically the same as that of FIGS. 15A and 15B. This embodiment considers the influence of a resistive component of a common electrode, etc. A counter 119 counts pulses of a horizontal synchronous signal HSYNC, to determine the positions of presently selected scan and data electrodes. According to the positions, a ROM 118 adjusts a weighting value for display data. As a distance between an input end for a common voltage and a given scan electrode increases, distortion of the common electrode enlarges. Accordingly, the counter 119 provides the ROM 118 with the number of scanned electrodes, so that the ROM 118 may use the data as an element for determining a weighting value for display data.

In this way, the third embodiment weights display data according to a distance between an input end of a common voltage and each data electrode for supplying display data. This arrangement corrects fluctuations in voltages applied to liquid crystal cells, according to the positions of the cells on a display panel 116, to further improve the display quality of the LCD.

The first to third embodiments of the second aspect of FIGS. 15 to 17 employ the digital data driver 112. The fourth and fifth embodiments of FIGS. 18 and 19 employ an analog data driver 126.

Figures 18, 18A:
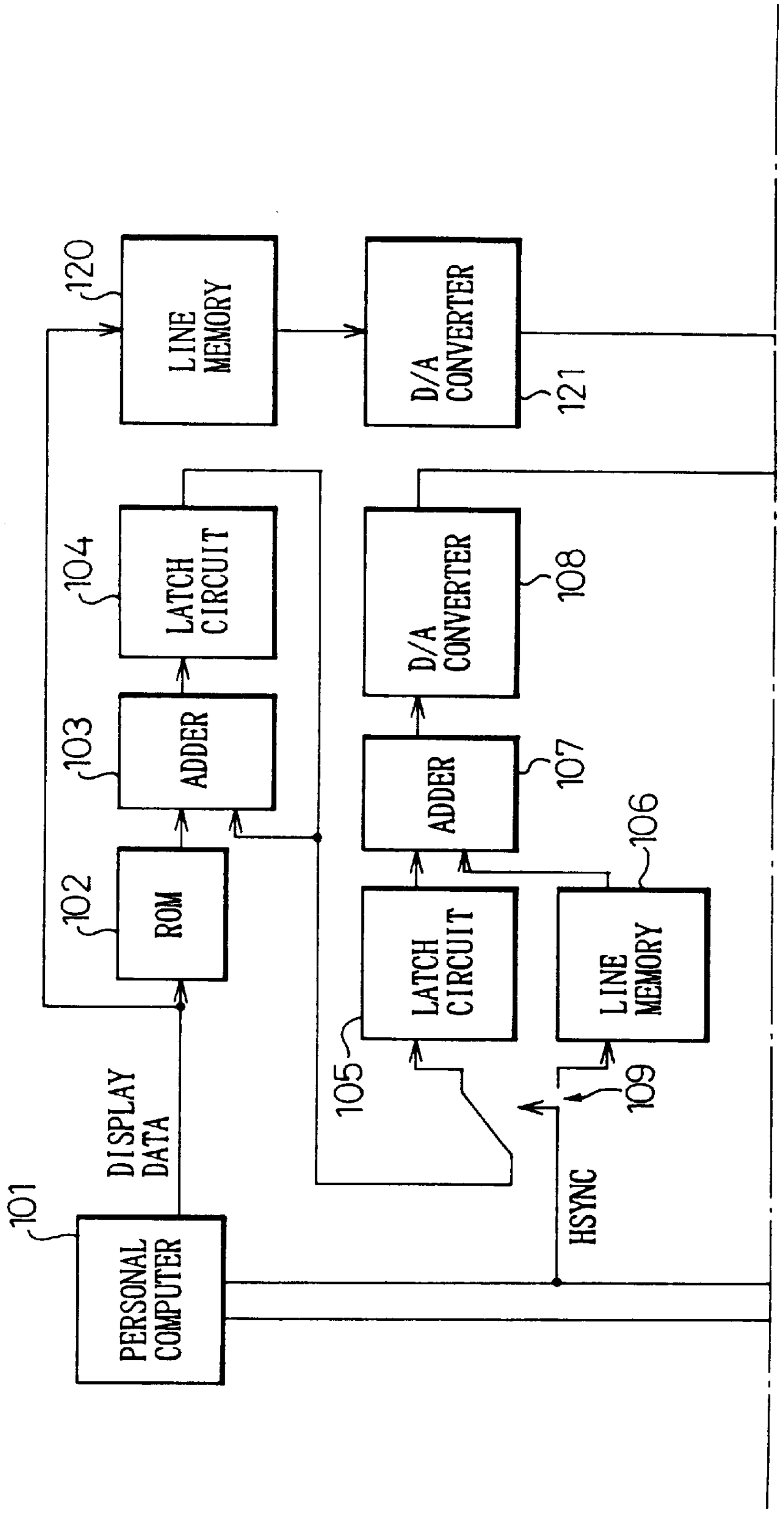
FIGS. 18A and 18B show an LCD according to a fourth embodiment of the second aspect of the present invention.
Figure 18B:
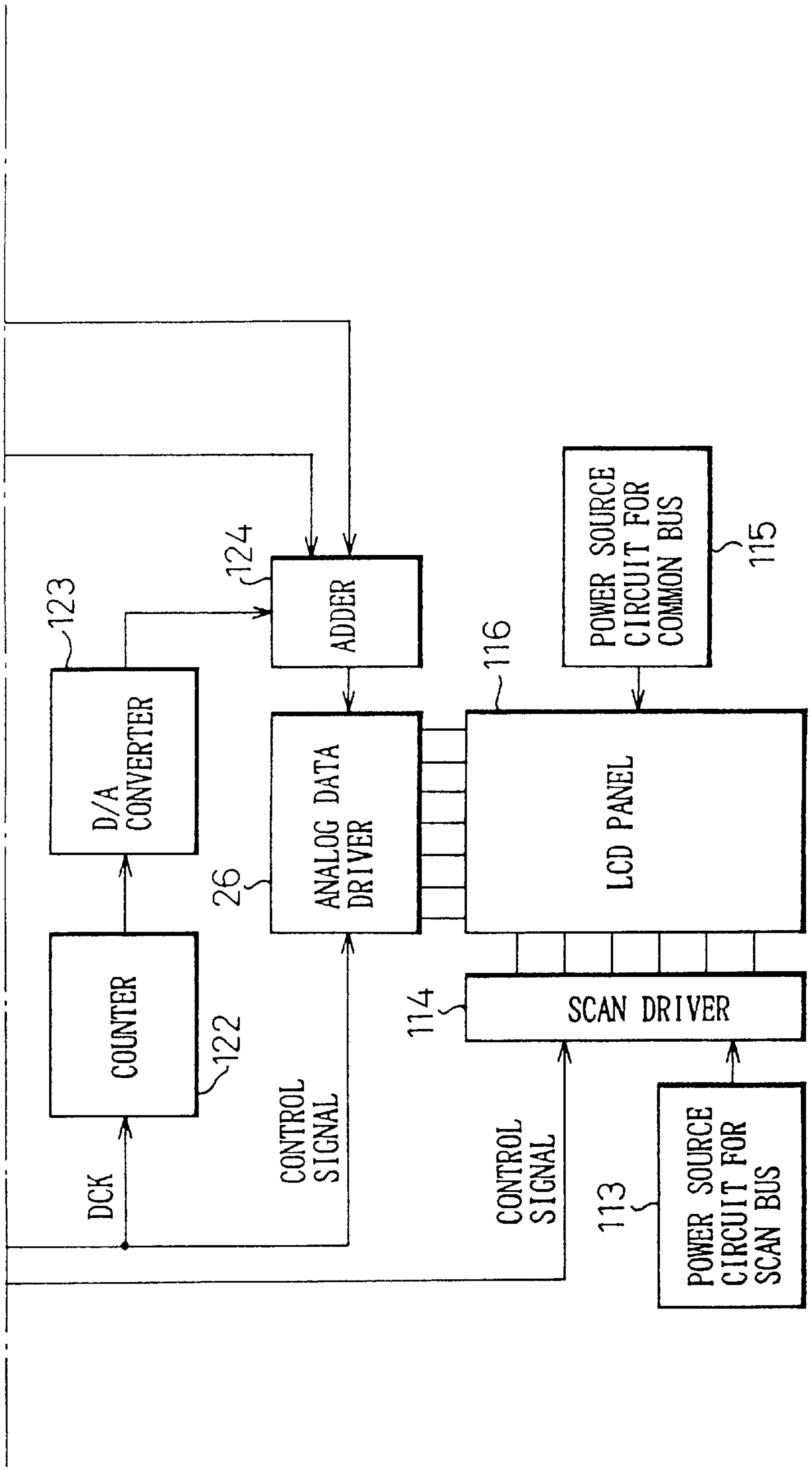

FIGS. 18A and 18B show an LCD according to the fourth embodiment of the second aspect of the present invention. The basic arrangement of this embodiment is the same as that of the first embodiment of FIG. 15. This embodiment employs the analog data driver 126, which provides a data voltage that directly drives liquid crystal cells. Accordingly, correction data for correcting distortion of a common voltage must be added to input data. Since resultant correction data is known only after receiving display data for a line, the display data for a line is initially held in a line memory 120, and the timing of transferring the display data is delayed by one horizontal period.

In FIGS. 18A and 18B, the LCD of the fourth embodiment has the line memory 120 for storing display data for a line, a D/A converter 121 for converting an output of the line memory 120 into analog data, and an adder 124 for adding an output of the D/A converter 121 to an output of a D/A converter 108.

Since a data electrode that is distant from an input end for a common voltage involves a larger amount of distortion, a counter 122 counts pulses of a data clock signal DCK and supplies the count to the adder 124 through a D/A converter 123. To cancel distortion of the common voltage that increases as a distance between a given data electrode and the input end for the common voltage extends, a data voltage is adjusted according to the distance. Namely, the farther the distance between a given data electrode and the common electrode terminal, the larger the correction voltage applied to a data voltage for the data electrode.

This process of applying a larger correction voltage to a data voltage for a data electrode that is farther from the common electrode terminal is applicable also for correcting distortion of a common voltage by correcting a data voltage with use of the digital data driver of FIGS. 15 and 17.

Figure 19B:
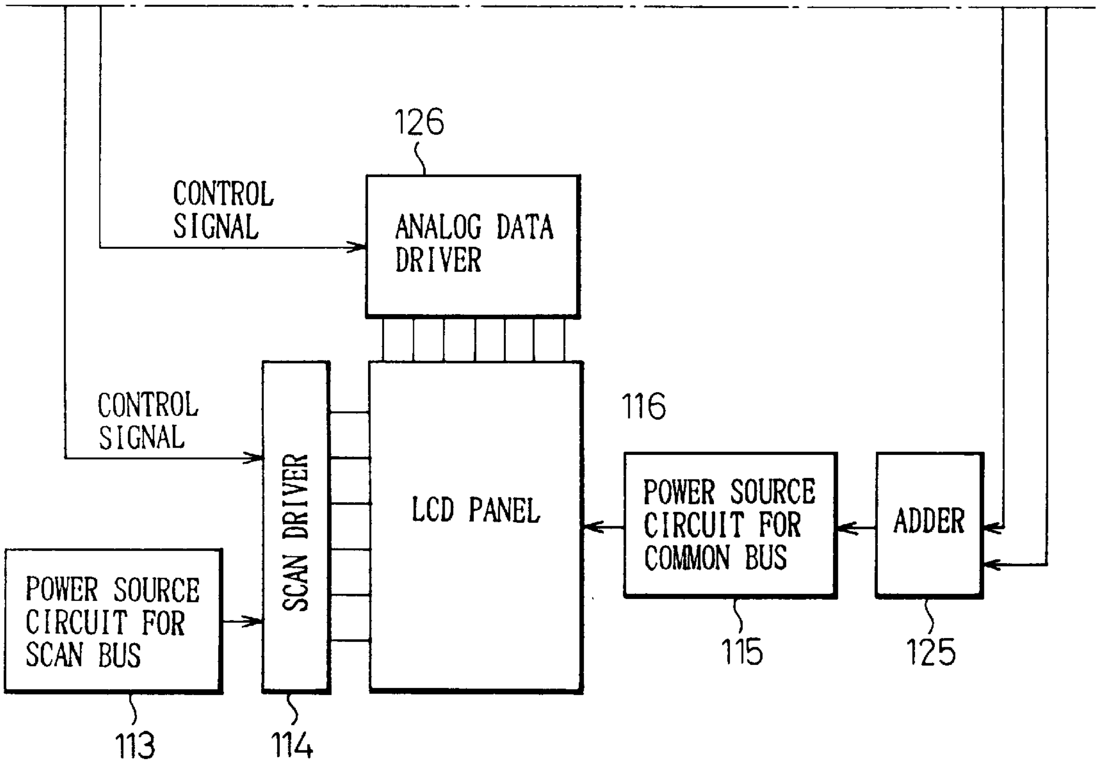

FIGS. 19A and 19B show an LCD according to the fifth embodiment of the second aspect of the present invention. Unlike the fourth embodiment of FIGS. 18A and 18B that corrects distortion of a common voltage by correcting a data voltage, the fifth embodiment corrects distortion of a common voltage by correcting the common voltage itself. This embodiment does not require the line memory circuit 120 of the fourth embodiment for storing display data for a line.

The correction process of FIG. 17 according to a distance between a common electrode terminal and each scan electrode may be carried out not only on a data voltage but also on a common voltage. Although each of the above embodiments employs a constant common voltage, the present invention is also applicable for a common voltage inversion driving method that inverts the common voltage, to lower the withstand voltage of a data driver.

As explained above, the LCD driving method according to the present invention adds a weighting value for a first scan line to a weighting value for a second scan line that follows the first line, and adds the sum of the weighting values to a data voltage or to a common voltage. This thereby cancels distortion of the common voltage and results in reducing crosstalk and improving the display quality of the LCD.

An LCD according to a third aspect of the present invention will be explained. This LCD employs a liquid crystal panel 201, which is basically the same as the conventional one shown in FIG. 12.

As explained with reference to FIGS. 12 and 13, the conventional LCD displays data on each liquid crystal cell according to a potential difference between a common voltage and a voltage applied from a data bus line to the cell. The resistance of the common electrode and parasitic capacitance between the data bus line and the common electrode distorts the common voltage at the rise and fall of the data voltage. Namely, the waveform of an actual common voltage deviates from the waveform of an original input common voltage. The common voltage is distorted whenever a data voltage is changed by parasitic capacitance produced by liquid crystals between a data bus line and a common electrode.

Accordingly, the first aspect of the present invention applies a correction voltage to scan bus lines or to a black matrix of a color filter, to cancel the distortion of the common voltage. The correction voltage alternates at an average of levels of a data voltage and has an opposite polarity to the data voltage. The second aspect of the present invention weights display data, accumulates the weighted data, and adds a voltage corresponding to the accumulated data to a data voltage or to the common voltage, to cancel the distortion of the common voltage.

The third aspect of the present invention detects the distortion of the common voltage, and according to the magnitude of the distortion, provides a correction voltage to a liquid crystal panel, to correct the distortion of the common voltage. According to the third aspect of the present invention, the circuit for generating the correction voltage may be formed of an integration circuit, a sample-hold circuit, etc., to deal with the distortion of the common voltage in real time. This aspect provides an optimum correction voltage without complicated data processes.

According to this aspect, the correction voltage is determined according to the magnitude of the distortion of the common voltage, so that a part of the common voltage that involves the largest distortion must be detected. This part is farthest from an input end of the common voltage and is usually located at the center of the panel, although it is dependent on the structure of the panel. In this case, it will be difficult to externally detect the distortion of the common voltage.

Accordingly, one technique calculates the resistance of the common electrode in advance and converts the voltage level of an externally monitored signal into distortion thereof according to the calculation. Another technique employs a differential amplifier to convert a change in a current of the common electrode into a voltage. With these techniques, the distortion of the common voltage is easily detectable to provide an optimum correction voltage to cancel the distortion of the common voltage and prevent crosstalk.

LCDs according to the third aspect of the present invention will be explained with reference to FIGS. 22 to 30.

Figure 22:
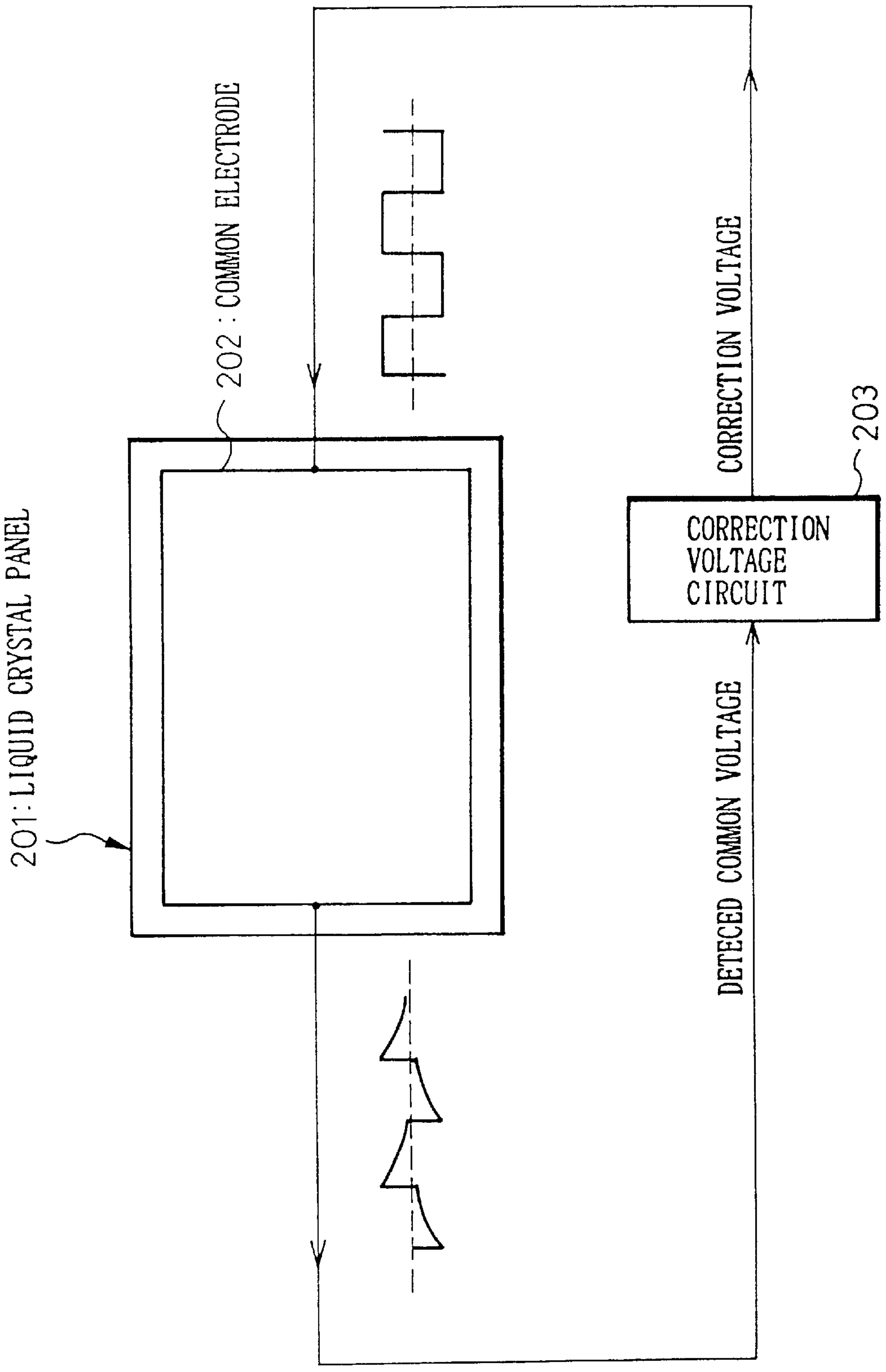
FIG. 22 shows the principle of an LCD according to a third aspect of the present invention.

FIG. 22 is a block diagram showing the principle of the LCD according to the third aspect of the present invention. Numeral 201 is a liquid crystal panel, 202 is a common electrode, and 203 is a correction circuit.

The liquid crystal panel 201 has the correction circuit 203 that receives a detection signal indicating distortion of a common voltage of the common electrode 202. In response to the magnitude of the detection signal, the correction circuit 203 provides a correction voltage in real time. The polarity of the correction voltage is opposite to that of the distortion of the common voltage. The correction voltage is fed back to the common electrode 202.

Figure 23:
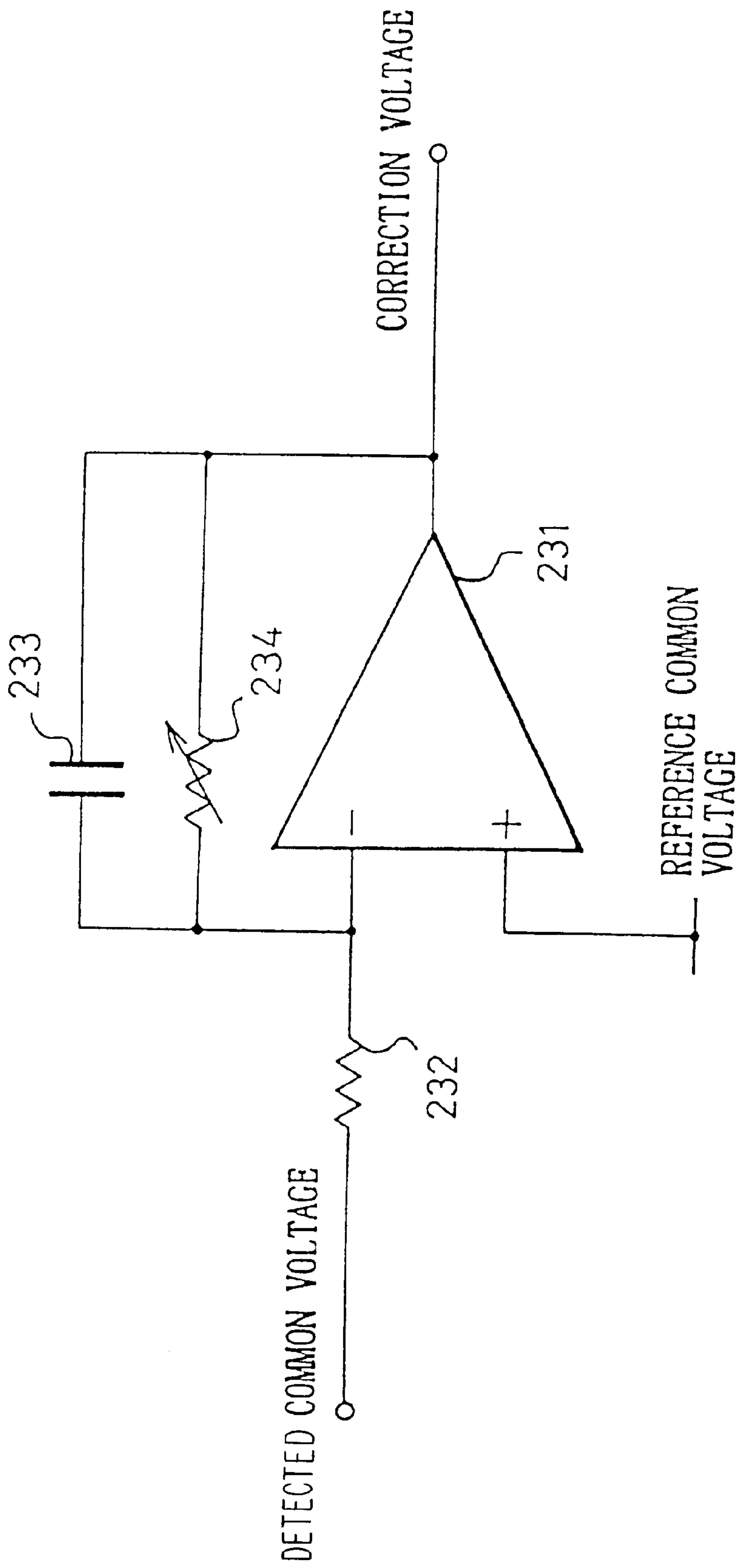
FIG. 23 shows a correction circuit of the LCD according to the third aspect of the present invention.

FIG. 23 shows an example of the correction circuit of the LCD according to the third aspect of the present invention. This correction circuit is an integration circuit having an operational amplifier 231, a resistor 232, a capacitor 233, and a variable resistor 234. The variable resistor 234 adjusts an amplification factor of the operational amplifier 231. The integration circuit may have any other arrangement.

Figure 24A:
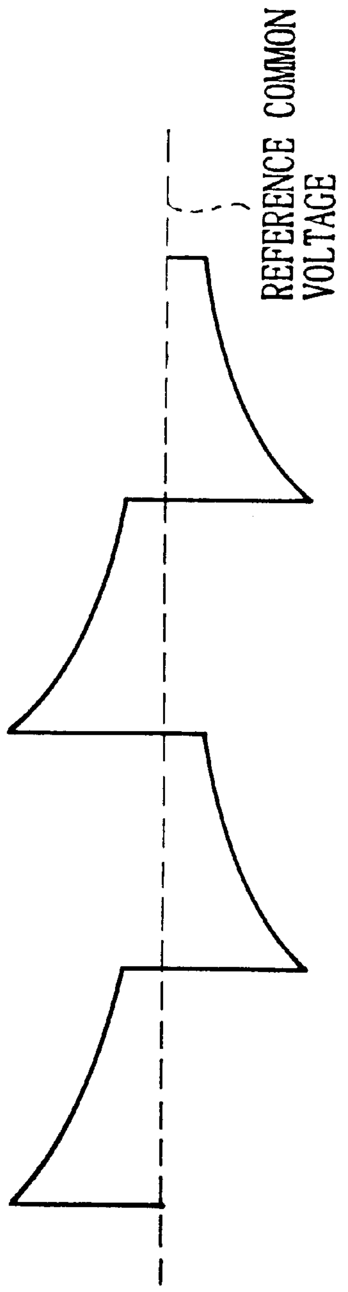
FIGS. 24A to 24C are waveforms explaining the operations of the correction circuit of FIG. 23.
Figure 24B:
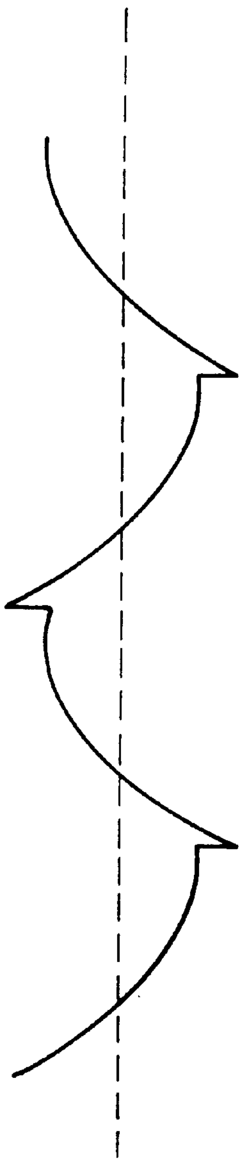
Figure 24C:
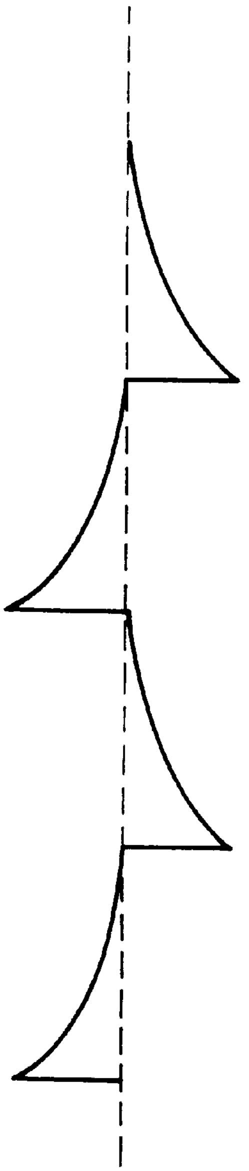

FIGS. 24A to 24C show waveforms of the correction circuit of FIG. 23, in which FIG. 24A shows an uncorrected common voltage, FIG. 24B shows a correction voltage (an output of the integration circuit), and FIG. 24C shows a corrected common voltage.

The correction circuit 203, i.e., the integration circuit employing the operational amplifier 231, can correct the distorted common voltage of FIG. 24A substantially into a reference common voltage. The integration circuit serving as the correction circuit is capable of providing, as a correction voltage, an integrated waveform corresponding to the distortion of the common voltage in real time, and applying the correction voltage to each data voltage in the liquid crystal panel.

Figure 25:
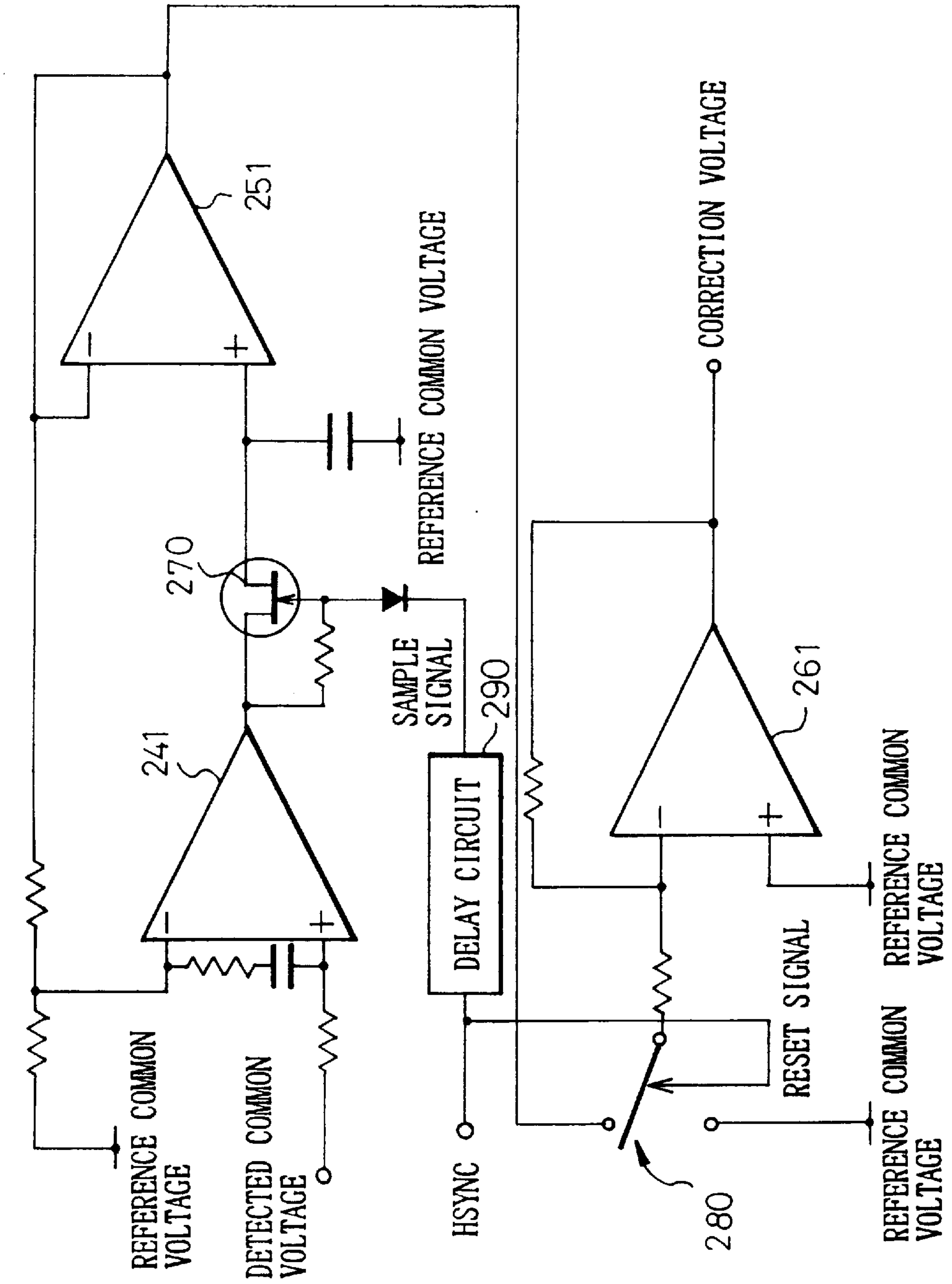
FIG. 25 shows another correction circuit of the LCD according to the third aspect of the present invention.

FIG. 25 shows another correction circuit of the LCD according to the third aspect of the present invention. This correction circuit is a sample-hold circuit employing operational amplifiers 241, 251, and 261, a sampling transistor (MOS transistor) 270, a reset switch 280, and a delay circuit 290. The amplifier 261 serves as an inverting amplifier for inverting the polarity of an output of the sample-hold circuit (correction circuit) opposite to the polarity of distortion of a common voltage. The sample-hold circuit may employ any other arrangement.

Figure 26A:
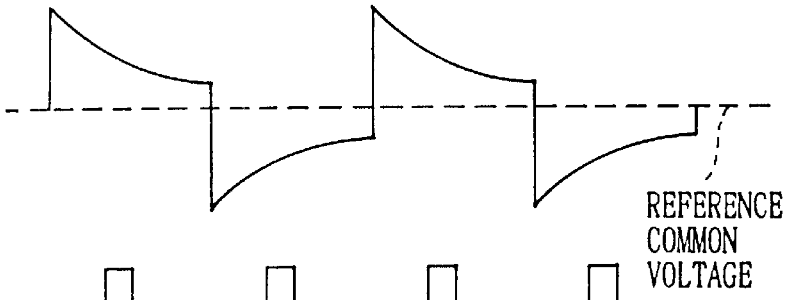
FIGS. 26A to 26E are waveforms explaining the operations of the correction circuit of FIG. 25.
Figure 26B:
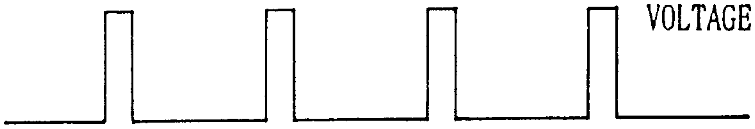
Figure 26C:
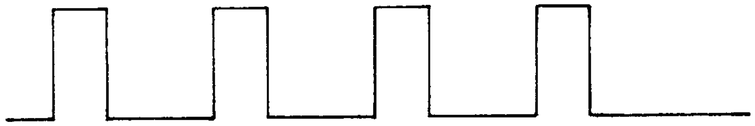
Figure 26D:
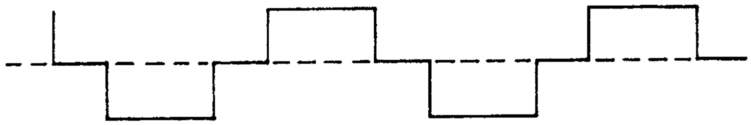
Figure 26E:
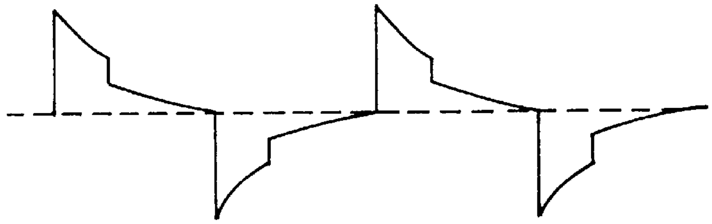

FIGS. 26A to 26E show waveforms of the correction circuit of FIG. 25, in which FIG. 26A shows an uncorrected common voltage, FIG. 26B shows a sampling signal, FIG. 26C shows a reset signal, FIG. 26D shows a correction voltage (an output voltage of the sample-hold circuit), and FIG. 26E shows a corrected common voltage. The reset signal may be a horizontal synchronous signal HSYNC as it is, and the sampling signal may be the horizontal synchronous signal HSYNC delayed by the delay circuit 290.

As shown in FIGS. 26A and 26D, the sample-hold circuit of FIG. 25 samples and holds the level of the uncorrected common voltage in response to a rise of the sampling signal (FIG. 26B). The inverting amplifier 261 is reset in response to the reset signal of FIG. 26C and inverts an output of the amplifier 251, i.e., the sampled and held signal. The inverted output (correction voltage) of FIG. 26D is fed back to a common electrode, to correct the common voltage, FIG. 26E. If the timing of the sampling and holding operations is fixed in the sample-hold circuit, the circuit will provide a correction voltage corresponding to distortion of a common voltage in real time according to each piece of data, to the liquid crystal panel.

Figure 27:
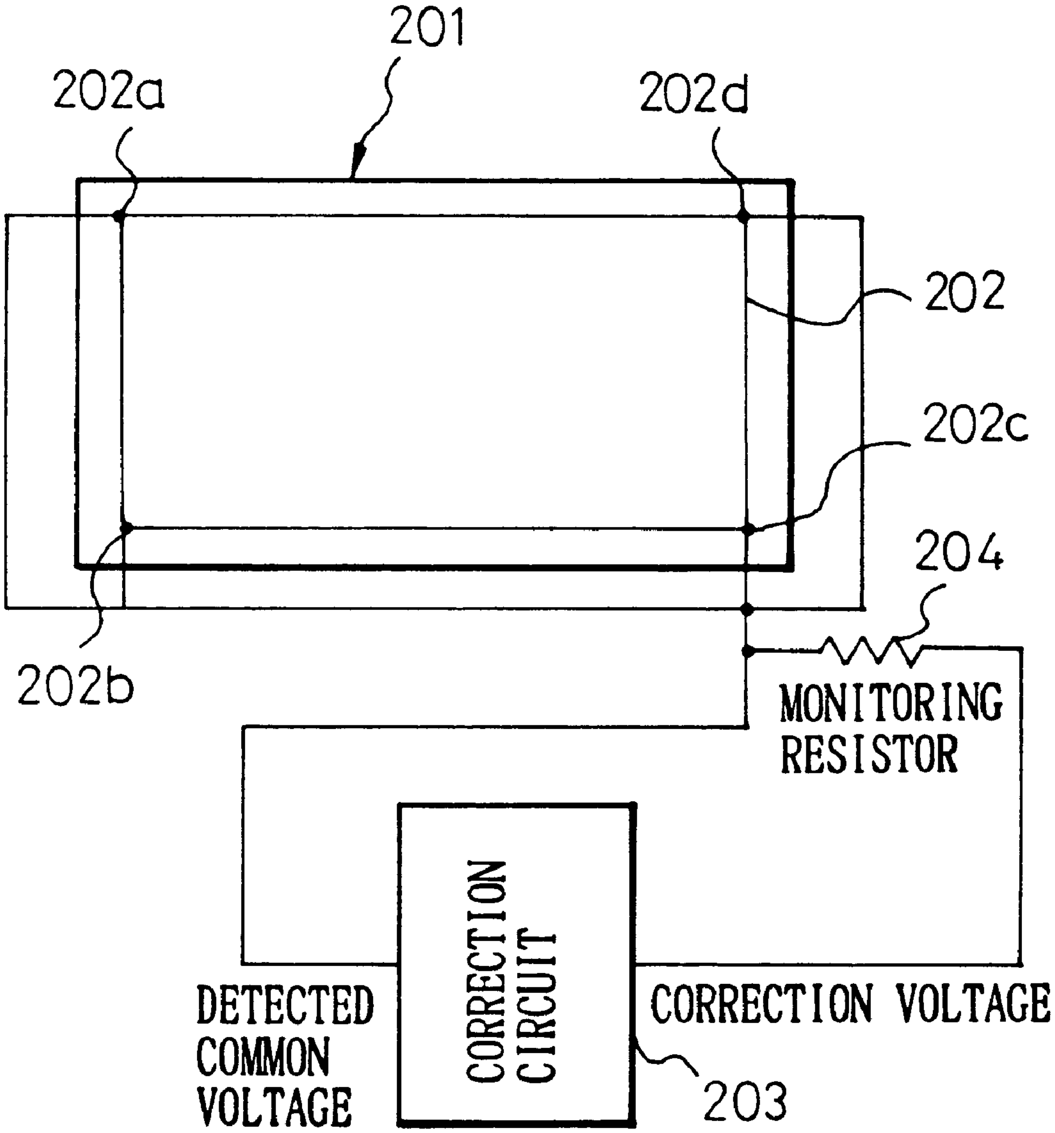
FIG. 27 shows an LCD according to a first embodiment of the third aspect of the present invention.

FIG. 27 shows an LCD according to a first embodiment of the third aspect of the present invention. Numeral 204 is a monitoring resistor, and 202*a* to 202*d* are common voltage terminals disposed at corners of a common electrode 202, respectively.

The monitoring resistor 204 is inserted between an output terminal of the correction circuit 203 and a common node of the four terminals 202a to 202d, i.e., between an output terminal of the common voltage and the common electrode 202 of the liquid crystal panel 201. At a position between the monitoring resistor 204 and the common electrode 202, distortion of a common voltage is detected and supplied to the correction circuit 203. The resistance of the monitoring resistor 204 must be sufficiently low not to interfere with the displaying of the liquid crystal panel.

Figure 28:
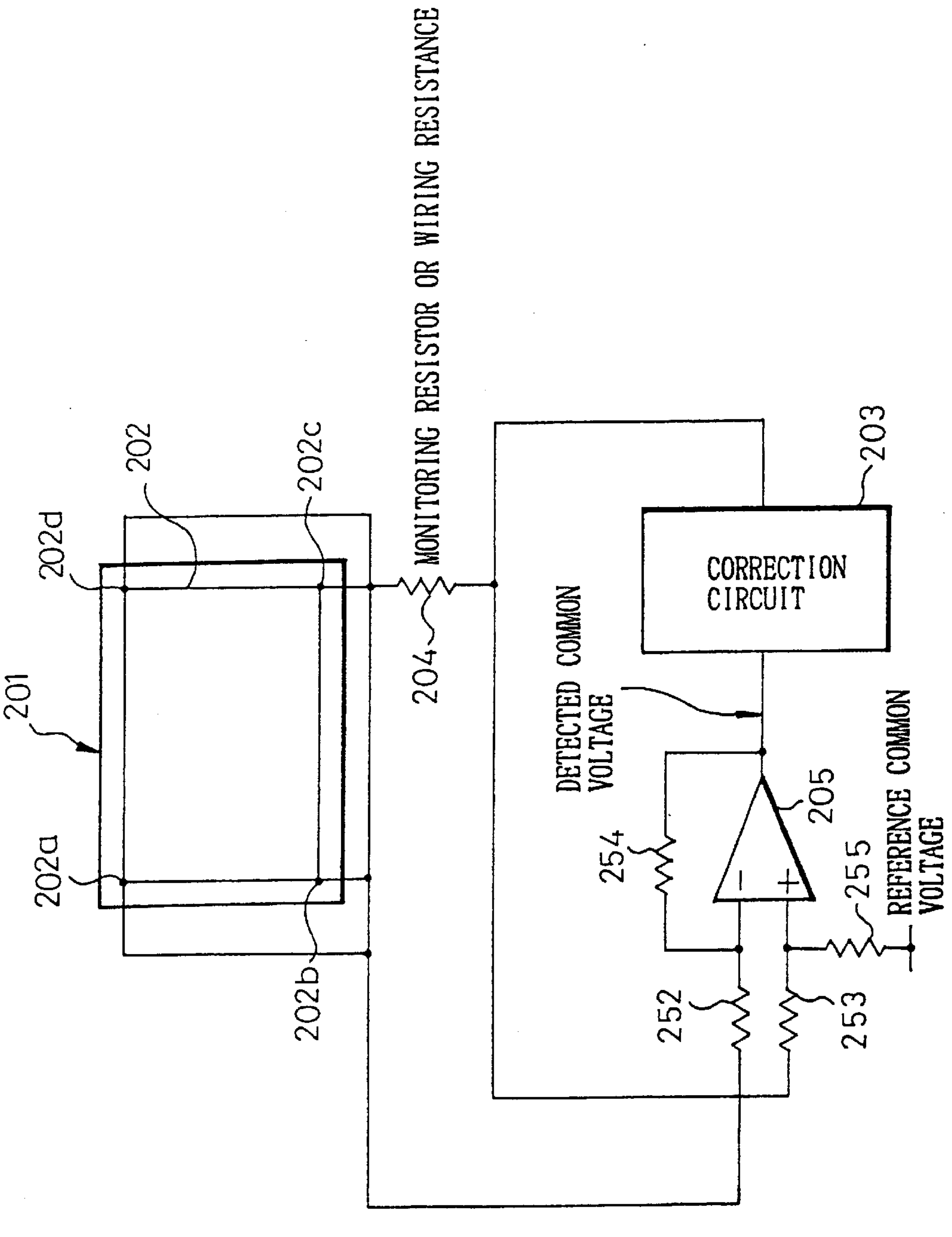
FIG. 28 shows an LCD according to a second embodiment of the third aspect of the present invention.

FIG. 28 shows an LCD according to a second embodiment of the third aspect of the present invention. Numeral 205 is a differential amplifier and 252 to 255 are resistors. A monitoring resistor 204 may be included or be substituted by wiring resistance.

In FIG. 28, a terminal voltage of the monitoring resistor 204 is supplied to the differential amplifier 205, which detects a change in a current and converts it into a voltage. When detecting distortion of a common voltage, an external distortion detection signal will not agree with distortion of a common voltage in an actual panel. Accordingly, the detection signal is amplified by the differential amplifier 205, and the amplified signal is provided to the correction circuit 203. Based on the detection signal, a change in a current in the common electrode 202 is read, to detect a change in distortion of the common voltage in the liquid crystal panel 201. According to the detected change, the common voltage is corrected. The differential amplifier of FIG. 28 having a simple structure may have any other arrangement.

Figure 29:
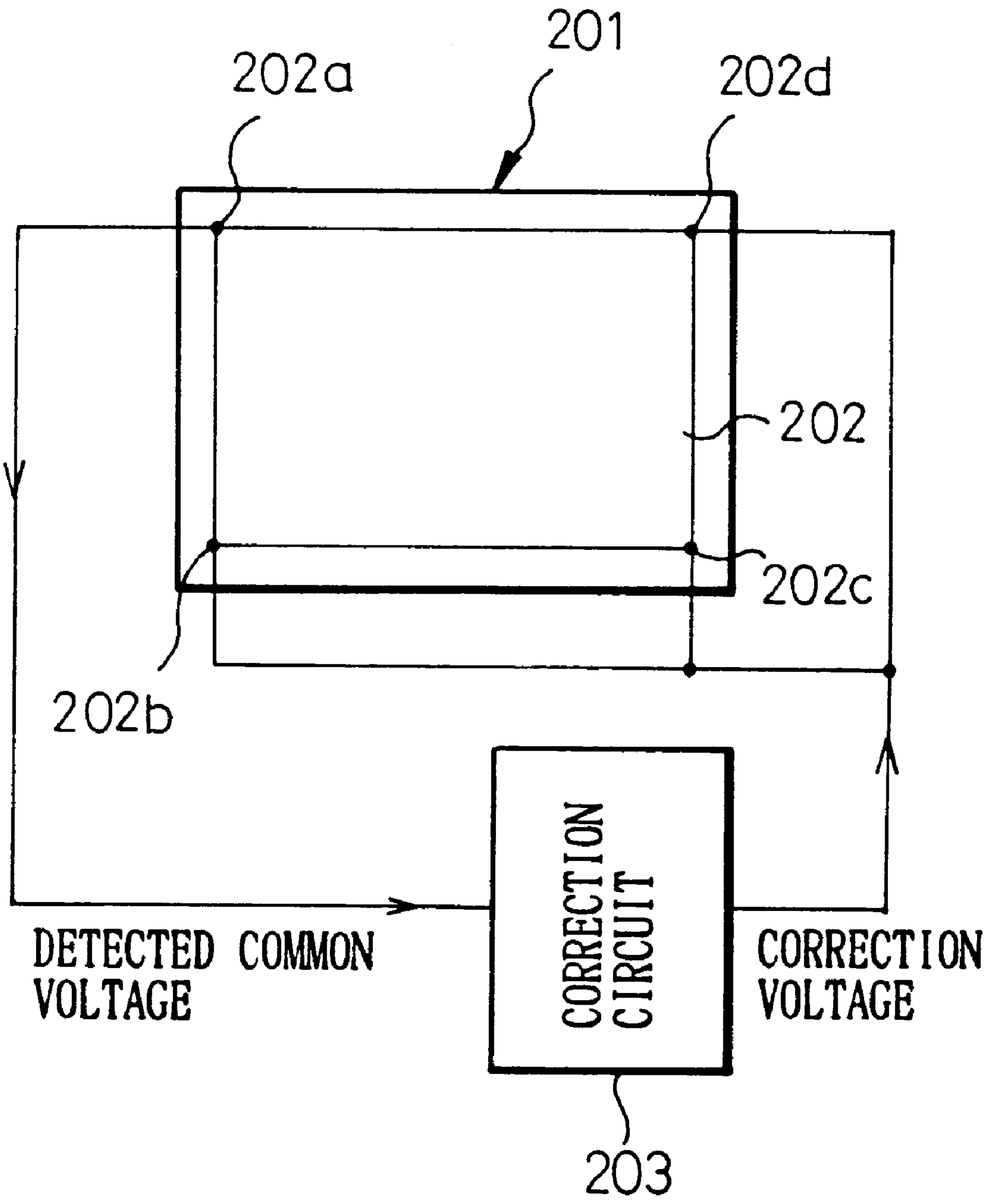
FIG. 29 shows an LCD according to a third embodiment of the third aspect of the present invention.
Figure 30:
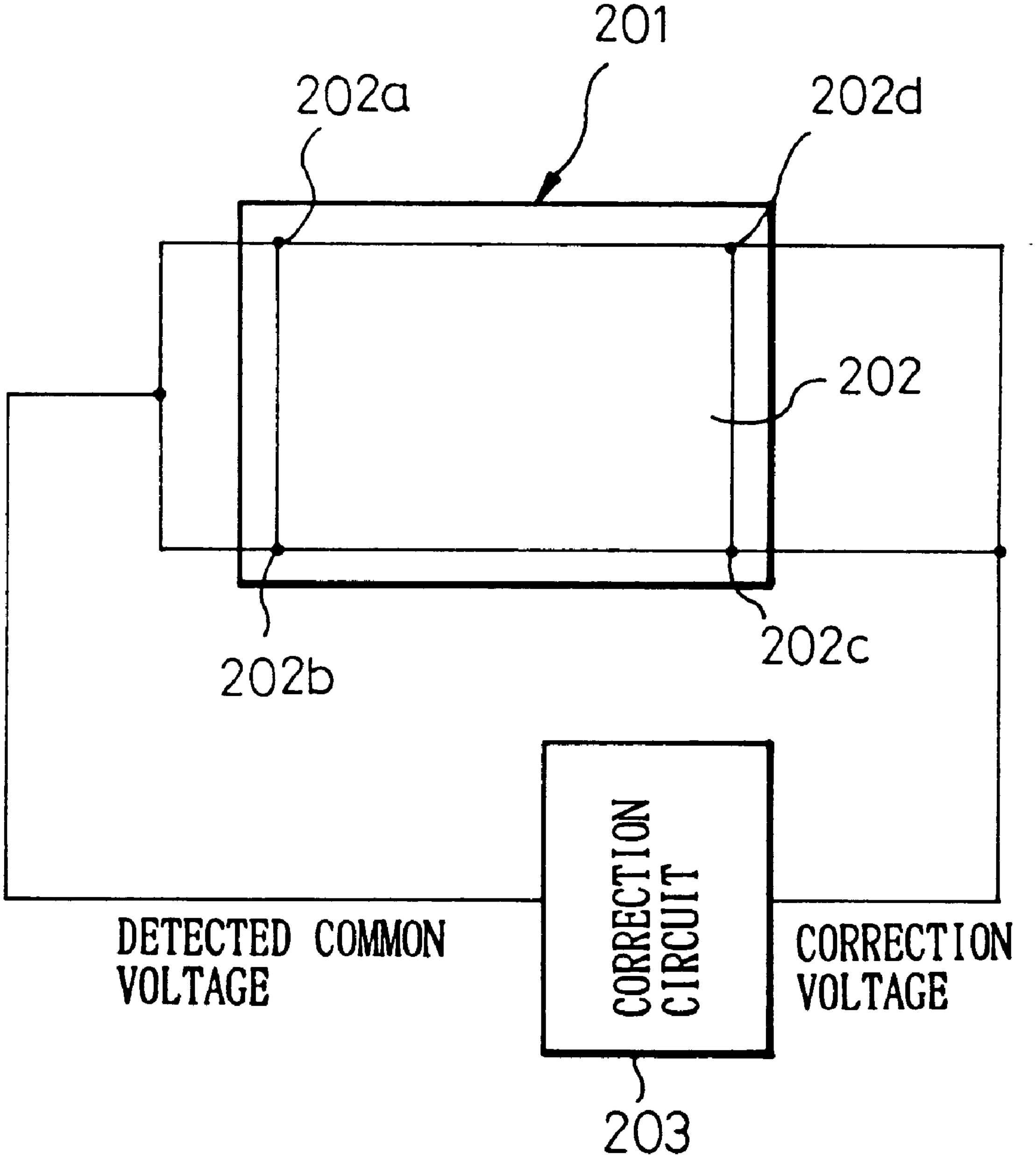
FIG. 30 shows an LCD according to a fourth embodiment of the third aspect of the present invention.

FIG. 29 shows an LCD according to a third embodiment of the third aspect of the present invention, and FIG. 30 shows an LCD according to a fourth embodiment of the third aspect of the present invention. In each of the third and fourth embodiments, four common voltage terminals 202*a* to 202*d* are arranged at corners of a common electrode 202, respectively. At least one of the common voltage terminals 202*a* to 202*d* is disconnected from a common voltage and is used to detect distortion of the common voltage.

In FIG. 29, the common voltage terminal 202*b*, for example, is disconnected from the common voltage and is used to detect distortion of the common voltage. In this case, an area around the common voltage terminal 202*b* drastically deteriorates its displaying ability, while the other parts excessively receive the effect of a correction voltage. To prevent this, a plurality of the common voltage terminals, for example 202*a* and 202*b*, may be removed from the common voltage as shown in FIG. 30. This may uniformly deteriorate display ability and uniformly distribute the effect of a correction voltage.

The third aspect of the present invention is capable of restoring the deteriorated display ability, so that there will be no problem even if a plurality of the common voltage terminals are removed.

These embodiments employ four common voltage terminals. The number of the terminals is not limited to four and any other combination may be adopted.

In the above embodiments, a correction voltage (an output voltage of the correction circuit 203) is applied to the common electrode 202. Alternately the correction voltage may be applied to the shielding film 81 of the color filter 8 of FIGS. 4 and 5, or to the supplemental electrode 9 of FIG. 7, to correct distortion of a common voltage.

As explained above, the LCD according to the third aspect of the present invention employs a correction circuit formed of an integration circuit or a sample-hold circuit. The correction circuit corrects, in real time, distortion of a common voltage caused by the resistance of a common electrode and parasitic capacitance between a data bus line and the common electrode, to thereby prevent crosstalk.

An LCD according to a fourth aspect of the present invention will now be explained. The arrangement of a liquid crystal panel 201 of this LCD is basically the same as that of the prior art of FIG. 12.

Figure 31A:
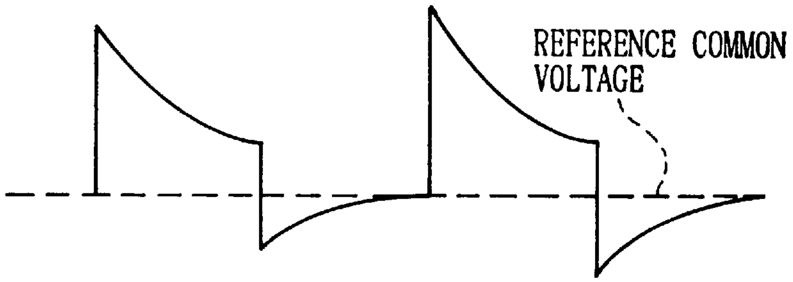
FIGS. 31A and 31B show the problems of the LCD of the third aspect of the present invention.
Figure 31B:
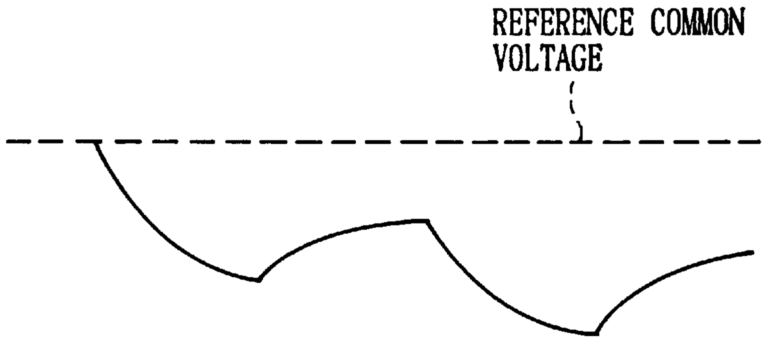

FIGS. 31A and 31B explain the problems of the LCD according to the third aspect of the present invention employing an integration circuit as the correction circuit 203. FIG. 31A shows an input voltage, and FIG. 31B shows an output voltage (a correction voltage).

The LCD employing the integration circuit as the correction circuit 203 corrects a common voltage in real time. When writing a special display pattern, a center voltage for preparing a correction voltage may be shifted as shown in FIG. 31A. Namely, an offset voltage in an output voltage (a correction voltage) accumulates to greatly deviate the correction voltage from an original correction voltage, as shown in FIG. 31B. If this correction voltage is fed back to a common electrode 202, the common voltage will be distorted to cause a display failure.

Figure 32:
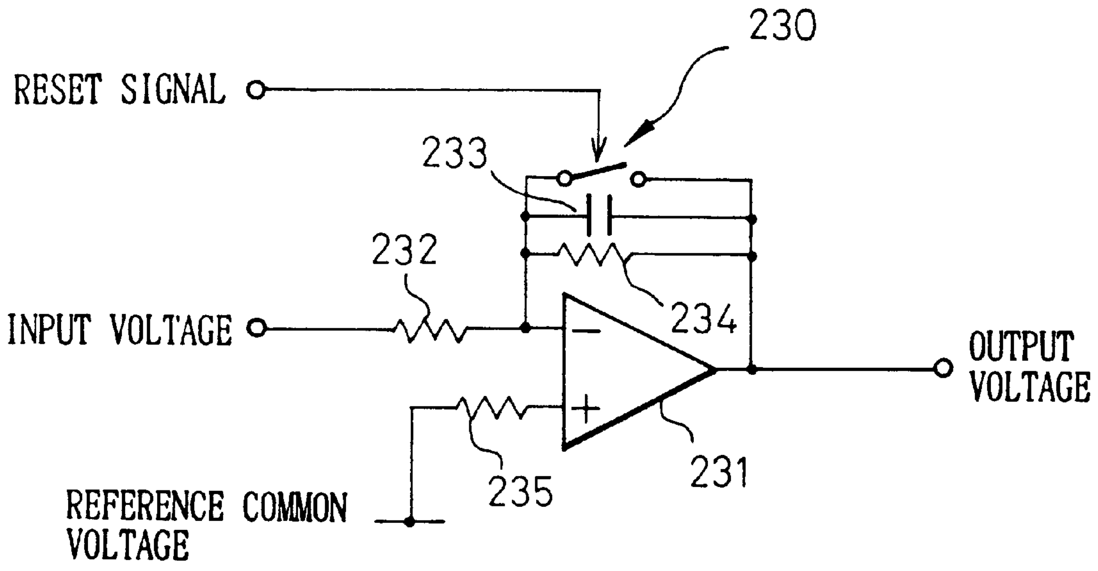
FIG. 32 shows a correction circuit of an LCD according to a fourth aspect of the present invention.

FIG. 32 shows a correction circuit of the LCD according to the fourth aspect of the present invention. Compared with the correction circuit of FIG. 23, the correction circuit of FIG. 32 has a reset switch 230. The variable resistor 234 of FIG. 23 corresponds to a fixed resistor 234 of FIG. 32. A positive input terminal of an operational amplifier 231 receives a reference common voltage through a resistor 235. According to the correction circuit of FIG. 32, the reset switch 230, which is controlled by a reset signal, is provided for the operational amplifier 231 of an integration circuit.

Figure 33A:
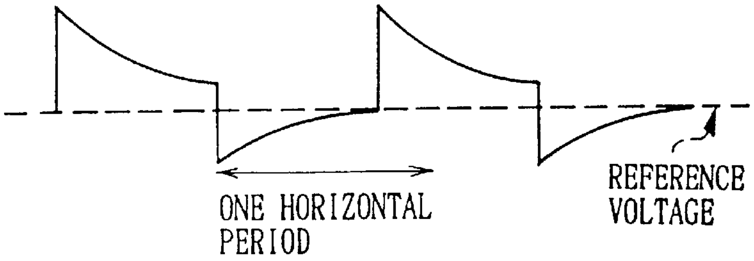
FIGS. 33A to 33E show waveforms explaining the problems of a reset operation of the correction circuit of FIG. 32.
Figure 33B:
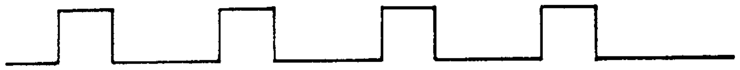
Figure 33C:
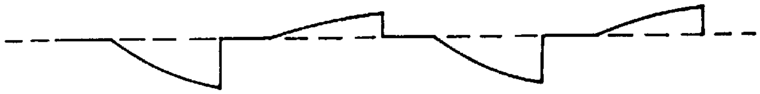
Figure 33D:
Figure 33E:
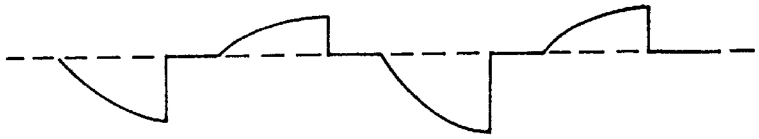

FIGS. 33A to 33E are waveforms explaining the problems of the reset operation of the correction circuit of FIG. 32, in which FIG. 33A shows an input voltage, FIG. 33B shows a first reset signal 1, FIG. 33C shows an output voltage (a correction voltage) corresponding to the reset signal 1, FIG. 33D shows a second reset signal 2, and FIG. 33E shows an output voltage (a correction voltage) corresponding to the second reset signal 2.

To eliminate the distortion shown in FIGS. 31A and 31B, an output of the integration circuit may be periodically reset. A period of inverting the polarity of a data voltage is usually every horizontal line. Accordingly, as shown in FIGS. 33B and 33C, no correction is achieved if the reset operation is carried out for an optional period at the start of each horizontal line according to the period of polarity inversion, because no correction voltage is provided when the common voltage starts to distort. Alternately, as shown in FIGS. 33D and 33E, an adverse effect will be achieved if the reset operation is carried out at the end of each horizontal line because voltage fluctuations at the moment influence the common voltage. In this way, no proper correction voltage will be obtained if the integration circuit is reset.

Figure 34A:
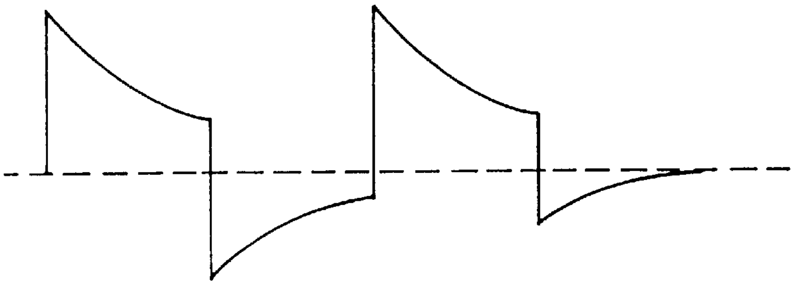
FIGS. 34A to 34D are waveforms explaining a proper reset operation of the correction circuit of FIG. 32.
Figure 34B:
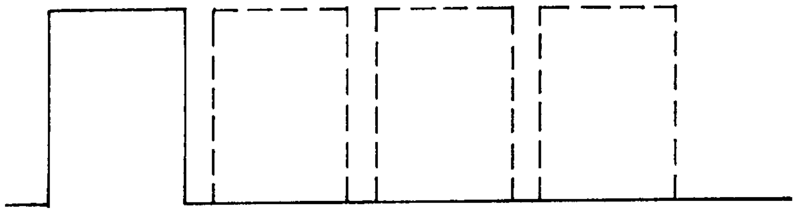
Figure 34C:
Figure 34D:
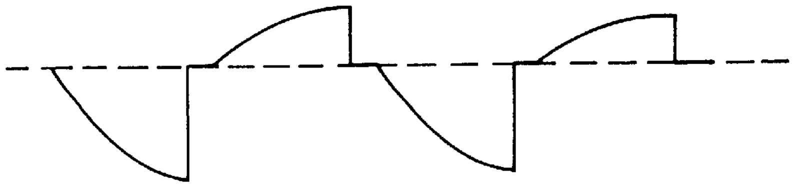

FIGS. 34A to 34D show waveforms explaining an optimum reset operation of the correction circuit of FIG. 32, in which FIG. 34A shows an input voltage, FIG. 34B shows a gate pulse signal, FIG. 34C shows a reset signal, and FIG. 34D shows an output voltage (a correction voltage). The reset signal may be generated according to a logic of, for example, a horizontal synchronous signal HSYNC and a scan output enable signal SOE.

The LCD of the fourth aspect of the present invention is capable of resetting the integration circuit while providing an optimum correction voltage from the integration circuit. To realize this, the fourth aspect generates a reset signal in a period that will not interfere with the displaying of data. As shown in FIG. 34C, such period starts when a gate pulse signal (FIG. 34B) reaches an OFF level and ends when the polarity of a data voltage is inverted. This prevents an accumulation of offset voltages due to the output voltage (correction voltage) and feeding an original correction voltage to the common electrode 202, to improve the display quality of the LCD.

Figure 35:
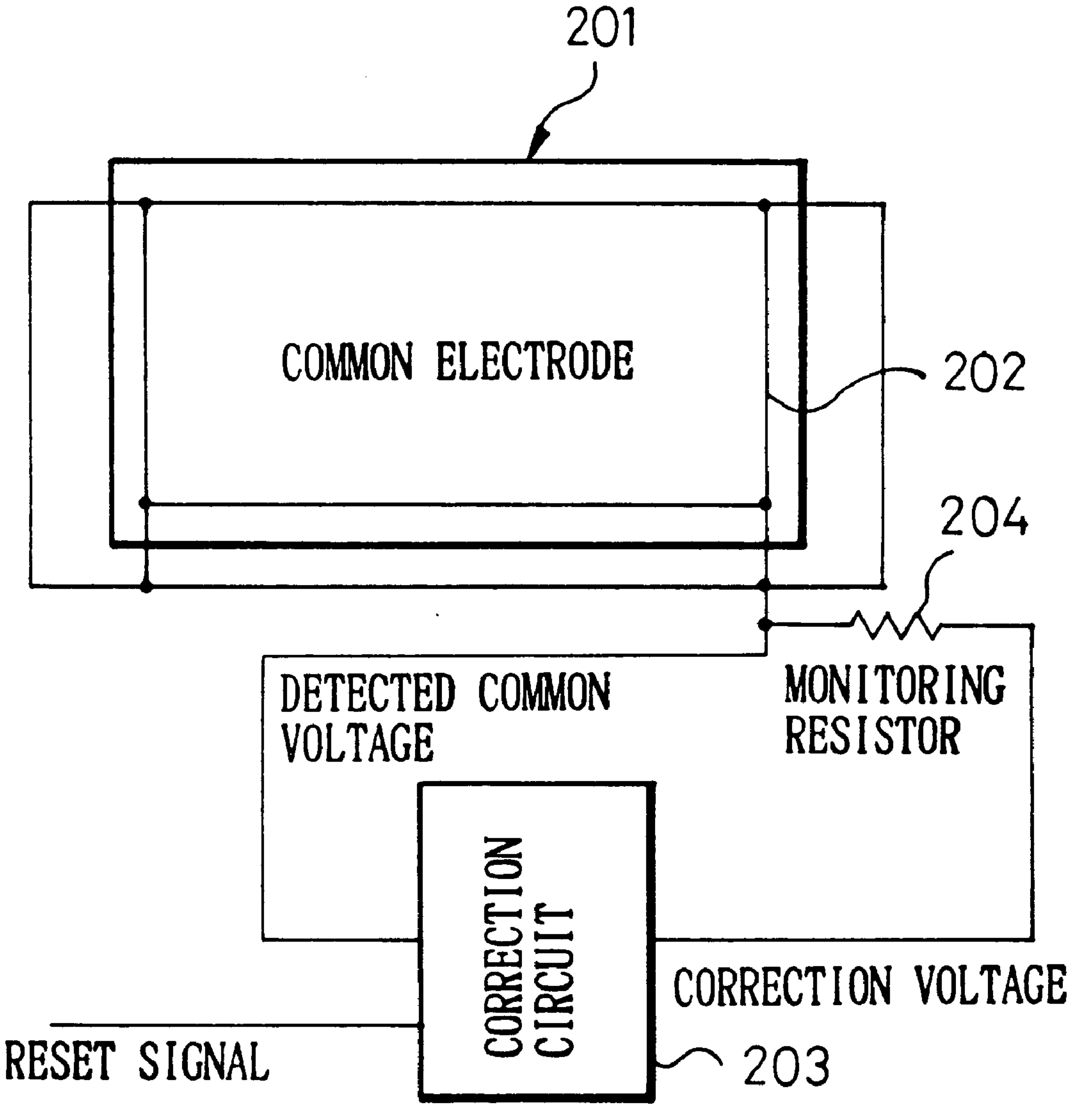
FIG. 35 shows an LCD according to a first embodiment of the fourth aspect of the present invention.
Figure 36:
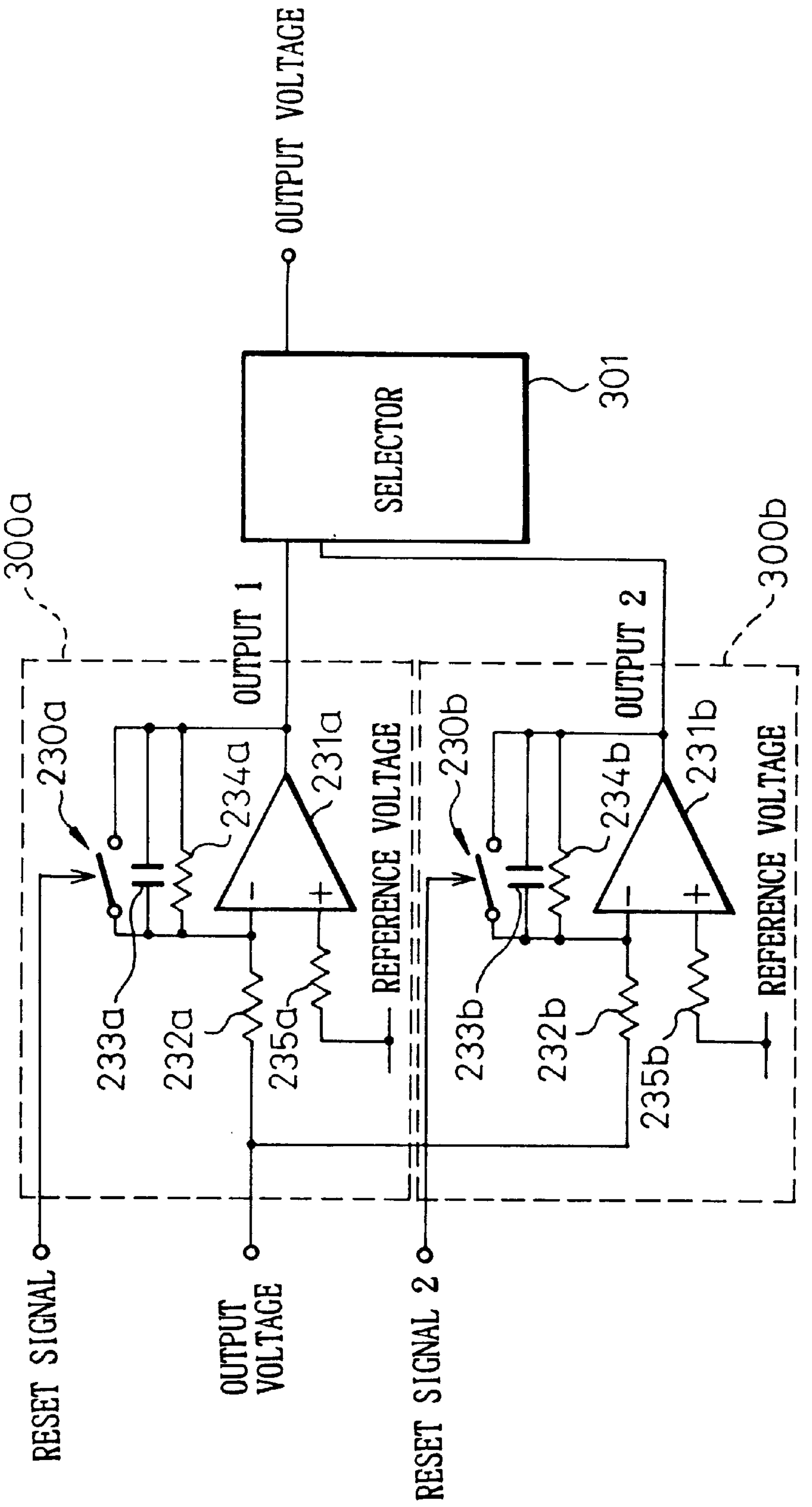
FIG. 36 shows a correction circuit of the LCD of FIG. 35.

FIG. 35 shows an LCD according to a first embodiment of the fourth aspect of the present invention. FIG. 36 shows a correction circuit of the LCD of FIG. 35. The LCD of FIG. 36 corresponds to that of the third aspect of the present invention (refer to, for example, FIG. 27).

In FIG. 36, the correction circuit of the LCD has two integration circuits 300*a* and 300*b* and a selector 301. Each of the integration circuits 300*a* and 300*b* secures a reset operation.

Each of the integration circuits 300*a* and 300*b* has the same arrangement as the integration circuit of FIG. 32. The integration circuit 300*a* has a reset switch 230*a* controlled by a first reset signal 1. The integration circuit 300*b* has a reset switch 230*b* controlled by a second reset signal 2. The selector 301 selects one of the outputs 1 and 2 of the integration circuits 300*a* and 300*b* and provides an output voltage (a correction voltage).

Figures 37A, 37B, 37C, 37D, 37E, 37F:
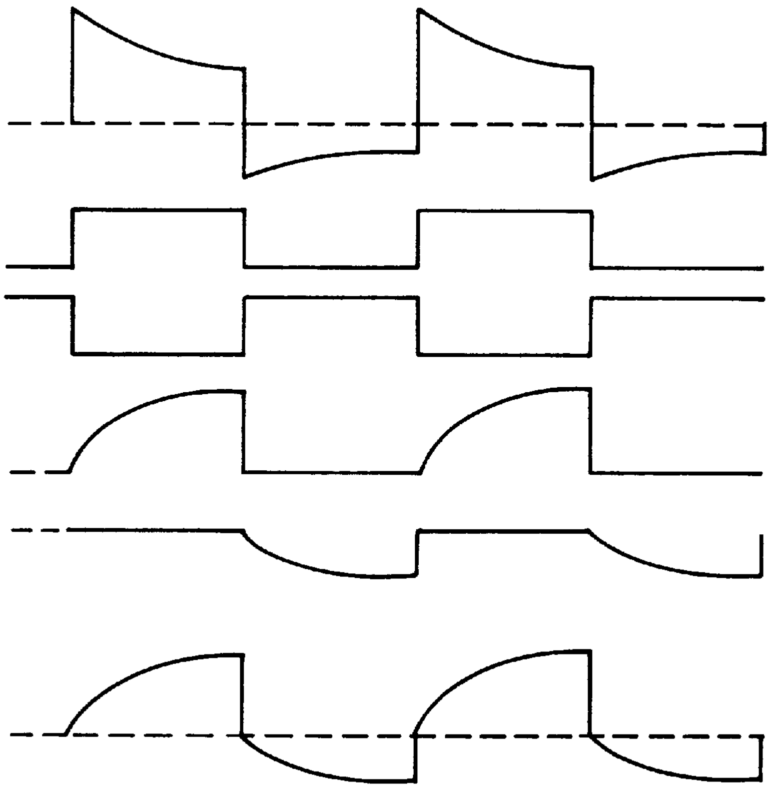
FIGS. 37A to 37F show waveforms explaining the operations of the correction circuit of FIG. 36.

FIGS. 37A to 37F are waveforms explaining the operations of the correction circuit of FIG. 36, in which FIG. 37A shows an input voltage, FIG. 37B shows the reset signal 1, FIG. 37C shows the reset signal 2, FIG. 37D shows the output 1, FIG. 37E shows the output 2, and FIG. 37F shows the output voltage of the selector 301.

In FIGS. 37A to 37C, the reset signals 1 and 2 are each in synchronism with the input voltage (common voltage) and have opposite phases to each other. For example, the integration circuit 300*a* provides a correction voltage for the positive side of the common voltage, and the integration circuit 300*b* provides a correction voltage for the negative side of the common voltage. The selector 301 selects periods of providing the outputs 1 and 2 of the integration circuits 300*a* and 300*b*, thereby combining the positive and negative correction voltages of the integration circuits. This technique is able to reset the integration circuits 300*a* and 300*b* while providing an optimum correction voltage to a liquid crystal panel 202.

Figure 38:
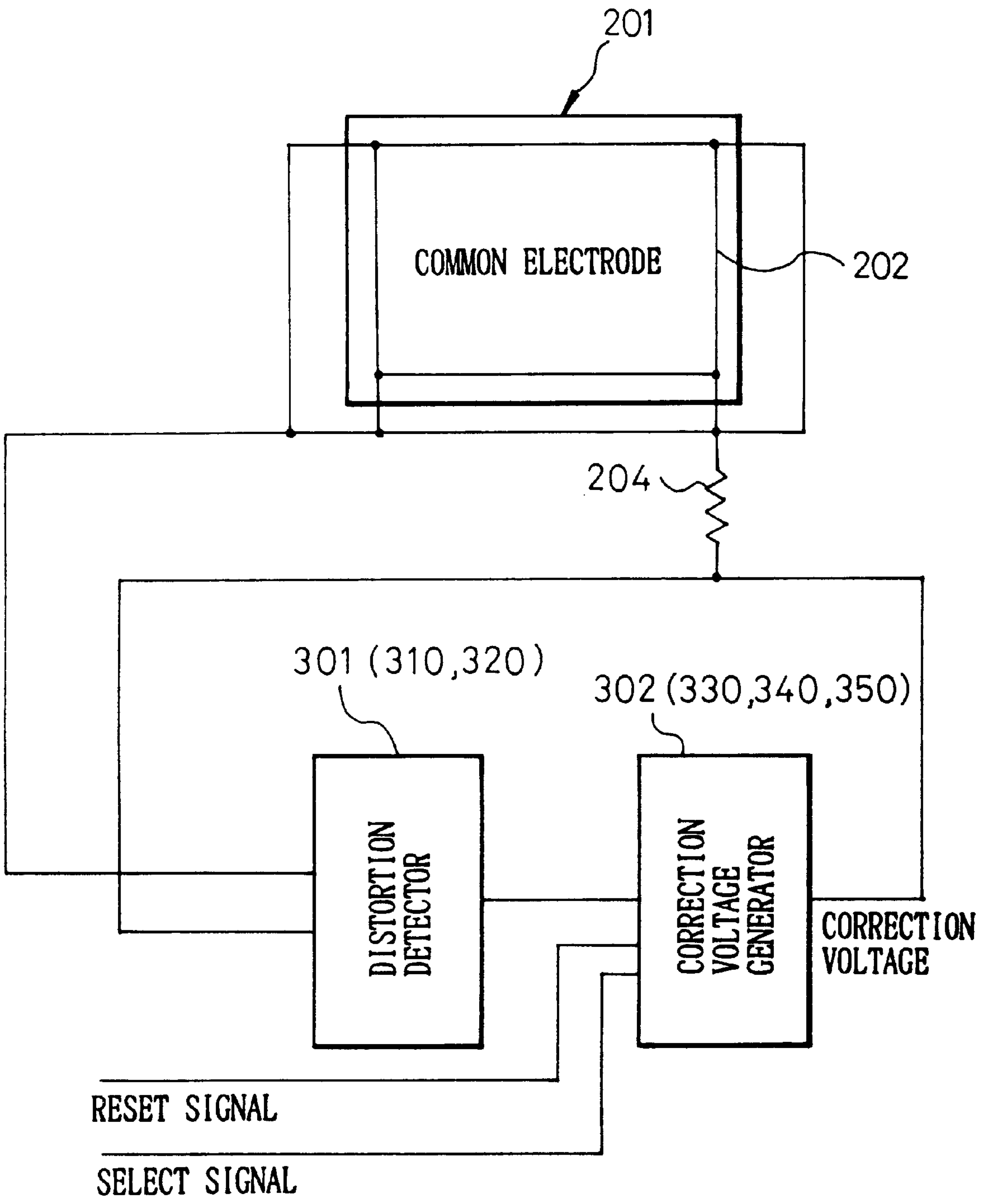
FIG. 38 shows an LCD according to a second embodiment of the fourth aspect of the present invention.
Figure 39:
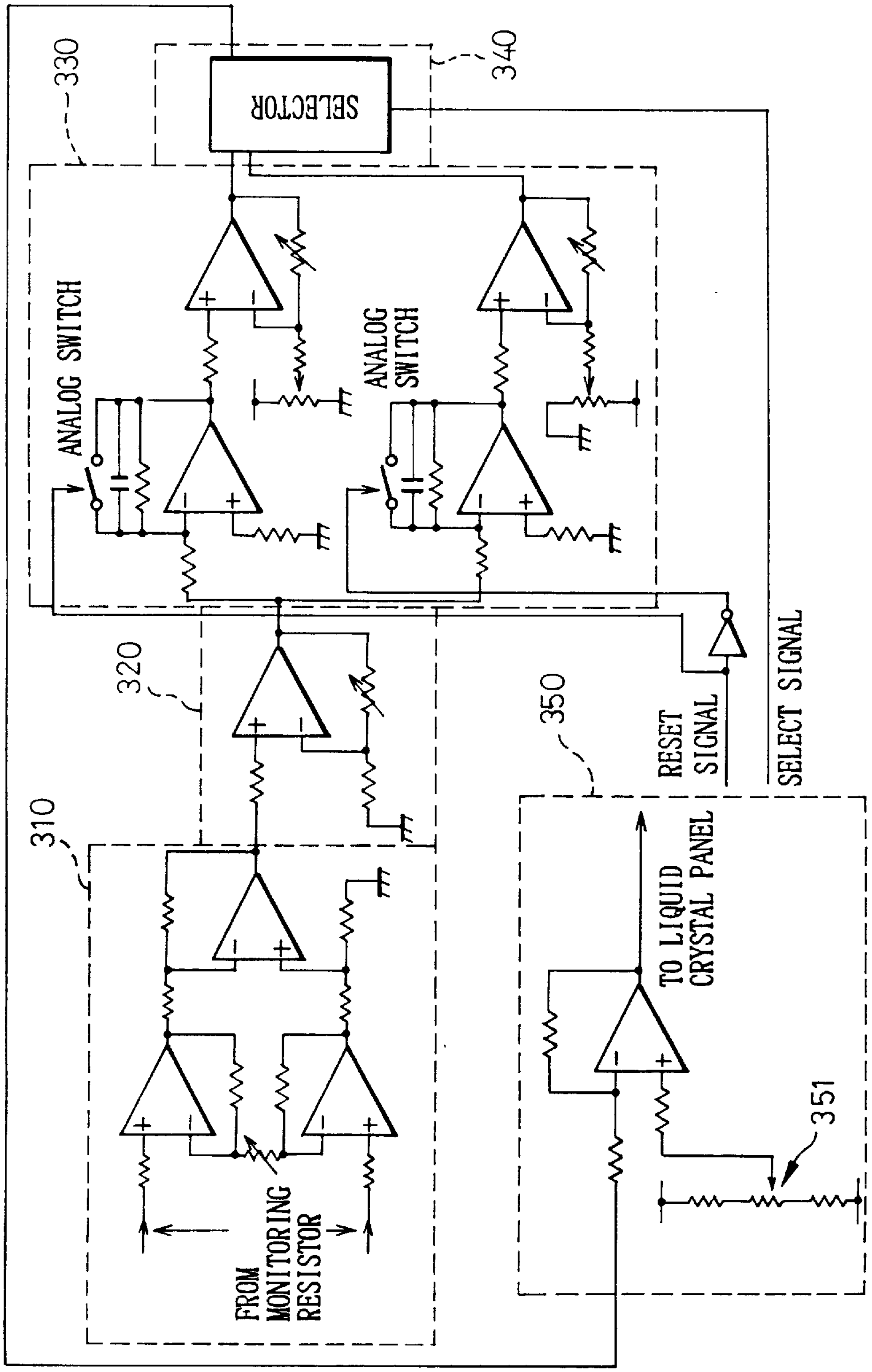
FIG. 39 shows circuits in the LCD of FIG. 38.

FIG. 38 shows an LCD according to a second embodiment of the fourth aspect of the present invention, and FIG. 39 shows circuits in the LCD of FIG. 38.

In FIG. 38, the LCD has a distortion detector 301 and a correction voltage generator 302. The distortion detector 301 has a differential amplifier 310 and an amplitude adjuster 320. The correction voltage generator 302 has an integration circuit 330, a selector 340, and a voltage level adjuster 350.

The differential amplifier 310 differentially amplifies a potential difference detected by a monitoring resistor 204. The amplitude adjuster 320 adjusts the amplitude of an output signal of the differential amplifier 310. The integration circuit 330 and selector 340 are modifications of those of the correction circuit of FIG. 36. The integration circuit 330 generates an integrated voltage corresponding to distortion of a common voltage, adjusts the amplitude of the integrated voltage, and carries out alternating reset operations with analog switches (reset switches) as explained with reference to FIG. 36. The selector 340 selects periods of providing correction voltages from two integration circuits included in the integration circuit 330 and combines the correction voltages. The voltage level adjuster 350 is an amplifier that adjusts the level of the combination of the correction voltages and provides an adjusted correction voltage to a liquid crystal panel 201 (a common electrode 202). The voltage level adjuster 350 has a variable resistor

351 that adjusts an offset. FIG. 39 shows only one example of the LCD. The LCD of FIG. 38 can be materialized in various forms.

The correction voltage, i.e., the output voltage of the correction circuit 203 of the above embodiments is applicable not only for the common electrode 202 but also for the shielding film 81 of the color filter 8 of FIGS. 4 and 5 and the supplemental electrode 9 of FIG. 7, to correct distortion of a common voltage.

As explained above, the LCD according to the fourth aspect of the present invention detects distortion of a common voltage and provides an optimum correction voltage in real time, to effectively prevent crosstalk.

An LCD according to a fifth aspect of the present invention will now be explained. The arrangement of this LCD is basically the same as the conventional one shown in FIG. 12.

Figure 40A:
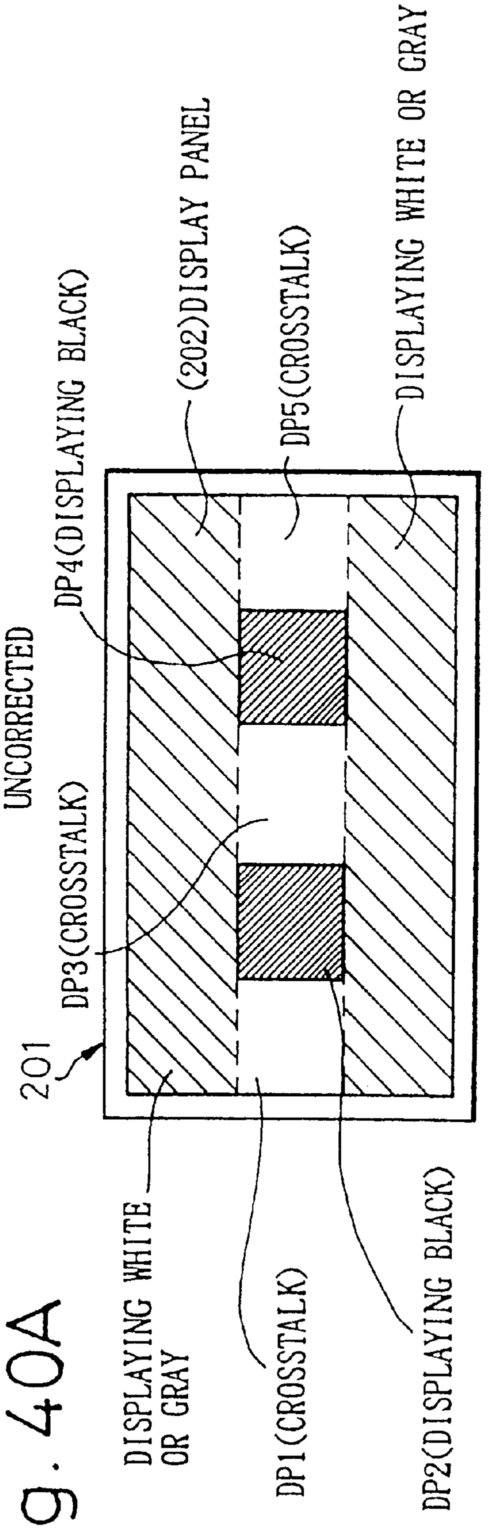
FIGS. 40A and 40B explain the problems to be solved by an LCD according to a fifth aspect of the present invention.
Figure 40B:
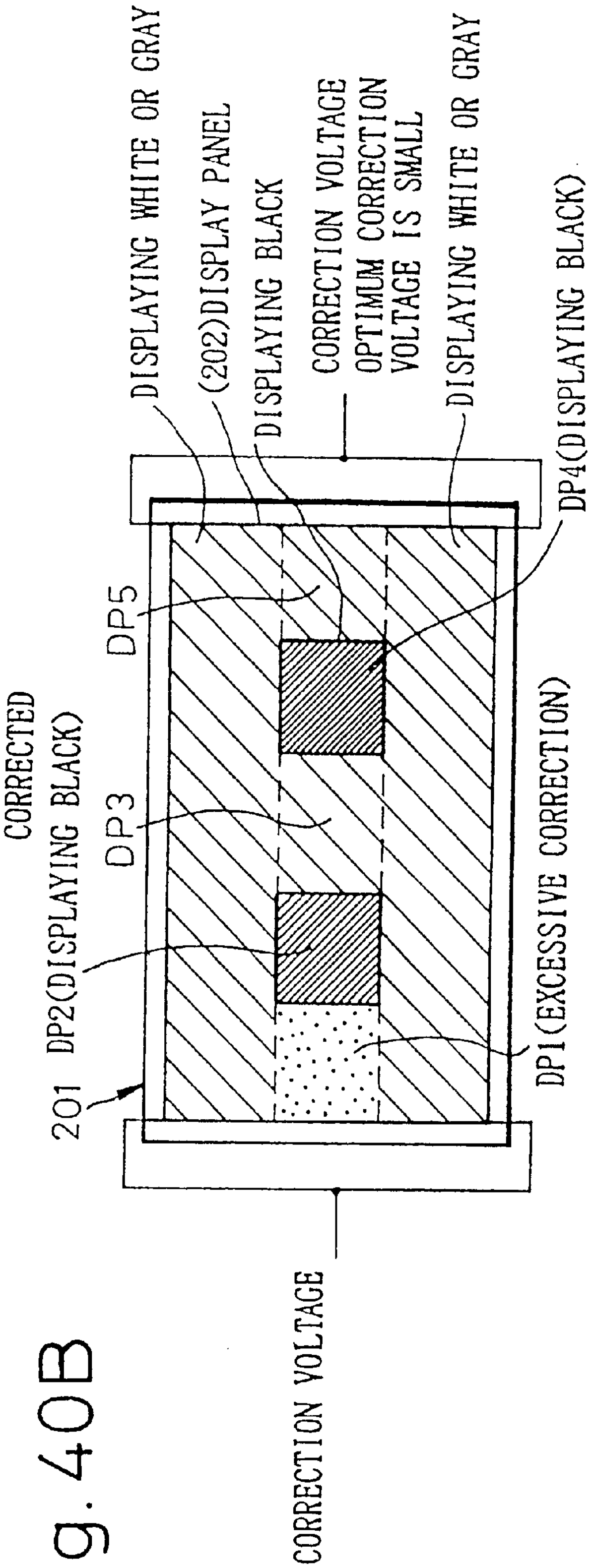

FIGS. 40A and 40B explain the problems to be solved by the LCD of the fifth aspect of the present invention, in which FIG. 40A shows a liquid crystal panel 201 with no correction and FIG. 40B shows the liquid crystal panel 201 with a correction voltage being applied to each side thereof.

The liquid crystal panel 201 sometimes involves unevenness in displaying data thereon due to manufacturing fluctuations. If the liquid crystal panel involving such unevenness is subjected to uniform correction, i.e., if the same correction voltage is applied to common voltage terminals 202*a* to 202*d* of a common electrode 202 of the panel, the correction voltage may deteriorate the display quality of the LCD.

More precisely, when dots DP2 and DP4 display black as shown in FIG. 40A and when an uncorrected common voltage is applied to the common electrode 202, dots DP1, DP3, and DP5, for example, may cause crosstalk. To remove this crosstalk and improve the display quality, the same correction voltage may be applied to each side of the common electrode 202 as shown in FIG. 40B. Then, the crosstalk at the dots DP3 and DP5 may be solved. The dot DP1, however, may deteriorate its display quality because the correction voltage is too strong. In this way, optimum correction will not be realized at every position on the liquid crystal panel, if there is display unevenness on the panel.

LCDs according to the fifth aspect of the present invention apply optimum correction voltages to respective parts of a common electrode depending on the positions of the parts on a liquid crystal panel.

Figure 41:
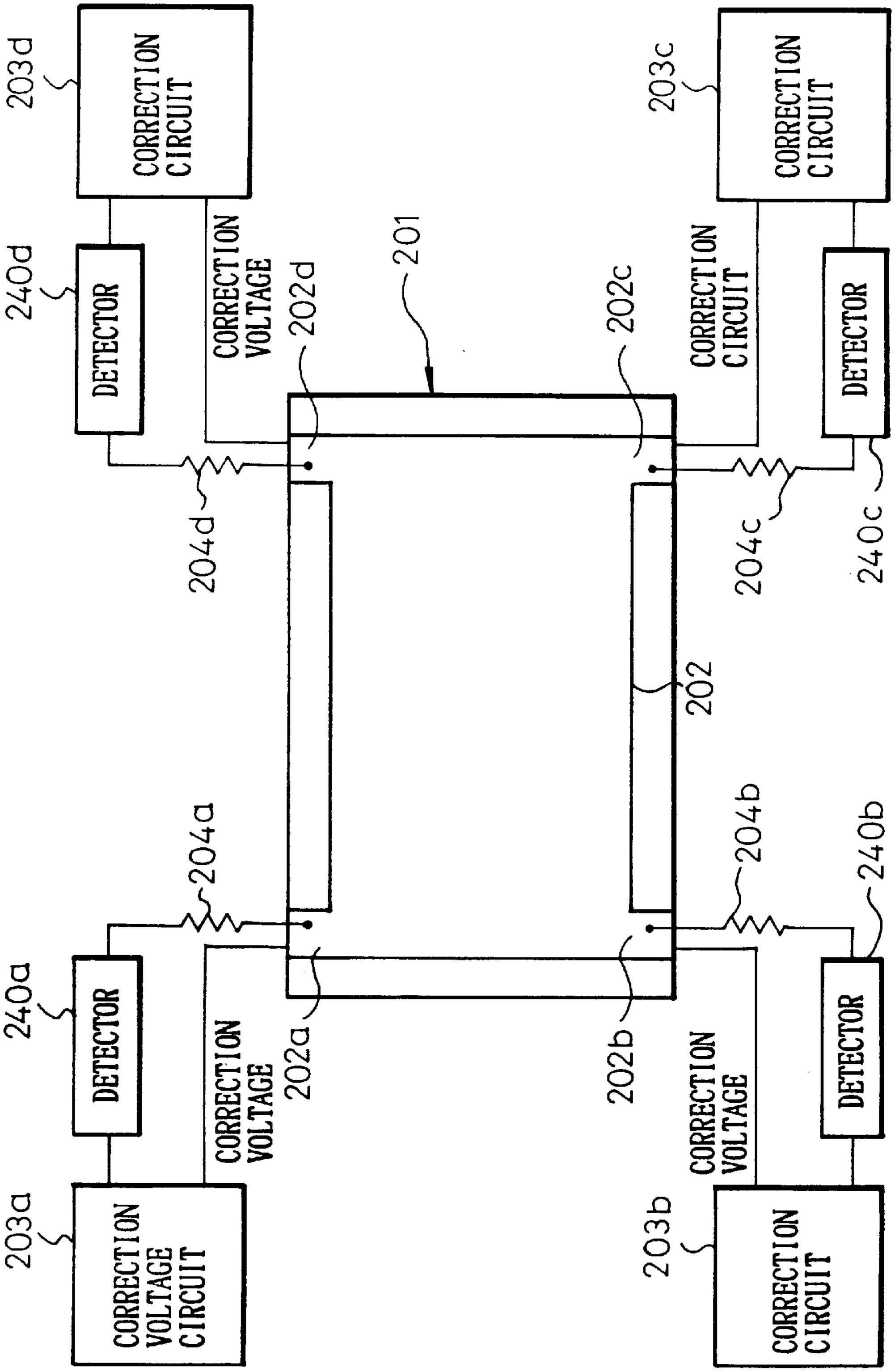
FIG. 41 shows an LCD according to a first embodiment of the fifth aspect of the present invention.

FIG. 41 shows an LCD according to a first embodiment of the fifth aspect of the present invention. Numeral 201 is a liquid crystal panel, 202 is a common electrode, 202*a* to 202*d* are common voltage terminals, 203*a* to 203*d* are correction circuits, 204*a* to 204*d* are monitoring resistors, and 240*a* to 240*d* are detectors for detecting distortion of a common voltage.

In FIG. 41, the common voltage terminals 202*a* to 202*d* of the common electrode 202 have their own correction circuits 203*a* to 203*d*, monitoring resistors 204*a* to 204*d*, and detectors 240*a* to 240*d*, respectively, so that optimum correction voltages are applied to the common voltage terminals 202*a* to 202*d*, respectively, depending on their positions. In this way, this embodiment applies optimum voltages to respective positions of the liquid crystal panel 201 through the corresponding terminals of the common electrode. Even if the liquid crystal panel involves display unevenness, this embodiment carries out optimum correction on the panel as a whole, to improve the display quality of the panel.

Figure 42:
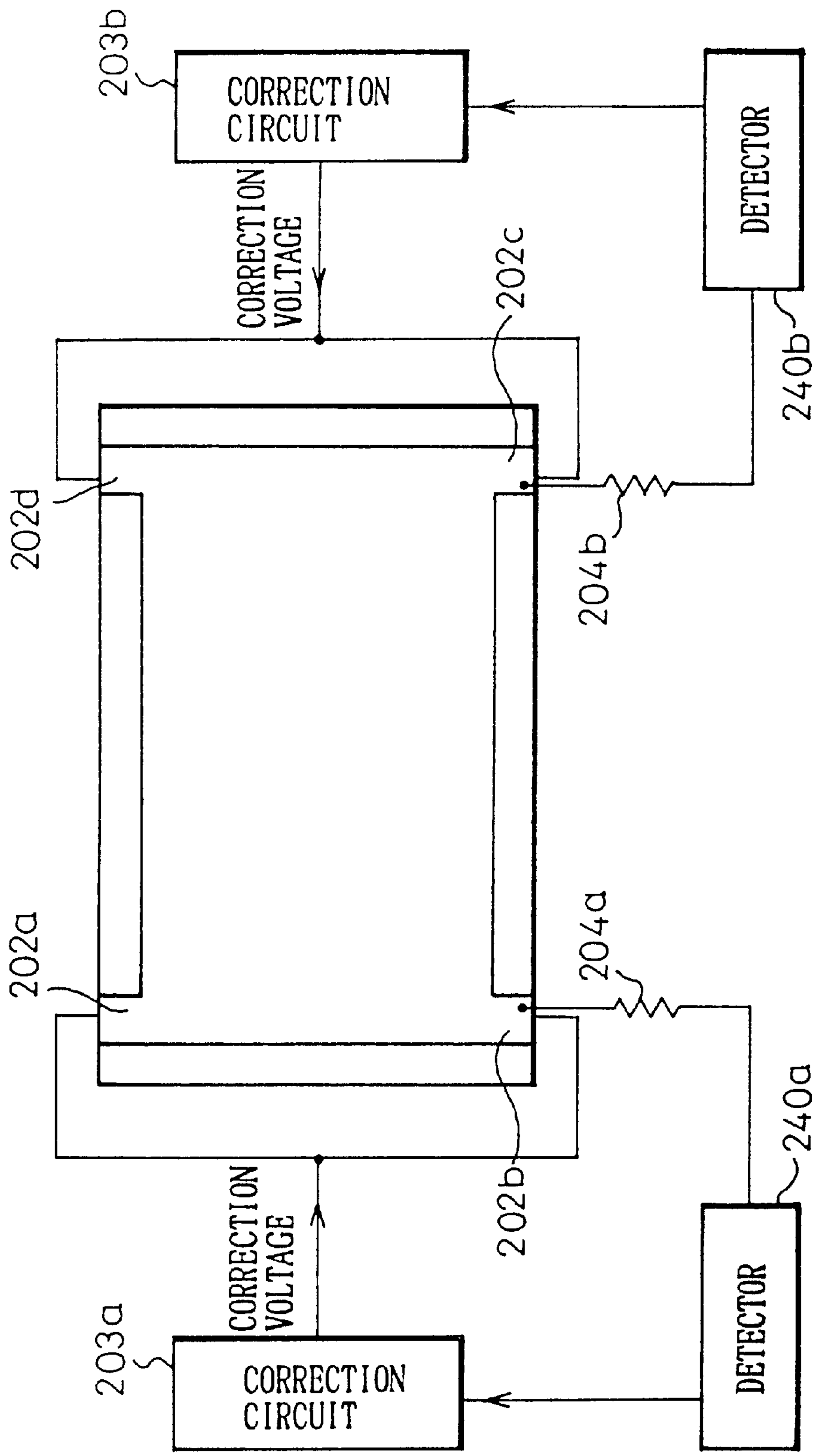
FIG. 42 shows an LCD according to a second embodiment of the fifth aspect of the present invention.

FIG. 42 shows an LCD according to a second embodiment of the fifth aspect of the present invention.

A group of common voltage terminals 202*a* and 202*b* is provided with a correction circuit 203*a*, a monitoring resistor 204*a*, and a detector 240*a*. A group of common voltage terminals 202*c* and 202*d* is provided with a correction circuit 203*b*, a monitoring resistor 204*b*, and a detector 240*b*. The numbers of the correction circuits, monitoring resistors, and detectors are half of those of FIG. 41. On one side of a liquid crystal panel 202, there are arranged the correction circuit 203*a*, monitoring resistor 204*a* and detector 140*a*, and on the other side thereof, there are arranged the correction circuit 203*b*, monitoring resistor 204*b* and detector 240*b*.

Figure 43:
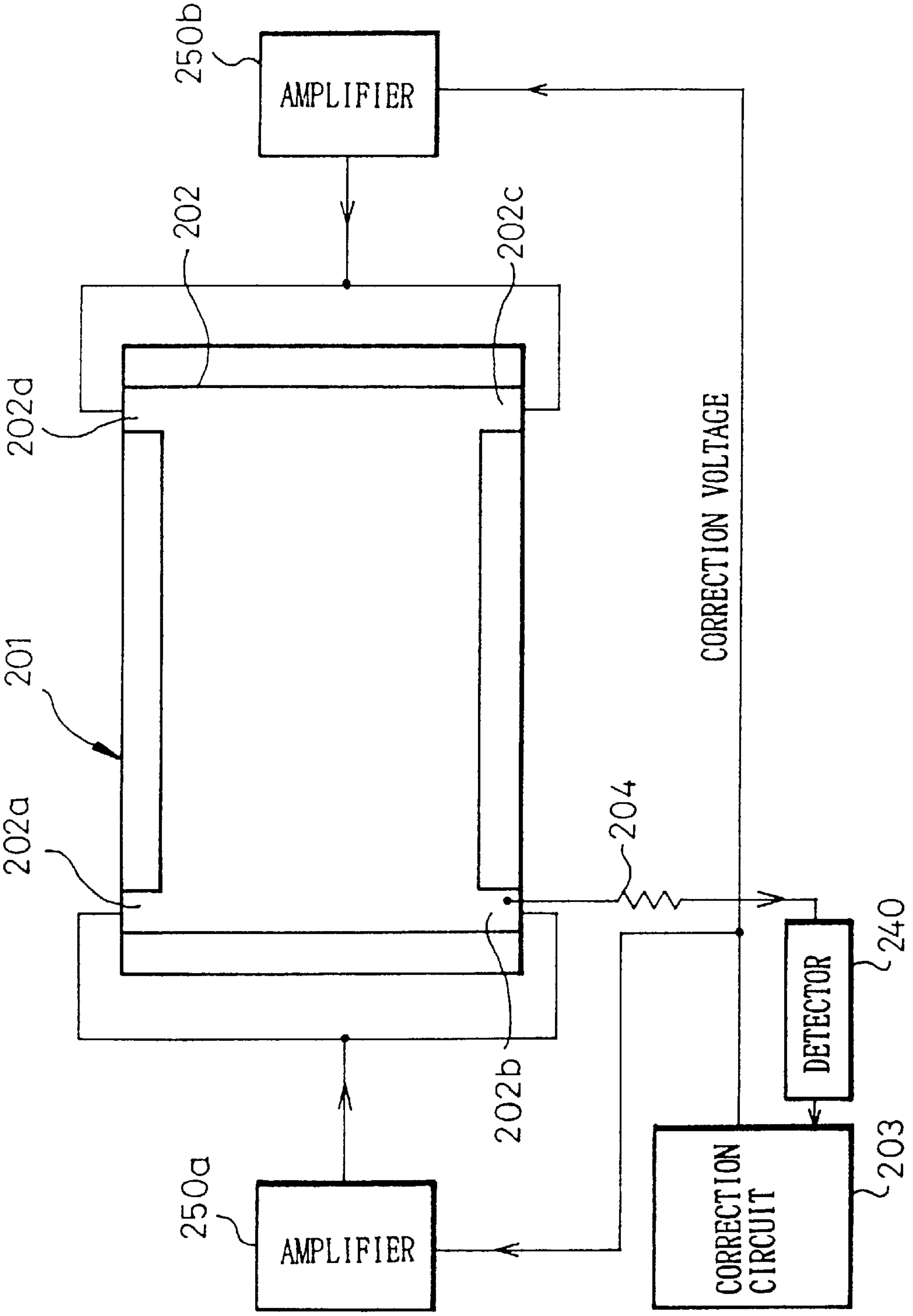
FIG. 43 shows an LCD according to a third embodiment of the fifth aspect of the present invention.

FIG. 43 shows an LCD according to a third embodiment of the fifth aspect of the present invention.

A voltage applied to a common voltage terminal 202*b* is detected by a monitoring resistor 204 and a detector 240 and is corrected by a correction circuit 203. An output voltage (a correction voltage) of the correction circuit 203 is amplified by amplifiers 250*a* and 250*b* that are arranged on each side of a liquid crystal panel 201. The amplifier 250*a* applies the amplified voltage to common voltage terminals 202*a* and 202*b*, and the amplifier 250*b* applies the amplified voltage to common voltage terminals 202*c* and 202*d*. This embodiment additionally requires the amplifiers 250*a* and 250*b* compared with the second embodiment. This embodiment, however, only requires one of each of the correction circuit, monitoring resistor, and detector.

Figure 44:
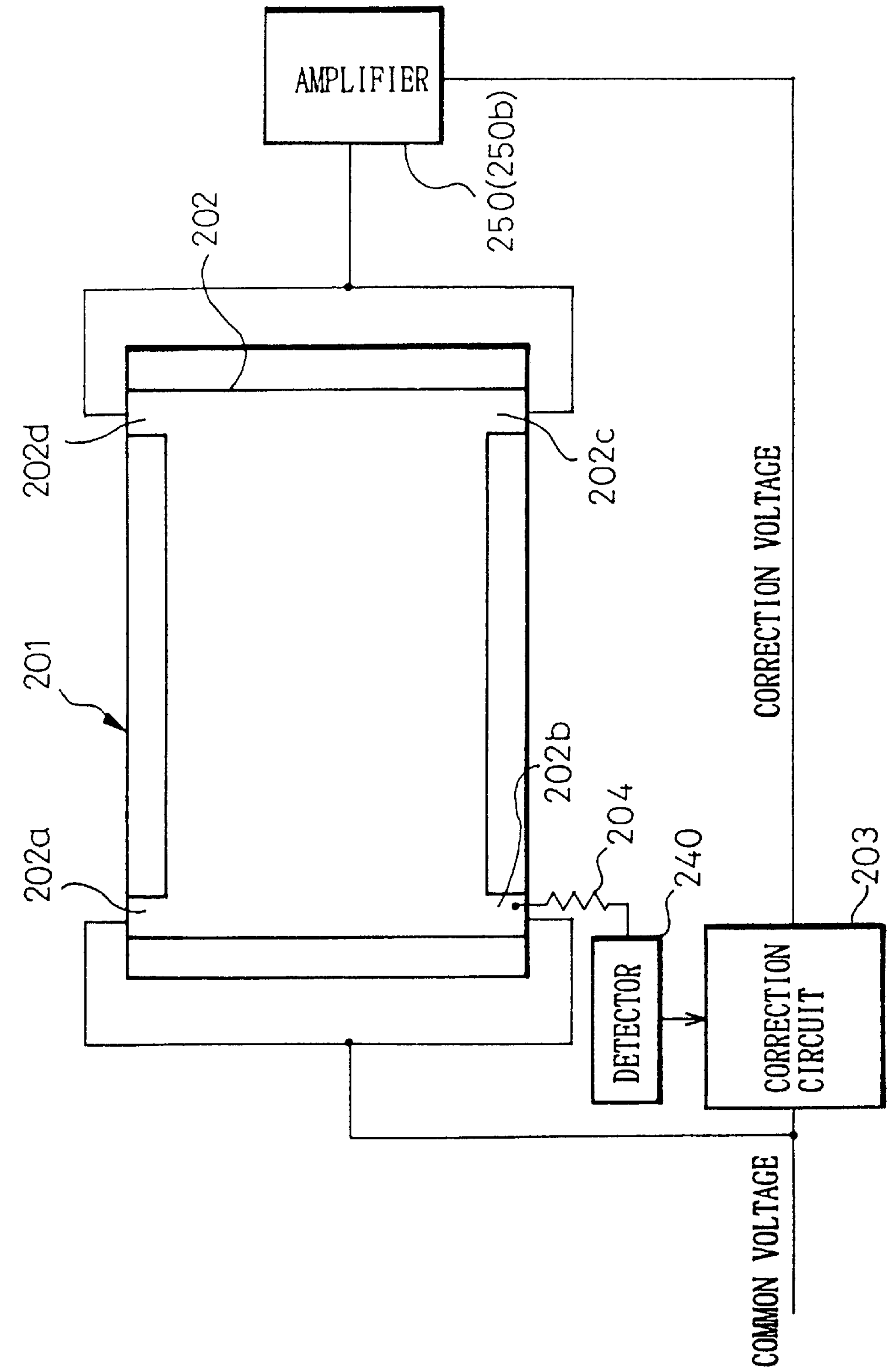
FIG. 44 shows an LCD according to a fourth embodiment of the fifth aspect of the present invention.

FIG. 44 shows an LCD according to a fourth embodiment of the fifth aspect of the present invention. This embodiment does not have the amplifier 250*a* of the third embodiment of FIG. 43. An uncorrected common voltage is directly applied to common voltage terminals 202*a* and 202*b*. When a black window is displayed at the center of the liquid crystal panel 201 of FIG. 40B, a correction will be made to eliminate crosstalk on the right side of the panel. In this case, the dot DP1 on the left side of the panel is expected to become brighter due to excessive correction. The dot DP1, however, sometimes become darker than expected. The fifth embodiment is effective in such a case.

As explained above, the LCD according to the fifth aspect of the present invention detects distortion of a common voltage and corrects the distortion with an optimum correction voltage in real time. This embodiment carries out optimum correction on the whole face of a display panel and effectively suppresses crosstalk.

In summary, the first aspect of the present invention provides an LCD that provides a correction voltage to correct distortion of a common voltage and prevents crosstalk. This LCD keeps an effective voltage of each liquid crystal cell unchanged and improves the display quality of the LCD.

The second aspect of the present invention provides an LCD driving method that adds a weighting value for display data for a first scan line to a weighting value for display data for a second scan line that follows the first scan line. A voltage corresponding to the sum of the weighting values is added to a data voltage or to a common voltage, to cancel distortion of the common voltage. This results in reducing crosstalk and improving the display quality of the LCD.

The third aspect of the present invention provides an LCD that employs an integration circuit or a samplehold circuit as a correction circuit. The correction circuit corrects distortion of a common voltage caused by the resistance of a common electrode and parasitic capacitance between each data bus line and the common electrode, in real time. This results in suppressing crosstalk.

The fourth aspect of the present invention provides an LCD that detects distortion of a common voltage and obtains an optimum correction voltage in real time, to more effectively suppress crosstalk.

The fifth aspect of the present invention provides an LCD that detects distortion of a common voltage and corrects the distortion in real time. This LCD obtains an optimum correction voltage and corrects the distortion on the whole face of a liquid crystal panel. This results in more effectively suppressing crosstalk.

Many different embodiments of the present invention may be constructed without departing from the spirit and scope of the present invention, and it should be understood that the present invention is not limited to the specific embodiments described in this specification, except as defined in the appended claims.

What is claimed is:

1. An active matrix liquid crystal display comprising:

a liquid crystal panel having a liquid crystal layer, display electrodes, and a common electrode, said liquid crystal layer being inserted between said display electrodes and said common electrode to define liquid crystal cells;

a detection circuit detecting distortion of a common voltage applied to said common electrode, said common electrode having common voltage terminals, at least one of said common voltage terminals being removed from said common voltage and used to detect distortion of said common voltage; and a sample-hold circuit serving as a correction circuit and providing a correction voltage according to the magnitude of the detected distortion of said common voltage.

2. An active matrix liquid crystal display as claimed in claim 1, wherein said detection circuit comprises a monitoring resistor, disposed between said common electrode and an output end of said common voltage, a connection between said monitoring resistor and said common electrode being used to detect distortion of said common voltage.

3. An active matrix liquid crystal display comprising:

a liquid crystal panel having a liquid crystal layer, display electrodes, and a common electrode, said liquid crystal layer being inserted between said display electrodes and said common electrode to define liquid crystal cells;

a detection circuit detecting distortion of a common voltage applied to said common electrode; and said detection circuit comprises:

a monitoring resistor, disposed between said common electrode and an output end of said common voltage, a connection between said monitoring resistor and said common electrode being based to detect distortion of said common voltage;

a differential amplifier that receives a terminal voltage of wiring that connects said common electrode to the output end of said common voltage, or a terminal voltage of said monitoring resistor connected between said common electrode and the output end of said common voltage, and an output of said differential amplifier is used to detect distortion of said common voltage; and a sample-hold circuit serving as a correction circuit and providing a correction voltage according to the magnitude of the detected distortion of said common voltage.

4. An active matrix liquid crystal display, comprising:

a liquid crystal panel having a liquid crystal layer, display electrodes, and a common electrode, said liquid crystal layer being inserted between said display electrodes and said common electrode to define liquid crystal cells and said common electrode having common voltage terminals;

respective detection circuits for said common voltage terminals, each thereof detecting distortion of a common voltage applied to said common electrode; and respective correction circuits for said common voltage terminals, providing corresponding correction voltages according to the magnitude of the detected distortion of said common voltage, and the corresponding correction voltages, having different amplitudes, being applied to said common voltage terminals, respectively, to correct the distortion of said common voltage.

5. An active matrix liquid crystal display, comprising:

a liquid crystal panel having a liquid crystal layer, display electrodes, and a common electrode, said liquid crystal layer being inserted between said display electrodes and said common electrode to define liquid crystal cells and said common electrode having common voltage terminals;

a respective detection circuit for at least one of said common voltage terminals, detecting distortion of a common voltage applied to said common electrode; and a respective correction circuit for at least one of said common voltage terminals, each correction circuit providing a corresponding correction voltage according to the magnitude of the detected distortion of said common voltage and each said correction voltage being applied to said respective common voltage terminal while an uncorrected common voltage is applied to the other common voltage terminals, correction voltages having different amplitudes being applied to different said common voltage terminals, respectively, to correct the distortion of said common voltage.

6. A liquid crystal display comprising:

a weighting unit weighting display data to be supplied to a data driver;

a first adder adding a weighting value based on display data for a first scan line to a weighting value based on display data for a second scan line to be selected after said first scan line; and a second adder adding a voltage corresponding to the sum of the weighting values to a data voltage to be supplied to said data driver, to thereby cancel distortion of a common voltage.

7. A liquid crystal display as claimed in claim 6, wherein said liquid crystal display further comprises an adjusting unit adjusting said data voltage according to a distance between a common electrode terminal to which said common voltage is applied and a data electrode to which display data is supplied.

8. A liquid crystal display as claimed in claim 6, wherein said liquid crystal display further comprises an adjusting unit adjusting said data voltage or said common voltage according to a distance between a common electrode terminal to which said common voltage is applied and a scan electrode corresponding to a scan line.

9. A liquid crystal display comprising:

weighting unit weighting display data to be supplied to a data driver;

a first adder adding a weighting value based on display data for a first scan line to a weighting value based on display data for a second scan line to be selected after said first scan line; and a second adder adding a voltage corresponding to the sum of the weighting values to a common voltage, to thereby cancel distortion of said common voltage.

10. A liquid crystal display as claimed in claim 9, wherein said liquid crystal display further comprises an adjusting unit adjusting said data voltage or said common voltage according to a distance between a common electrode terminal to which said common voltage is applied and a scan electrode corresponding to a scan line.

11. A method of driving a liquid crystal display, comprising the steps of:

weighting display data to be supplied to a data driver;

adding a weighting value based on display data for a first scan line to a weighting value based on display data for a second scan line to be selected after said first scan line; and adding a voltage corresponding to the sum of the weighting values to a data voltage to be supplied to said data driver, to thereby cancel distortion of a common voltage.

12. A method of driving a liquid crystal display, comprising the steps of:

weighting display data supplied to a data driver;

adding a weighting value based on display data for a first scan line to a weighting value based on display data for a second scan line to be selected after said first scan line; and adding a voltage corresponding to the sum of the weighting values to a common voltage, to thereby cancel distortion of said common voltage.

13. A liquid crystal display comprising:

a liquid crystal panel having a liquid crystal layer, display electrodes and a common electrode, said liquid crystal layer being inserted between said display electrodes and said common electrode to define liquid crystal cells;

a detection circuit detecting distortion of a common voltage applied to said common electrode, said common electrode having common voltage terminals, at least one of said common voltage terminals being removed from said common voltage, and said removed common voltage terminal being used to detect distortion of said common voltage; and a sample-hold circuit serving as a correction circuit and providing a correction voltage according to the magnitude of the detected distortion of said common voltage.

14. A liquid crystal display comprising:

a liquid crystal panel having a liquid crystal layer, display electrodes and a common electrode, said liquid crystal layer being inserted between said display electrodes and said common electrode to define liquid crystal cells;

a detection circuit detecting distortion of a common voltage applied to said common electrode, said detection circuit having a monitoring resistor disposed between said common electrode and an output end of said common voltage, and a differential amplifier that receives a terminal voltage of wiring that connects said common electrode to the output end of said common voltage, or a terminal voltage of said monitoring resistor connected between said common electrode and the output end of said common voltage, a connection between said monitoring resistor and said common electrode being used to detect distortion of said common voltage, and an output of said differential amplifier being used to detect distortion of said common voltage; and a sample-hold circuit serving as a correction circuit and providing a correction voltage according to the magnitude of the detected distortion of said common voltage.

15. A liquid crystal display comprising:

a liquid crystal panel having a liquid crystal layer, display electrodes and a common electrode, said liquid crystal layer being inserted between said display electrodes and said common electrode to define liquid crystal cells and said common electrode having common voltage terminals;

a detection circuit detecting distortion of a common voltage applied to said common electrode; and a correction circuit providing a correction voltage according to the magnitude of the detected distortion of said common voltage, correction voltages having different amplitudes being applied to said common voltage terminals, respectively, to correct the distortion of said common voltage, and each of said common voltage terminals being provided with a respective said detection circuit and a respective said correction circuit.

16. A liquid crystal display comprising:

a liquid crystal panel having a liquid crystal layer, display electrodes and a common electrode, said liquid crystal layer being inserted between said display electrodes and said common electrode to define liquid crystal cells and said common electrode having common voltage terminals;

a detection circuit detecting distortion of a common voltage applied to said common electrode; and a correction circuit providing a correction voltage according to the magnitude of the detected distortion of said common voltage, correction voltages having different amplitudes being applied to said common voltage terminals, respectively, to correct the distortion of said common voltage, at least one of said common voltage terminals being provided with a respective said detection circuit and a respective said correction circuit, and a correction voltage provided by said correction circuit being applied to said common voltage terminals while an uncorrected common voltage is applied to the other common voltage terminals.

* * * * *